United States Patent
Cohen

(10) Patent No.: US 11,073,622 B2
(45) Date of Patent: Jul. 27, 2021

(54) PERFORMANCE AND COST GLOBAL NAVIGATION SATELLITE SYSTEM ARCHITECTURE

(71) Applicant: Clark Emerson Cohen, Washington, DC (US)

(72) Inventor: Clark Emerson Cohen, Washington, DC (US)

(73) Assignee: PNT HOLDINGS, INC., Washington, DC (US)

( * ) Notice: Subject to any disclaimer, the term of this patent is extended or adjusted under 35 U.S.C. 154(b) by 1417 days.

(21) Appl. No.: 14/632,663

(22) Filed: Feb. 26, 2015

(65) Prior Publication Data

US 2016/0011318 A1     Jan. 14, 2016

Related U.S. Application Data

(60) Provisional application No. 61/944,752, filed on Feb. 26, 2014.

(51) Int. Cl.
*G01S 19/43*     (2010.01)
*G01S 19/11*     (2010.01)
(Continued)

(52) U.S. Cl.
CPC .............. *G01S 19/43* (2013.01); *G01S 19/05* (2013.01); *G01S 19/11* (2013.01); *G01S 19/29* (2013.01);
(Continued)

(58) Field of Classification Search
CPC .......... G01S 19/43; G01S 19/05; G01S 19/11; G01S 19/29; G01S 19/42; G01S 19/45;
(Continued)

(56) References Cited

U.S. PATENT DOCUMENTS 4,071,829 A     1/1978  Davis et al.
5,570,099 A    10/1996  Desjardins
(Continued)

FOREIGN PATENT DOCUMENTS

| EP | 1729145 A1 * | 12/2006 | ............. G01S 19/08 |
| WO | WO-2011016821 A2 * | 2/2011 | ............. G01S 19/43 |
| WO | WO-2014121197 A2 * | 8/2014 | ............. G01S 19/14 |

OTHER PUBLICATIONS

D.Carateli & M.C. Vigano; "Analytical Synthesis Technique for Linear Uniform-Amplitude Sparse Arrays"; Radio Science; vol. 46, RS4001, pp. 1-6, Jul. 21, 2011.
(Continued)

*Primary Examiner* — Vladimir Magloire
*Assistant Examiner* — Nuzhat Pervin
(74) *Attorney, Agent, or Firm* — Bacon & Thomas, PLLC

(57) ABSTRACT

Significant, cost-effective improvement is introduced for Position, Navigation, and Timing (PNT) on a global basis, particularly enhancing the performance of Global Navigation Satellite Systems (GNSS), an example of which is the Global Positioning System (GPS). The solution significantly improves performance metrics including the accuracy, integrity, time to acquire, interference rejection, and spoofing protection. A constellation of small satellites employing a low-cost architecture combined with improved signal processing yields an affordable enabler for spectrum-efficient transportation mobility. As air traffic management modernization transitions to a greater dependence on satellite positioning, the solution provides aviation users new protections from both intentional and unintentional interference to navigation and surveillance. And in response to an era in which intelligent transportation is under development for automobiles, reliable where-in-lane positioning enables new appli- (Continued)

cations in connected and autonomous vehicles. New military capability increases PNT availability.

53 Claims, 60 Drawing Sheets

(51) Int. Cl.
 G01S 19/45 (2010.01)
 G01S 19/48 (2010.01)
 G01S 19/42 (2010.01)
 G01S 19/05 (2010.01)
 G01S 19/29 (2010.01)
(52) U.S. Cl.
 CPC .......... G01S 19/42 (2013.01); G01S 19/425 (2013.01); G01S 19/45 (2013.01); G01S 19/48 (2013.01)
(58) Field of Classification Search
 CPC .......... G01S 19/48; G01S 1/026; G01S 19/46; G01S 5/0027; G01S 19/04; G01S 19/07; G01S 19/37; G01S 19/08; G01S 13/876; G01S 19/21; G01S 19/30; G01S 19/20; G01S 1/24; G01S 19/00; G01S 5/0263; G01S 19/24; G01C 5/005; G01C 21/165; G01C 21/28; H01Q 1/36; H04J 3/0632; H04B 7/18578; H04B 7/2041; H04B 7/18565; G07F 17/3218; G08B 29/181; G08G 5/0043; H04W 52/029; G06F 17/30241
 USPC .................................................. 342/357.26
 See application file for complete search history.

(56) References Cited

U.S. PATENT DOCUMENTS

| | | | | |
|---|---|---|---|---|
| 5,594,452 A * | 1/1997 | Webber | G01S 1/026 342/174 |
| 5,708,440 A * | 1/1998 | Trimble | G01S 19/071 342/357.31 |
| 5,812,961 A | 9/1998 | Enge et al. | |
| 5,841,398 A | 11/1998 | Brock | |
| 5,899,957 A * | 5/1999 | Loomis | G01S 19/071 701/470 |
| 5,944,770 A * | 8/1999 | Enge | G01S 19/44 701/470 |
| 5,983,161 A * | 11/1999 | Lemelson | G07C 5/0891 701/301 |
| 6,078,284 A * | 6/2000 | Levanon | G01S 5/12 342/357.64 |
| 6,157,891 A * | 12/2000 | Lin | G01C 5/005 244/180 |
| 6,208,297 B1 | 3/2001 | Fattouche et al. | |
| 6,329,950 B1 * | 12/2001 | Harrell | H01Q 1/36 343/700 MS |
| 6,373,432 B1 * | 4/2002 | Rabinowitz | G01S 19/11 342/357.29 |
| 6,400,706 B1 * | 6/2002 | Cousineau | H04J 3/0632 370/350 |
| 6,515,618 B1 | 2/2003 | Lupash | |
| 6,600,444 B2 | 7/2003 | Desjardins | |
| 6,639,541 B1 * | 10/2003 | Quintana | H04B 17/345 342/18 |
| 6,658,048 B1 * | 12/2003 | Valio | G01S 19/22 342/357.52 |
| 6,674,398 B2 * | 1/2004 | Murphy | G01S 19/01 342/357.21 |
| 6,963,304 B2 * | 11/2005 | Murphy | G01S 19/071 342/357.21 |
| 7,286,082 B2 * | 10/2007 | Hsu | G01S 19/08 342/357.29 |
| 7,372,400 B2 * | 5/2008 | Cohen | H04K 3/90 342/357.29 |
| 7,414,573 B2 * | 8/2008 | Murphy | H04B 7/18508 342/357.21 |
| 7,626,544 B2 * | 12/2009 | Smith | G01S 5/0263 342/386 |
| 7,761,095 B2 * | 7/2010 | Best | H04B 7/18565 455/427 |
| 7,969,352 B2 * | 6/2011 | DiLellio | G01S 19/071 342/357.24 |
| 7,978,130 B1 * | 7/2011 | Cohen | G01S 19/46 342/357.56 |
| 8,068,984 B2 * | 11/2011 | Smith | G01S 19/47 701/472 |
| 8,089,408 B2 * | 1/2012 | Smith | G01C 21/165 342/464 |
| 8,131,463 B2 * | 3/2012 | Lopez | G01S 19/20 701/469 |
| 8,299,966 B2 * | 10/2012 | Smith | G01S 5/10 342/464 |
| 8,355,866 B2 * | 1/2013 | Smith | G01S 1/24 701/468 |
| 8,467,754 B2 * | 6/2013 | Kumamoto | H04W 52/029 455/226.1 |
| 8,908,914 B2 * | 12/2014 | Ling | G01C 21/206 382/103 |
| 9,218,741 B2 * | 12/2015 | Wu | G01S 13/878 |
| 2002/0077099 A1 * | 6/2002 | LaPrade | H04B 7/18578 455/430 |
| 2002/0193108 A1 * | 12/2002 | Robinett | H04B 7/18563 455/427 |
| 2004/0014472 A1 * | 1/2004 | de La Chapelle | H04B 7/2041 455/429 |
| 2005/0114892 A1 * | 5/2005 | Chan | G16H 40/67 725/63 |
| 2005/0156782 A1 * | 7/2005 | Whelan | G01S 19/26 342/357.48 |
| 2006/0047413 A1 * | 3/2006 | Lopez | G01S 19/20 701/532 |
| 2007/0043481 A1 * | 2/2007 | Metschan | G08G 5/0034 701/3 |
| 2007/0155489 A1 * | 7/2007 | Beckley | H04W 4/021 463/29 |
| 2008/0062039 A1 * | 3/2008 | Cohen | G01S 19/11 342/357.29 |
| 2008/0088507 A1 * | 4/2008 | Smith | G01S 5/10 342/386 |
| 2008/0091350 A1 * | 4/2008 | Smith | G01C 21/165 701/472 |
| 2009/0041089 A1 * | 2/2009 | Jhang | G01S 19/37 375/139 |
| 2009/0182502 A1 * | 7/2009 | Riter | G01S 19/40 701/472 |
| 2009/0219976 A1 * | 9/2009 | Oren | G01S 19/14 375/141 |
| 2010/0033370 A1 * | 2/2010 | Lopez | G01S 19/08 342/357.29 |
| 2010/0035543 A1 * | 2/2010 | Nishida | G08B 25/016 455/12.1 |
| 2010/0156709 A1 * | 6/2010 | Zhang | G01S 19/43 342/357.23 |
| 2011/0163913 A1 * | 7/2011 | Cohen | G01S 19/09 342/357.29 |
| 2011/0238308 A1 * | 9/2011 | Miller | G01S 19/31 701/472 |
| 2011/0261805 A1 * | 10/2011 | Landry, Jr. | G01S 19/24 370/342 |
| 2012/0029818 A1 * | 2/2012 | Smith | G01S 1/24 701/468 |
| 2012/0121087 A1 * | 5/2012 | Psiaki | G01S 19/05 380/255 |
| 2012/0286991 A1 * | 11/2012 | Chen | G01S 19/32 342/357.23 |
| 2012/0309414 A1 * | 12/2012 | Rhoads | H04W 64/00 455/456.1 |

(56) References Cited

U.S. PATENT DOCUMENTS

| | | | | |
|---|---|---|---|---|
| 2013/0099968 A1* | 4/2013 | Katz | ............ | G01S 19/12 342/357.65 |
| 2013/0187810 A1* | 7/2013 | Leclercq | ............ | G01S 19/46 342/357.29 |
| 2013/0332072 A1 | 12/2013 | Janky et al. | | |
| 2014/0104102 A1* | 4/2014 | Enge | ............ | H04W 4/02 342/357.42 |

OTHER PUBLICATIONS

"The Global Positioning System," vol. 1, pp. 97, 105, 369, 370 and 371, AIAA, 1996.

A. Camps, A. Cardama, D. Infantes; "Synthesis of Large Low-Redundancy Linear Arrays"; IEEE Transactions Aon Antennas and Propagation, vol. 49, No. 12, pp. 1881-1883, Dec. 12, 2002.

N. A. Goodman, J. M. Stiles; "Resolution and Synthetic Aperture Characterization of Sparse Radar Arrays"; IEEE Transactions on Aerospace and Electronic Systems; vol. 39, No. 3, pp. 921-934; Jul. 2003.

"Department of Transportation Federal Aviation Administration Performace Specification"; FAA-E-2963, Table of Contents; pp. 1-63; Sep. 21, 2004.

W.A. Van Cappellen, S.J. Wijnholds, J.D. Bregman; "Sparse Antenna Array Configurations in Large Aperture Synthesis Radio Telescopes", 4 Pgs., The Netherlands.

T. Pattison, S.I. Chou, "Sensitivity Analysis of Dual-Satellite Geolocation"; IEEE Transactions on Aerospace and Electronic Systems, vol. 36, No. 1, pp. 56-71; Jan. 2000.

S. Perlman, A. Forenza; "Distributed-Input-Distributed-Output (DIDO) Wireless Technology—A New Approach to Multiuser Wireless", Rearden LLC Patents/Patents Pending, pp. 1-19.

I.Y. Bar-Itzhack, N. Berman, "Control Theoretic Approach to Inertial Navigation Systems"; American Institute of Aeronatics and Astronautics, Inc., pp. 1442-1453, 1987.

R. R. Hatch, "A New Three-Frequency, Geometry-Free, Technique for Ambituity Resolution"; 8 Pgs; Navcom Technology, Inc.

S. Shambayati, "Atmosphere Attenuation and Noise Temeprature at Microwave Frequencies" Chapter 6; pp. 255-281.

R. L. Haupt, "Thinned Arrays Using Genetic Algorithms"; IEEE Transactions on Antennas and Propagation, vol. 42, No. 7, pp. 993-999; Jul. 1994.

Y.T. Lo; "A Mathematical Theory of Antenna Arrays With Randomly Spaced Elements"; pp. 257-268; IEEE Transaction on Antennas and Propagation.

L. Bledjian, D.V. Hale, M.J. Hoover, M.J. O'Neill; "11 Phase-Change Materials"; The Aerospace Corporation; pp. 373-403; El Segundo, CA.

M. Joerger, L. Gratton, B. Pervan, C. Cohen; "Analysis of Iridium-Augmented GPS for Floating Carrier Phase Positioning"; Journal of the Institute of Navigation, pp. 137-160, vol. 57, No. 2, Summer 2010.

J. Dong, Q. Li; "Antenna Array Design in Aperture Synthesis Radiometers"; Huazhong University of Science and Technology; pp. 169-193; Wuhan, China.

* cited by examiner

System Concept of Operations

Satellite Payload Architecture

RF Transmit/Receive Module

Payload Baseband Functional Architecture

Nanosatellite Physical Configuration

Nanosatellite Reference Design Evolution

LEO Broadcast Geometry

LEO Orbital Geometry

LEO-GNSS Geometry

Constellation Code Re-Use Example

Constellation Single-Launch Configuration

Constellation Deployment

Plane Phased Deployment

Service Data Processing

User Equipment Hardware

Receiver Navigation Processing Architecture

Availability of Integrity

Sensor Fusion and Safe
Scaling of Integrity

Improved Performance Under Interference

Adjacent Broadband Spectrum

Civil Transportation System of Systems

Use of Mixed Satellites and Probe Vehicles

Ionosphere and Troposphere Projection

Signal Design and Non-Interference Analysis

Civil Signal Authentication Overlay to GNSS

User Position Authentication

User Position Authentication (Low Trust)

User Position Authentication (Medium Trust)

User Position Authentication (High Trust)

Use of Uncalibrated Spacecraft Clock

Extension to Urban Operation I

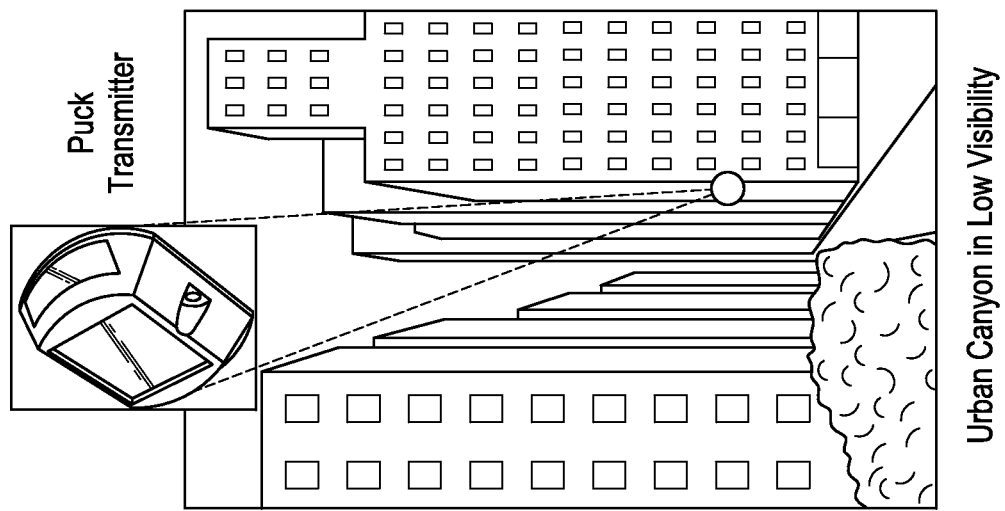
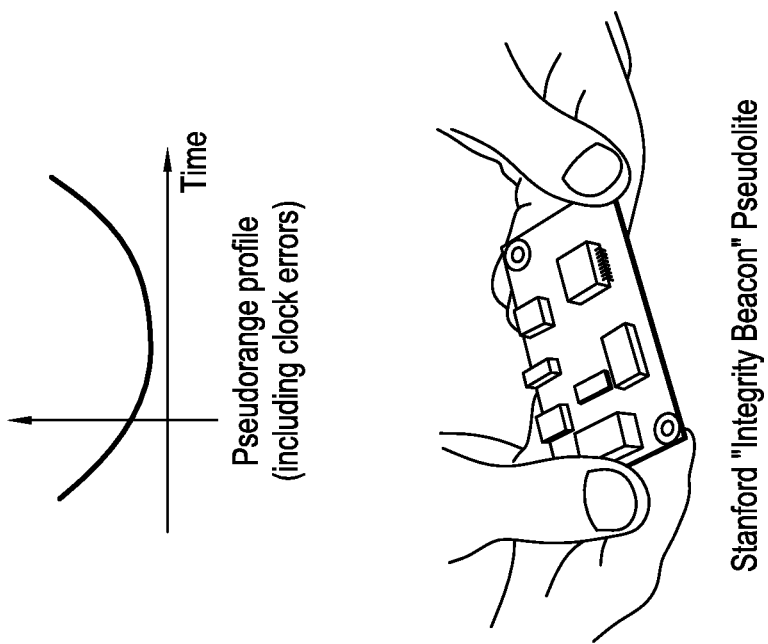
FIG. 30
Extension to Urban Operations II

Anti-Jam/High Elevation
Angle Architecture

Anti-jam CONOPs

Power Amplifier Thermal Management

Spacecraft Power and Thermal Side View

Spacecraft Conceptual Design

Rapid Acquisition Accuracy and Integrity

Emitter Geolocation CONOPS

Emitter Geolocation Geometry

Crosslink Occultation Geometry

Fig. 6-A. Water vapor absorption coefficient versus frequency, $T = 300$ K, $P = 1013$ mbar ($1.013 \times 10^5$ Pa), relative humidity = 25 percent.

K band Water Vapor Absorption Line

Global View
Time Evolution

Initial Epoch

Subsequent Epoch

Programmed Operations Timeline

Regional Distributed Aperture

Global Distributed Aperture

High Resolution Antenna pattern

Distributed Aperture Satellite Element

Solar Pressure Translation Modes

FIG. 51
Deployment and Aperture Area
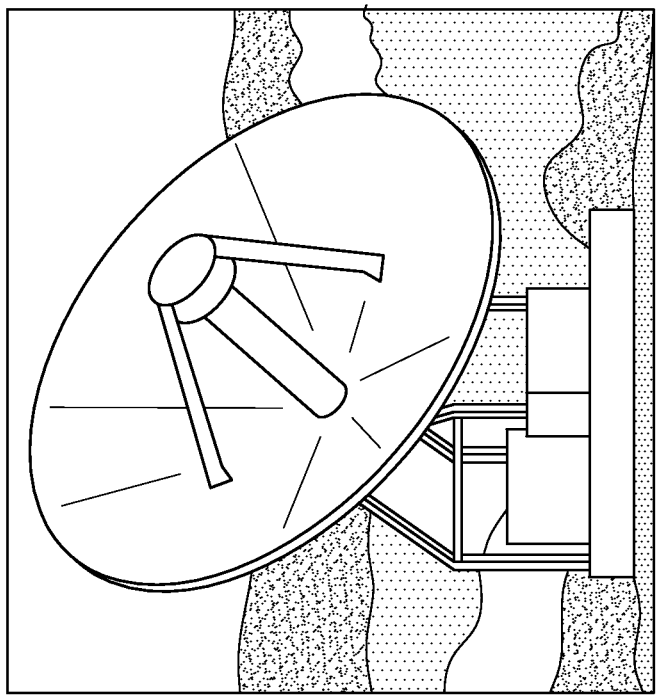
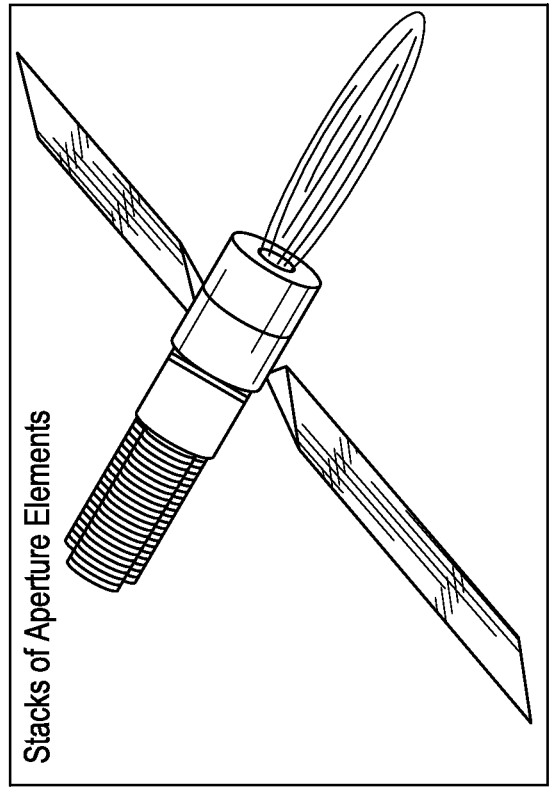
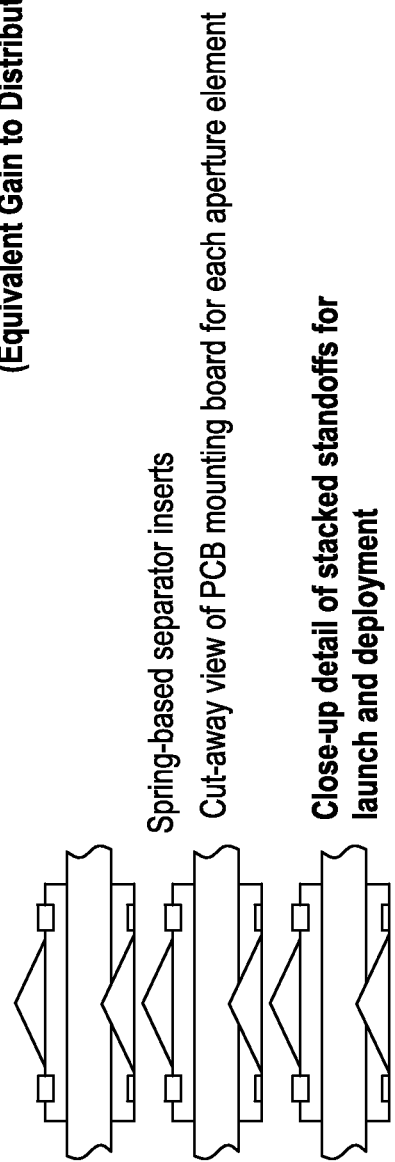

Advanced Payload Semiconductor Modules

Spacecraft-level Digital Routing

Centralized Beamforming

Hub Spacecraft Digital Routing

Distributed Beamforming

Constellation Architecture Trade Space

Advanced Spoofing

PERFORMANCE AND COST GLOBAL NAVIGATION SATELLITE SYSTEM ARCHITECTURE

This application claims the benefit of U.S. Provisional Patent Appl. Ser. No. 61/944,752, filed Feb. 26, 2014.

BACKGROUND OF THE INVENTION

The United States Global Positioning System (GPS) satellite constellation is an enormous success, offering reliable, three-dimensional, real-time positioning to users on a global basis. Its breadth of use is vast, encompassing military, civil, and commercial applications. Other nations are emulating the success of GPS by implementing their own satellite constellations. These include the Russian GLONASS, Chinese Beidou, European Galileo, and the regional Japanese QZSS and Indian IRNSS. Collectively, such satellite systems are known as Global Navigation Satellite Systems (GNSS).

Nevertheless, several issues frustrate advancement in that there are technical opportunities for significantly improved performance and capability provided by GNSS. These issues relate to (i) rapid acquisition of accuracy and integrity for transportation applications, (ii) military availability of GPS, and (iii) radio frequency spectrum crowding. At the same time, there is increased pressure for return on investment both in the public and private sectors. Concerns also relate to the susceptibility of GNSS to interference and tampering, including jamming, spoofing, and proof of position.

The Federal Aviation Administration (FAA) is leading a transformation of the nation's air traffic system into a new initiative called NextGen, emphasizing satellite-based Navigation and Automatic Dependent Surveillance-Broadcast (ADS-B).

Europeans and other countries are embarking on similar modernization. However, despite the enormous benefits of increased capacity brought to aviation and the National Airspace (NAS) by GPS, several concerns about potential vulnerabilities remain, in particular, that of interference—either intentional or unintentional. While the capabilities of GPS are significant, the system has a very low broadcast power. Even a 1-Watt jammer in the GPS band in the vicinity of an airport terminal area could cause major disruption. There is also a spoofing and tampering concern. In this scenario, a malevolent party would attempt to introduce misleading signals to make controllers think that aircraft are in a different place than they really are, possibly causing harm to people and/or property.

Another tampering-related concern is the increasing demand for Unmanned Aerial Systems (UAS) in the NAS, particularly commercial UAS. Military UAS can carry receiver equipment that employs the military encrypted GPS broadcast, thereby protecting against spoofing. Commercial UAS users are ineligible to integrate such controlled equipment and are therefore more vulnerable to spoofing. In aircraft surveillance, aircraft also need to reliably prove their position to third parties. Additional vulnerabilities can arise under these circumstances.

Much of the potential cost savings that has been intended with ADS-B through the phase-out of legacy Secondary Surveillance Radar (SSR) may not materialize for decades due to the concern over interference. It may take that long to accumulate the operational experience and confidence to retire legacy navigation aids. In the meantime, the FAA is pursuing an Alternate Position, Navigation, and Timing (APNT) program that would implement a backup means of positioning independent of GPS. Unfortunately, the costs associated with carrying the legacy SSR system, the new GPS-based ADS-B system, plus a new backup APNT system may become significant.

The cost of navigation and surveillance infrastructure is significant, typically borne by the Air Navigation Service Provider (ANSP)—the FAA in the case of the United States. Also significant are costs of avionics on board the aircraft, paid for by the aircraft owner or user. Insertion costs of a new capability must be justified by their benefits or there will be no incentive to move ahead in air traffic management modernization. This is especially true in the case of a retrofit. Given that the typical aircraft operational lifetime is 30 years of service with the same initial suite of avionics, the time constant of innovation can be long.

What are needed are new protections to GPS and GNSS increasing the resiliency to unintentional interference, jamming, and spoofing. What is also needed is a means to quickly localize and disable interference emitters. Aircraft need to carry protections against interference when it is happening, and the ground capability needs to be able to respond in a timely manner to minimize the duration of any disruption. Furthermore, insertion of the new protections ideally needs to require minimal changes to aircraft avionics. Such new protections should require little, if any, change-out of avionics hardware.

Integrity is a positioning system's knowledge that it is outputting non-hazardous information. What would also be beneficial to aviation is applying new accuracy and integrity capability to a better-protected, more resilient GPS to achieve lower landing minima using satellites. The FAA Wide Area Augmentation (WAAS) System is designed to ultimately enable aircraft to land to a visibility down to a 200 ft decision height. Improved GNSS accuracy, integrity, and interference resilience could enable GNSS to be used for autoland and conditions of zero visibility. The end result would be more safe, on-time arrivals in worse weather conditions at more airports worldwide all for lower cost.

Intelligent automobile transportation can also benefit from improved GNSS functionality—especially when integrated with a vehicle-to-vehicle (V2V) data link to exchange precise position information. In accident avoidance and where-in-lane driverless car applications, a sensor needs to provide dependable, centimeter-level position information. Position sensors, including cameras, Inertial Measurement Units (IMUs), RADAR, and LIDAR, are based on a variety of physical principles. Every sensor has its strengths and weaknesses in terms of operating environment. Practical systems integration must be conscious of cost and should also employ a diversity of sensors to achieve an overall robust solution.

Cameras are low cost but are subject to blockage, errors in computer-based scene interpretation, and degradation under low visibility conditions, such as fog, rain, and snow. RADAR is also low cost and operates in all weather conditions, but does not provide complete situational awareness. RADAR requires line of sight in its directions of use and may be blocked by other vehicles or obstacles. IMUs—especially Micro-Electro-Mechanical Systems (MEMS)—can be made low cost and provide excellent short-term precision. However, IMUs are subject to drift and must be calibrated continuously by an independent source of positioning. LIDAR provides comprehensive situational awareness, but remains costly for the time being. Furthermore, LIDAR is subject to degradation under poor visibility conditions. Lastly, the above positioning sensors generally do not possess intrinsic means for deriving integrity.

What is needed is a reliable means for fusion of diverse sensor types and a means to reliably improve GNSS to the centimeter-level under challenging environmental conditions, including poor visibility and radio frequency interference, with built-in, safety-of-life-class integrity that converges to an operational status from a cold start within a few tens of seconds. Of all the candidate automobile sensors, only GNSS is able to provide absolute position accuracy, i.e., relative to an Earth-fixed coordinate system. Such a robust positioning capability including both accuracy and integrity would also be beneficial to real-time map maintenance and IMU calibration.

The military is also concerned with GPS modernization. However, the military does not generally have an accuracy or integrity requirement for most missions. The military does, however, have a need for increased availability under blockage conditions, including urban canyons and mountainous conditions. What is needed is a cost-effective means of increasing the number of military space-based positioning, navigation, and timing (PNT) ranging sources accessible to users.

The military is also facing significantly increased costs in attempting to increase GPS signal power. The large-diameter, deployable antennas contemplated for use in Medium Earth Orbit (MEO) are challenging to manufacture and expensive. What is needed is an approach to increasing the power of military space-based PNT that costs less.

Agriculture, survey, and offshore applications currently use aiding networks such as OmniSTAR, StarFire, and Veripos to GPS for global, sub-decimeter precision navigation. However, these systems are not designed to provide integrity to suppress bad position fixes. They can also take as long as 45 minutes to converge from a cold start. Offshore users also need resilient coverage, especially for critical services like dynamic platform positioning. What is needed is a means of accelerating startup time, expanding to true global coverage, and providing new avenues for resiliency.

GPS Modernization has led to the introduction of a third civil frequency. Proponents of the third civil frequency argue that it will allow ionosphere estimation and rapid cycle ambiguity resolution across long baselines [Reference 1]. Unfortunately, such an approach introduces issues, including navigation that does not degrade gracefully in the presence of faults or rare normal conditions. Furthermore, introduction of the new frequencies is planned to take several years before a full GPS constellation is operational.

Three prior art inventions [References 2 through 4] employ constellations of Low Earth Orbit (LEO) satellites, including Iridium and Globalstar, to provide increased accuracy performance. These inventions advanced the art but nevertheless have presented practical obstacles in attempts at actual implementation. In the nearly two decades since the referenced applications were filed, the applicants are not aware of any operational or planned embodiments.

The United States Navy, working with contractors Boeing, Iridium, Rockwell Collins, and Coherent Navigation, has developed a system [References 5 and 6] that employs Iridium as a means of improving GPS jamming resistance for military purposes. This system uses aiding from the Iridium constellation and coherent detection to improve the jamming resistance applicable to ordinary GPS receivers. While such an approach for interference rejection may be beneficial for certain specific applications, in a broader context it requires dedicated new user equipment components to operate in a new band at power levels that are not consistent with the existing GPS system design. What is needed is an even more practical means to bring about interference rejection in high-accuracy and integrity, cost-sensitive GNSS applications.

The FAA WAAS provides accuracy of a few meters and safety-of-life integrity for precision approach and landing—ultimately by design down to a 200 ft decision height. However, its design does not fare well under interference. For example, even a small amount of jamming can cut off the data messages that are the underpinning of the WAAS. This means that alerts and differential corrections are unavailable. Furthermore, GNSS ranging measurements are also degraded or lost during interference. What is needed is improved resilience to interference for civil and commercial transportation users in a practical way with a minimum of hardware changes.

Spectrum is an emerging issue in PNT. Recent efforts have sought to establish a broadband network in the band adjacent to GPS. Front-end radio frequency filters in the installed base of tens of millions of GPS receivers assume a power level in that adjacent band understood to be significantly less than the new proposed plans. Current trends are evolving towards increased spectrum management necessitate the de-confliction of applications. Especially for safety-of-life applications, such as aviation and automobiles, what is needed is a timely technical approach to space-based PNT architecture that is efficient with spectrum and is able to co-exist safely without degradation with broadband applications running in adjacent bands.

From a military perspective, a requested extensions to GPS that would add spot beams to the satellites have not been funded. Furthermore, there is growing DoD interest in increasing the number of GPS satellites to 30 from the current requirement of 24 to improve availability due to masking. What is needed is new military performance, including high mask angle visibility and continuous regional high power that can be affordably implemented in the near-term.

SUMMARY OF THE INVENTION

The invention provides improved, worldwide GNSS performance with protections against interference and tampering that is cost effective. The broadcast in the GNSS band is compatible with existing user equipment based on typically only a software change. An early application of the data and precise ranging signal is next generation of transportation mobility, including aviation navigation and surveillance and automobile accident avoidance and where-in-lane positioning. For automobiles, requirements include centimeter-level accuracy, safety-of-life integrity of a 1 m Alert Limit and vanishing probability of hazardously misleading information per exposure, and a cold-start acquisition time of a few tens of seconds. To properly introduce the era of the automobile autopilot, guidance must be impeccably reliable and ubiquitous. The high integrity capability also applies to military applications, including carrier landing of manned and unmanned aircraft as well as formation flight. For military applications, additional GNSS availability at higher mask angles and higher power are also provided. And for heavy machine control, including agriculture, survey, mining, and offshore applications, rapid convergence of accuracy is provided.

The solution is based on carrier phase and coherent detection, thereby providing high precision. Such coherent detection is leveraged as the basis for accuracy, integrity, and interference rejection. The invention uses a LEO constellation to provide users with rapid angle motion and favorable geometry globally at all times. The rapid angle motion helps to convert precision to accuracy, achieve safety-of-life level integrity, and rapid cold-start convergence. Integrity is provided mostly through Receiver Autonomous Integrity Monitoring (RAIM). The combination of carrier phase precision, rapid angle motion, and the practical system architecture described herein take RAIM to a new level of performance.

From statistics reported on the Department of Transportation (DOT) ITS website, enabling increased accident prevention and driverless cars, improved transportation systems can potentially save thousands of lives and billions of gallons of gasoline each year. The invention provides its navigation accuracy and integrity performance at low cost. Because the invention requires only narrow band carrier phase, code spreading is no longer needed explicitly for timing and ranging. Therefore, only a minimum spectrum bandwidth is needed for GNSS—theoretically less than 100 kHz. Civil GNSS can co-exist with high-power broadband, thereby making valuable spectrum more accessible.

The invention also applies Public Key Infrastructure (PKI) and networking principles to the LEO satellites to enables them to be used securely with any defined GNSS code. Similar techniques can be used for civil purposes to provide a civil authentication overlay to GPS. The invention introduces a watermark and special data in the signal that can be independently verified and cross-checked with the RAIM integrity solution. Such an overlay can provide comprehensive checking with tight thresholds for existing aviation receivers and new UAS receivers so as to be operational within just a few years. No changes to the GPS constellation are required.

By also providing a platform for broadband sampling registered in time and space, the invention also provides a means for geolocating spurious emitters. Therefore, any scenario is covered. The user equipment works to defeat interference and spoofing in real time such that operations can continue. In the meantime, the invention provides timely information leading to the source of the interference, thereby speeding takedown time and return to normal operations. Both military and civil applications are viable. The invention operates on arbitrary waveforms. The rapid angle motion even works with narrowband emitters whose cycle ambiguities otherwise introduce cycle ambiguities.

BRIEF DESCRIPTION OF THE DRAWINGS

FIG. 30 shows an extension to urban operations using elevated pseudolites.

FIG. 51 shows the deployment configuration for the distributed aperture.

DETAILED DESCRIPTION OF PREFERRED EMBODIMENTS

It is an object of the invention to provide both high performance, globally scalable PNT—even under interference, jamming, spoofing, and other tampering—yet drive towards low cost, while particularly enabling the use of existing user equipment when upgrading the installed base is otherwise prohibitive. Traditionally, the response to higher power interference is a higher power signal. Rapid angle motion and the coherent precision of carrier phase provide an underlying physical foundation for improved performance. It is an object of the invention to apply new information, networks, global agility, and advanced signal processing to accomplish improvements in availability, assurance, and resiliency that are affordable.

Global Architecture

Figure 1:
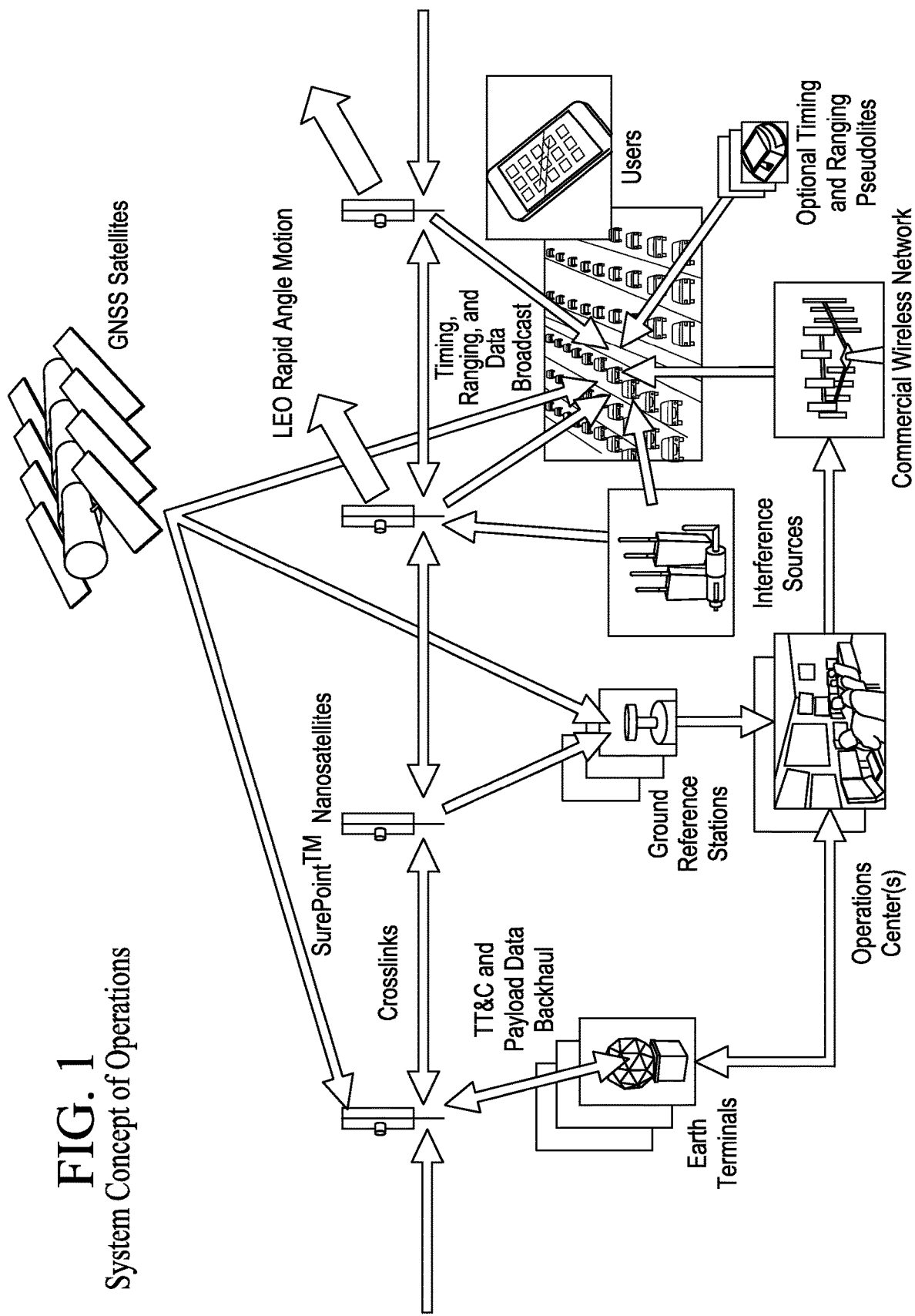
FIG. 1 shows the concept of operations (CONOPS) of the overall system.

The overall system concept of operations, as depicted in FIG. 1, is a distributed, networked system robust to failures, interference, and attacks. In the preferred embodiment, each satellite employs single-string redundancy. Augmenting the GNSS satellites, the architecture adds multiple, low-cost satellite and pseudolite timing and ranging sources, crosslinks, feederlinks, and ground processing centers.

In FIG. 1, GNSS satellites broadcast normally. Typically, the ionosphere is a major error component of error and potential hazardously misleading information for navigation. The preferred embodiment employs dual-band dual band to eliminate or reduce ionosphere error and minimize the number of ground stations required. Furthermore, the existing GNSS bands are employed. The architecture leverages existing and planned user equipment with little or no hardware modification and existing ITU protections for safety-of-life spectrum. Their timing and ranging signal broadcasts are calibrated using a network of ground stations around the world.

These raw measurements are conveyed to one or more operations centers. A constellation of SurePoint™ Nanosatellites broadcast a timing and ranging broadcast for users and the monitor network worldwide. The SurePoint™ satellites receive the GNSS signals via a zenith-mounted antenna and convey measurements to the operations centers via the Payload Data Backhaul. TT&C and other payload data and commands are conveyed through this same backhaul and Earth Terminal (ET) connected to the Operations Center. Crosslinks provide two-way timing and ranging measurements between any given pair of SurePoint™ satellites in view of each other that is independent of GNSS. The Operations Center estimates GNSS and LEO satellite orbits, clocks, GNSS data for wipe-off purposes, and monitors the integrity of the ground and space segments. The Operations Center information is relayed to Users using the PNT LEO Data Broadcast via the Payload Data backhaul as the primary means with backup means via one or more terrestrial broadcast paths, including the commercial wireless network. Free-running pseudolites provide additional fill-in coverage, especially in urban areas. The signals in space provide overall means for robust, high-performance user positioning, including RAIM integrity. The system architecture allows user equipment to continue operations in the presence of interference or spoofing.

Accurate orbit determination is an ongoing, continuous process. Predictions are available at all times. Observables and data originate from one or more of the following sources ionosphere-free, code and carrier observables: zenith antenna measurement of GNSS, ground station measurements from the nadir mission antennas, two-way crosslinks between pairs of SurePoint™ satellites, and data backhaul received and transmitted via Earth Terminals.

If GNSS is unavailable worldwide, the crosslinks and downlinks provide sufficient observability to predict the orbits. In the preferred embodiment, the system is also capable of predicting orbits across regions of operation where interference or other unavailability temporarily suppresses the arrival of fresh orbit determination observables.

Real-time updates from the same set of observables listed above for orbit determination are also applicable to calibrating the spacecraft clocks in real time. However, unlike for orbit determination, it is an object of the invention to be able to operate (i) without atomic clocks on the satellites and (ii) without real-time calibration at all. If interference or other unavailability bring down any combination of downlinks and/or data links or otherwise isolate the SurePoint™ satellite, the transmitters on the satellite will continue to function and provide timing and ranging for users up to the interference-to-signal cut-off threshold.

It is an object of the invention to employ only sparse global ground station network coverage rather than require a dense mesh of ground stations near users. Each ground station sends pseudorange code and carrier observables over a reliable terrestrial data link to the service data processors. In the preferred embodiment, some ground stations have a direct hard line feed from the United States Naval Obseratory (USNO) Master Clock to maintain a reference to Universal Coordinated Time (USNO) even in the event that GPS is lost.

In the preferred embodiment, there are multiple service data processors distributed on the network to provide redundancy in case of failure. In principle, service data processors can also be located in space, possibly co-located on a SurePoint™ timing and ranging satellite.

The network also needs to generate wipe-off data bits for some of the waveforms, for example for GPS C/A code. Mixing the waveform with the incoming wipe-off bits delivered through the wireless broadcast produces a pure carrier for sustained integration. Carrier reconstruction is simplified for modernized signals, which carry a data-less, pilot component. In the preferred embodiment, a combination of live streaming of data bits is combined with a predictive implementation that exploits known repeating characteristics in the GPS data stream.

Satellite and Constellation Design

Figure 2:
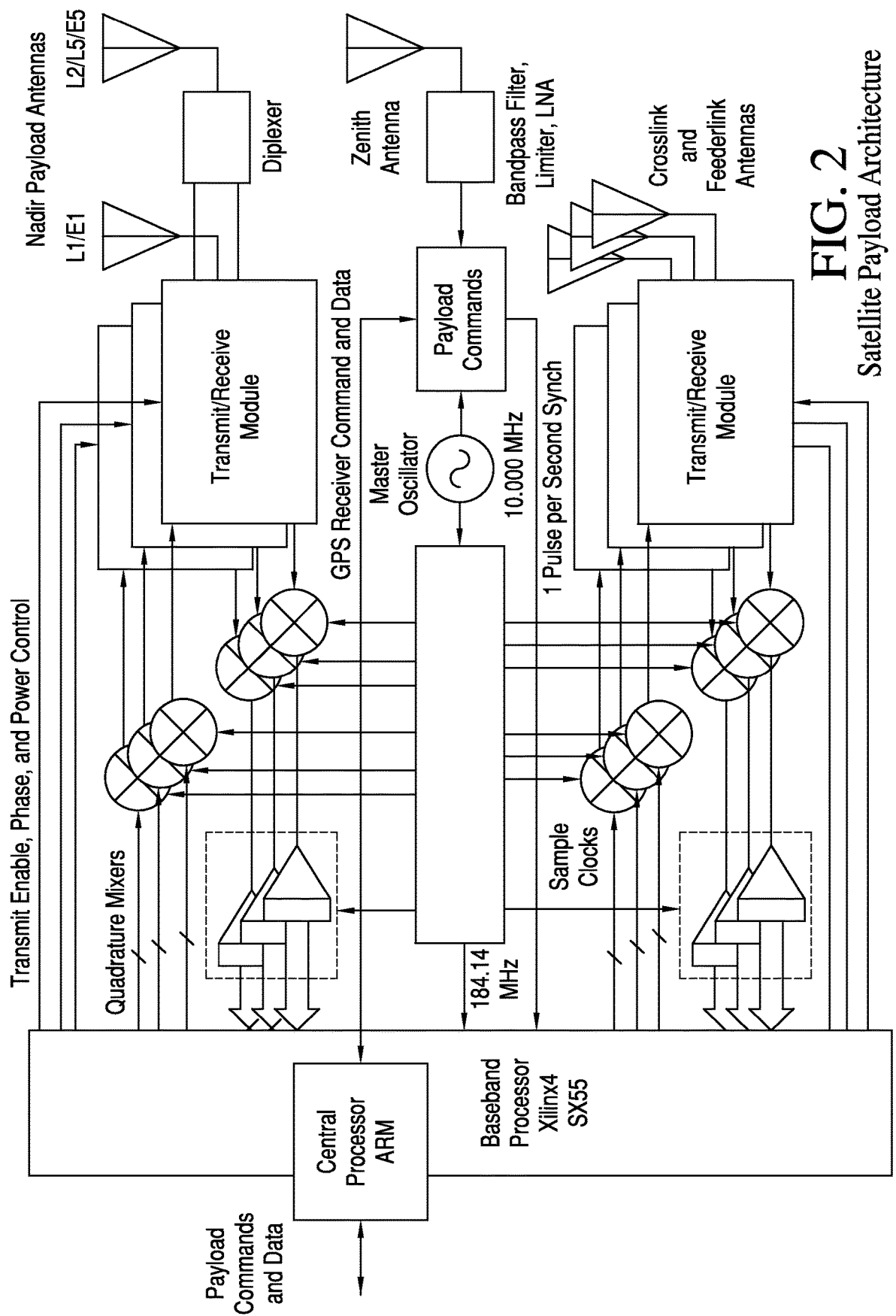
FIG. 2 shows the SurePoint™ satellite payload architecture.

FIG. 2 shows the SurePoint™ satellite payload architecture. A central processor, such as an ARM, coordinates the onboard functions. Signal processing occurs in an FPGA, such as a Xilinx 4 SX55. All signals are synchronized to the master oscillator. Broadcast occurs via a quadrature phase shift key (QPSK) modulator. Power is controlled to emulate the same terrestrial received power as specified by comparable GNSS signal definitions. The nadir r.f. broadcast levels are typically on the order of 1 Watt for any given GNSS band. In the preferred embodiment, the GNSS signals cover at least the GPS bands, L1, L2, and L5, and the Galileo bands, E1 and E5. Additional signals from any GNSS may also be supported. A set of nested, isoflux quadrifilar helix antennas are used for the nadir payload antennas used for both broadcast and emitter localization. A/D converters couple the uplink signals to the digital processor. A GPS receiver is hardware and software synchronized to the master oscillator.

Enabling the navigation payload broadcast can be scheduled by region of the Earth, thereby saving considerable power on satellites. For example, the SurePoint™ satellites can broadcast GPS-like civil or commercial signals over the U.S. and its coastlines, Galileo over Europe and its coastlines, and U.S. military signals over conflict areas.

The feederlink backhaul and crosslinks operate at K band. A software router is implemented in the central processor to support the feederlinks, crosslinks, and payload downlinks.

Figure 3:
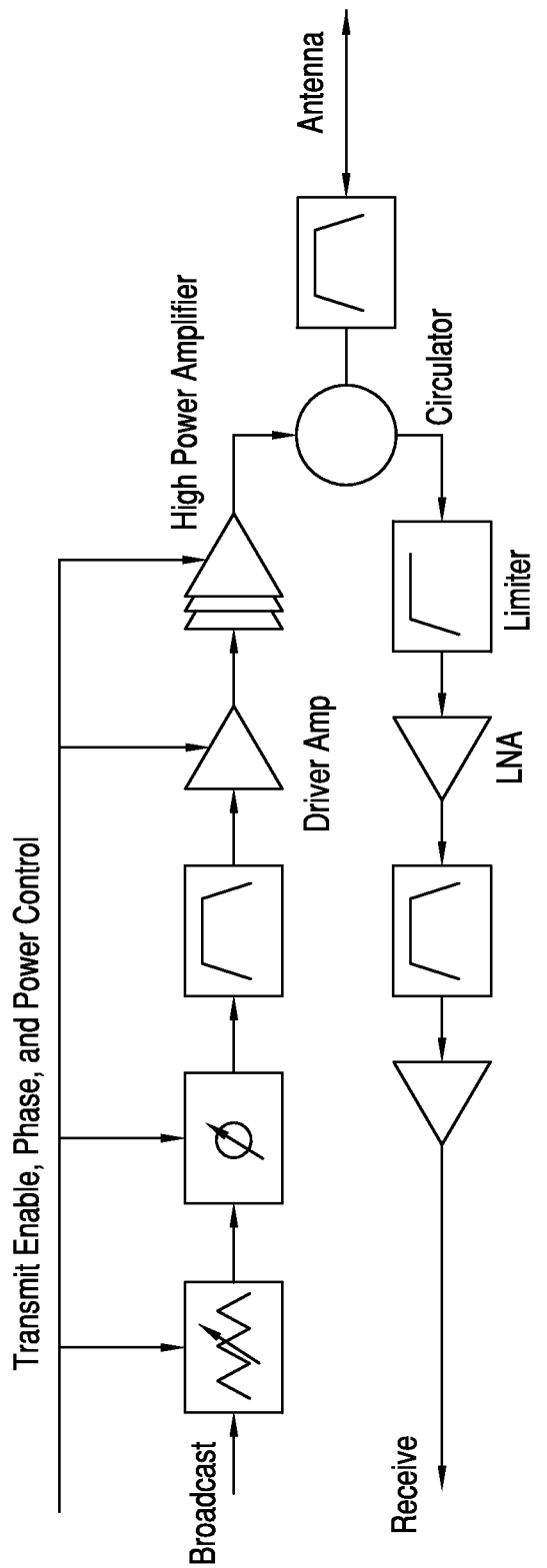
FIG. 3 shows the transmit/receive module for the satellite payload.

The Transmit/Receive module for the satellite payload is shown in FIG. 3. Phase and power control provisions enable the payload, feederlink, and crosslink antennas to be configured as shaped beam phased arrays if necessary.

Figure 4:
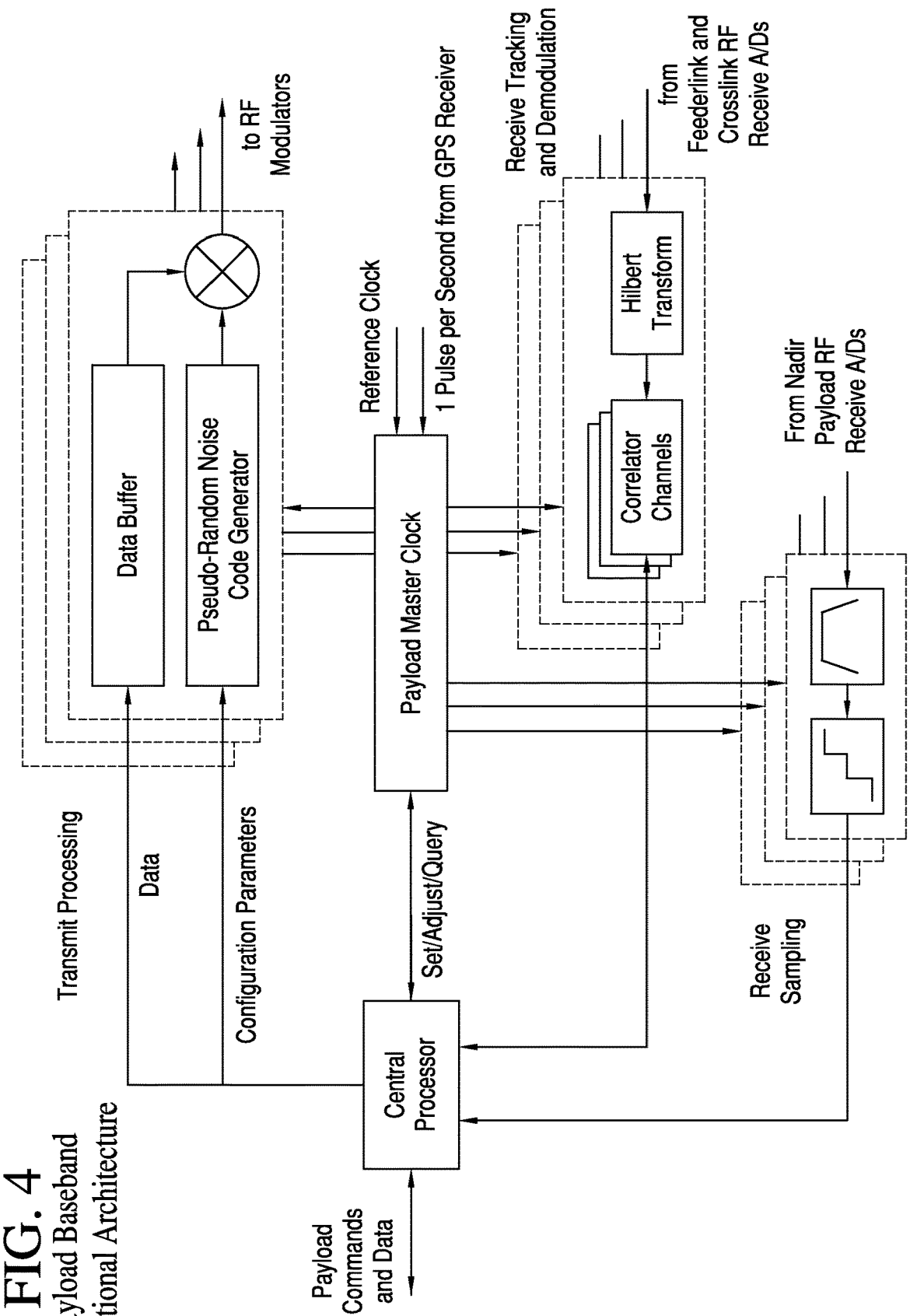
FIG. 4 shows the payload baseband functional architecture.

The Payload Baseband Functional Architecture in FIG. 4 shows the implementation of the signal processing in the FPGA. The Payload Master Clock keeps digital time for the spacecraft to the nearest reference clock edge. Based on the GPS receiver pulse per second hardware output, the payload clock can also be aligned with the GPS receiver clock. A transmit processing function employs a pseudo-random noise code generator and a data buffer to construct timing, ranging, and data broadcast signals for the payload downlink, feederlinks, and crosslinks. A receive tracking and demodulation function converts incoming feederlink and crosslink signals to a received data stream and timing and ranging code and carrier phase observables. The central processor steers the correlator channel numerically controlled oscillators to close the tracking loops. For emitter localization applications, a receive sampling function performs pre-processing, such as notching, and compression, including band limiting.

Figure 5:
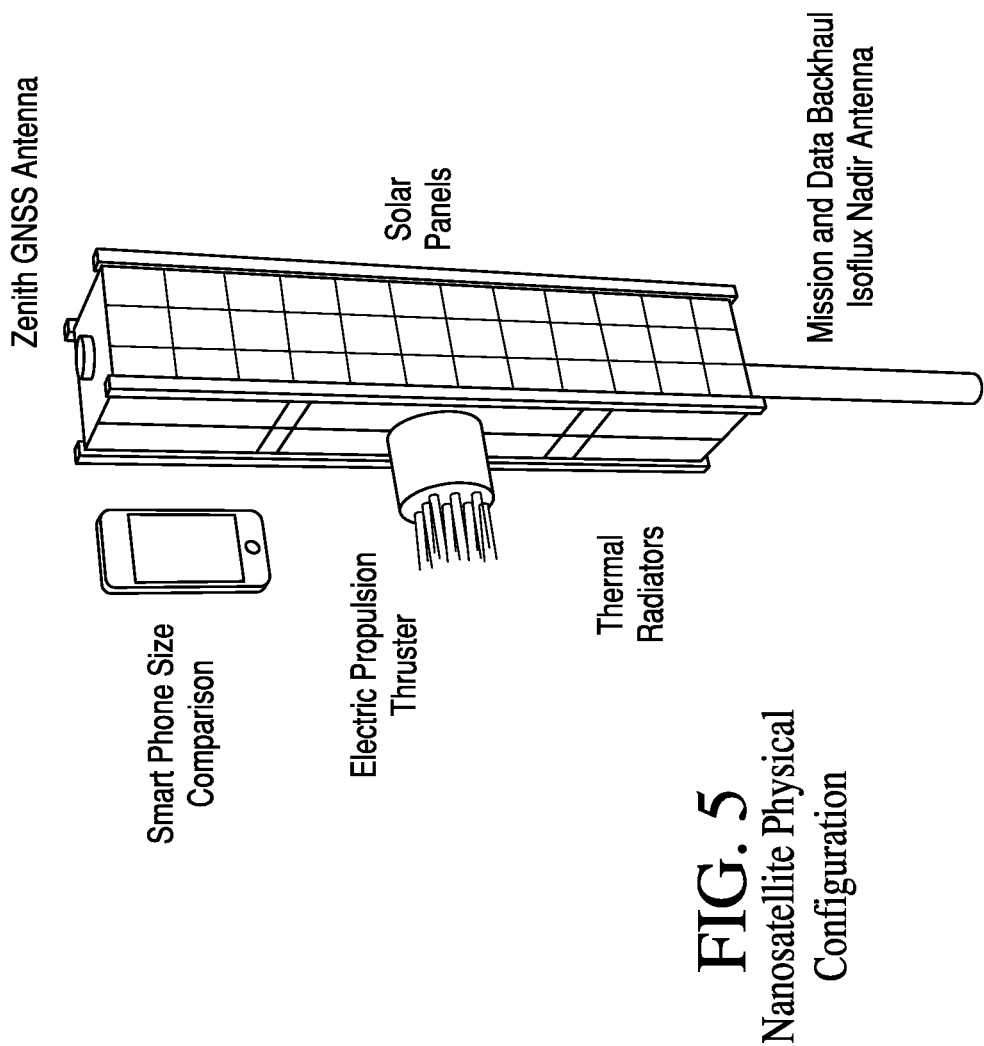
FIG. 5 shows the physical configuration of a stand-alone satellite.

FIG. 5 shows the physical configuration of a stand-alone satellite. This prototype has an estimated mass under 10 kg, thereby fitting the definition of a nanosat. The small footprint of the SurePoint™ satellite requires only about 1 r.f. Watt for each broadcast signal for the received signal power by the user to be consistent with that of GPS. The bus shown is a 5 U form factor measuring 10×10×50 cm. The hemispherical zenith antenna is shown along with the nadir isoflux mission antenna. The vertical form factor of the satellite is consistent with passive gravity gradient attitude stabilization as a backup, wherein active 3-axis control is used as primary. An electric propulsion thruster is shown firing in the along track direction for orbit insertion and stationkeeping.

Figure 6:
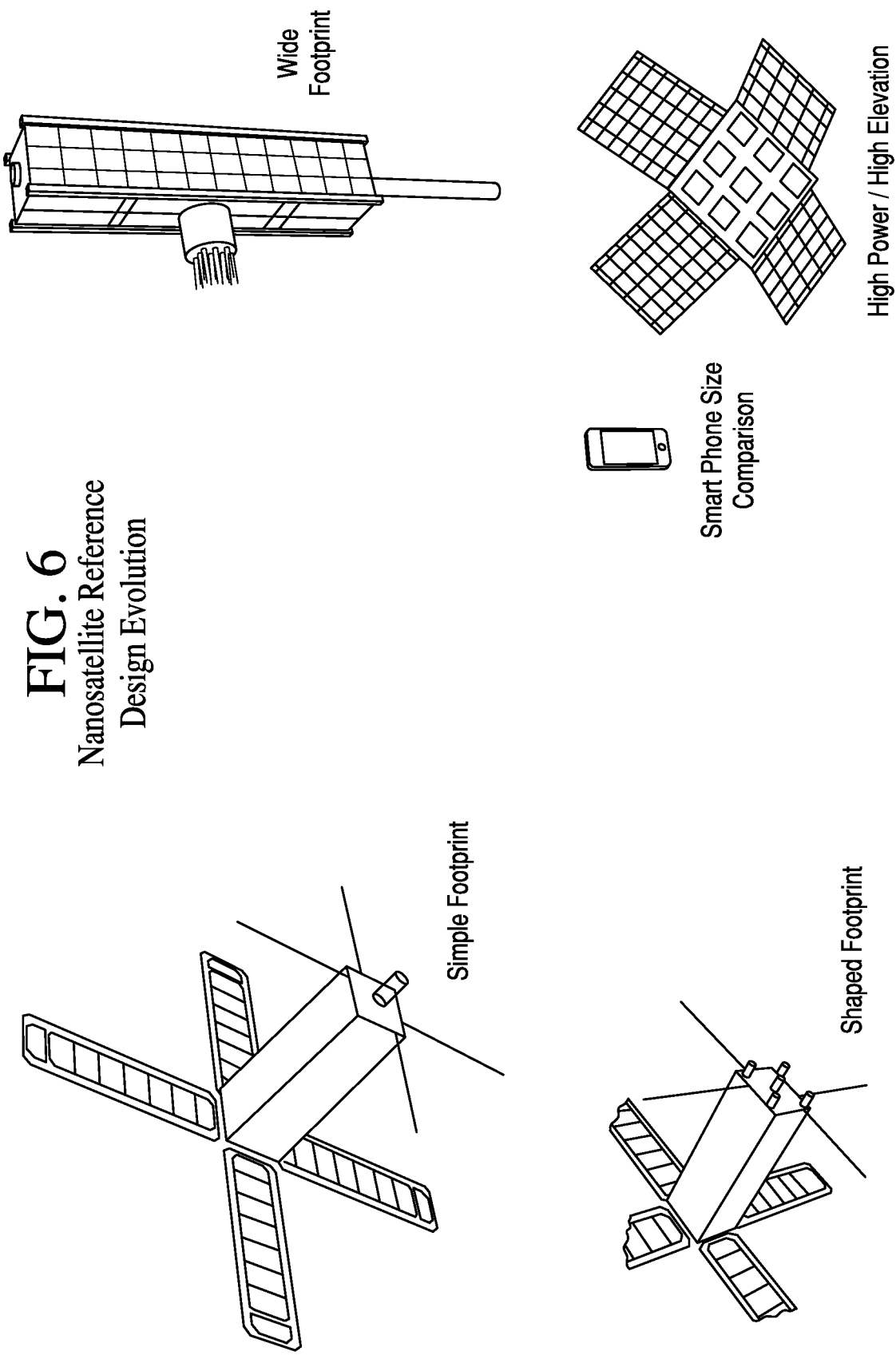
FIG. 6 shows satellite reference design evolution.

The Satellite Reference Design Evolution is shown in FIG. 6. A compact quadrifilar helix at upper left produces a simple, narrow footprint. Depending on phasing, an array shown at lower left uses multiple compact antennas to approach an isoflux pattern or otherwise form distinct beams. At the upper right, a quadrifilar helix forms a wide footprint isoflux pattern. The antenna can also be nested in different bands. Employing 1.5 turns and a length-to-diameter ratio of 10, this antenna can provide uniform LEO isoflux within a band of 6 dB with an axial ratio much better than 2 dB across all elevation angles down to 5 deg, thereby meeting FAA WAAS received signal power requirements [Reference 7]. At the lower right, an array of patch antennas forms a directed beam suitable for military high power and high elevation angle use. Use of custom MMICs for the T/R modules, up/down converters, ADCs, and DACs significantly reduces the size and cost of each satellite.

Figure 7:
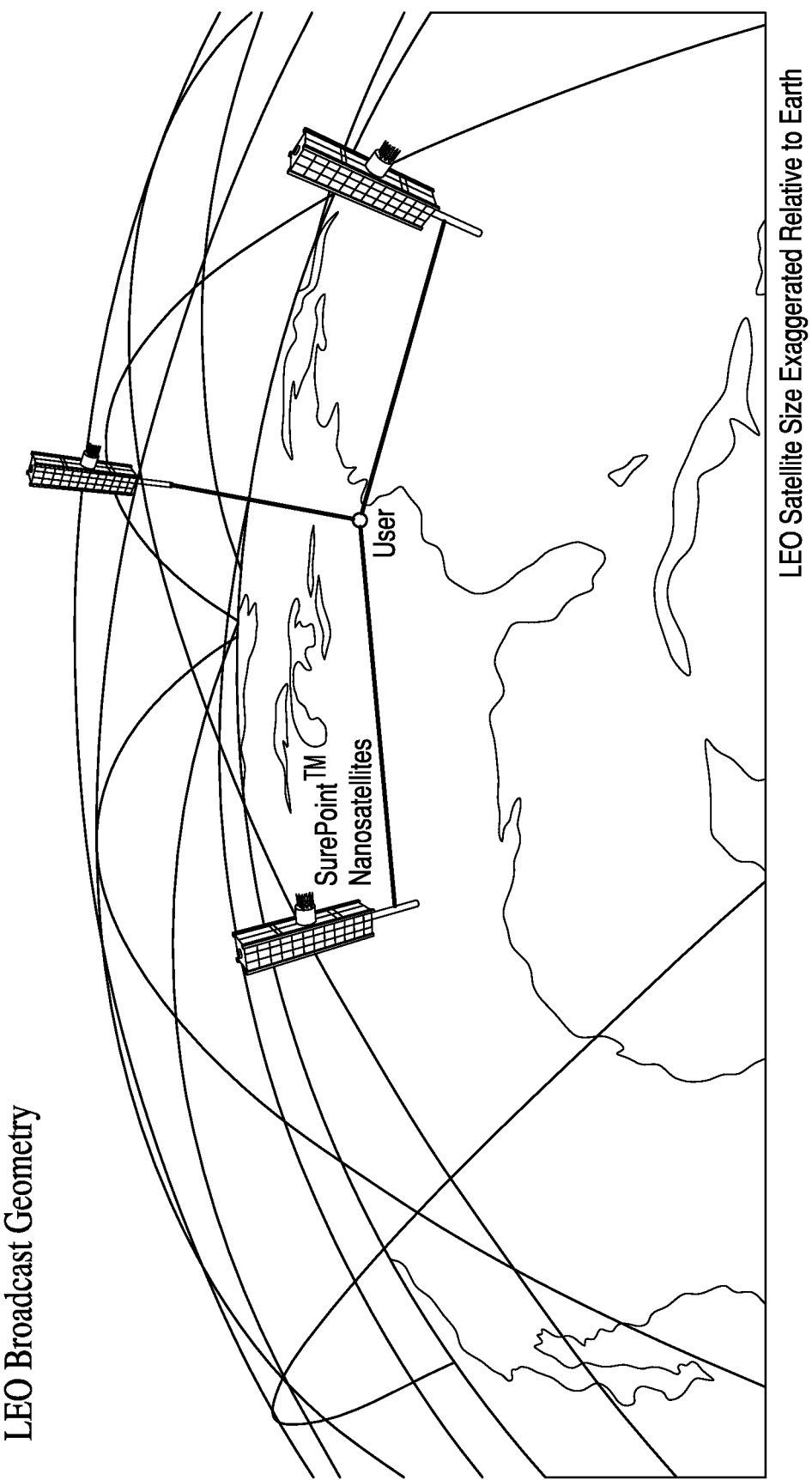
FIG. 7 shows the physical LEO broadcast geometry.

FIG. 7 shows the physical LEO broadcast geometry. The orbits are shown to scale, with the satellite size exaggerated. The magenta orbits depict examples of a baseline deployment, nominally providing at least two SurePoint™ satellites in view at a time. The cyan orbits depict expanded pole-to-pole coverage providing at least three SurePoint™ satellites in view at a time for additional margin in the event of occasional failed slots.

Figure 8:
FIG. 8 shows the global coverage provided by the baseline constellation.

FIG. 8 shows the global coverage provided by the baseline constellation. The magenta orbits are a Walker configuration with 8 planes. A position fix including three SurePoint™ satellites is also shown.

Figure 9:
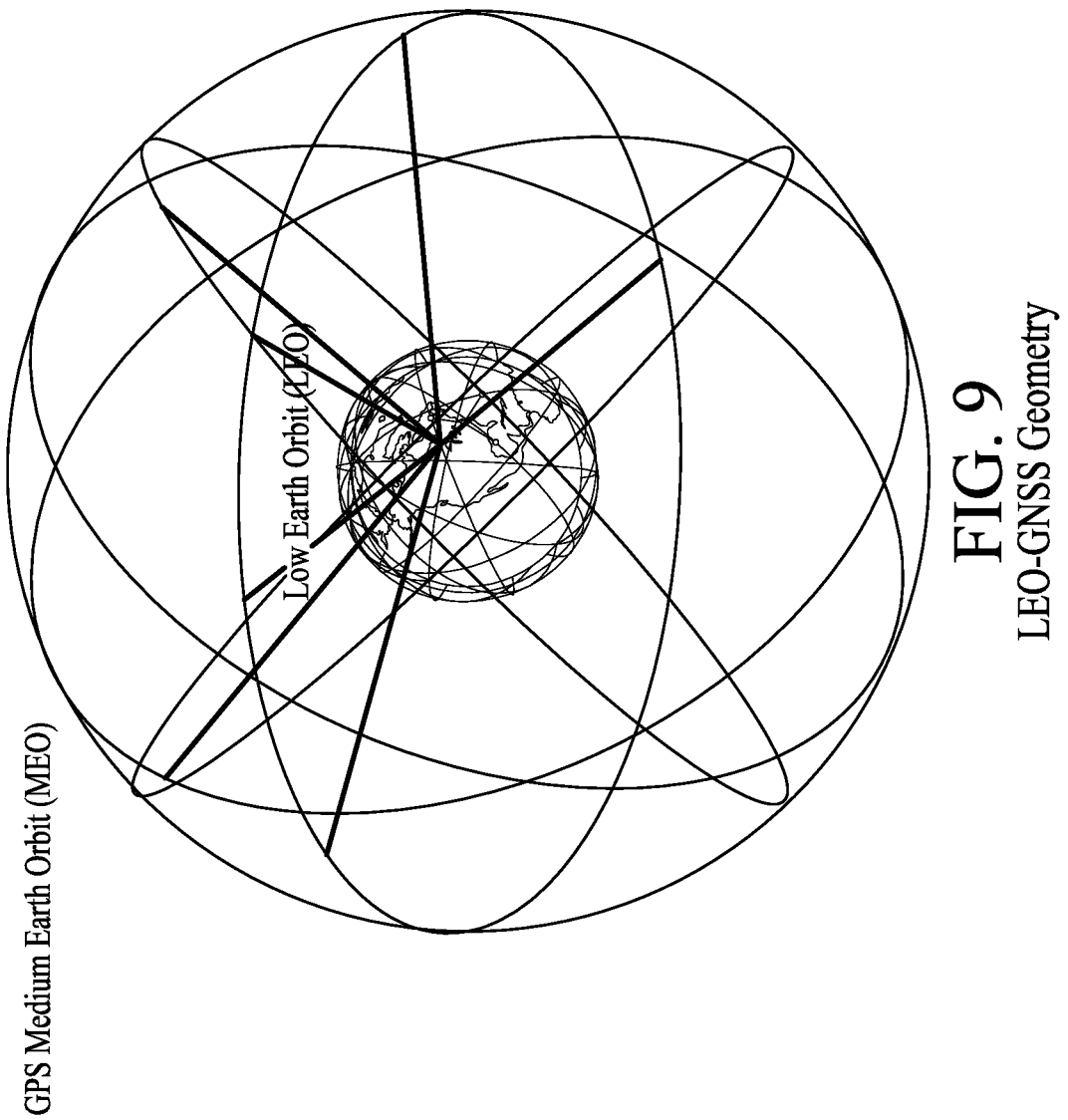
FIG. 9 shows the integrated GNSS-LEO geometry.

FIG. 9 shows the integrated GNSS-LEO geometry.

Figure 10:
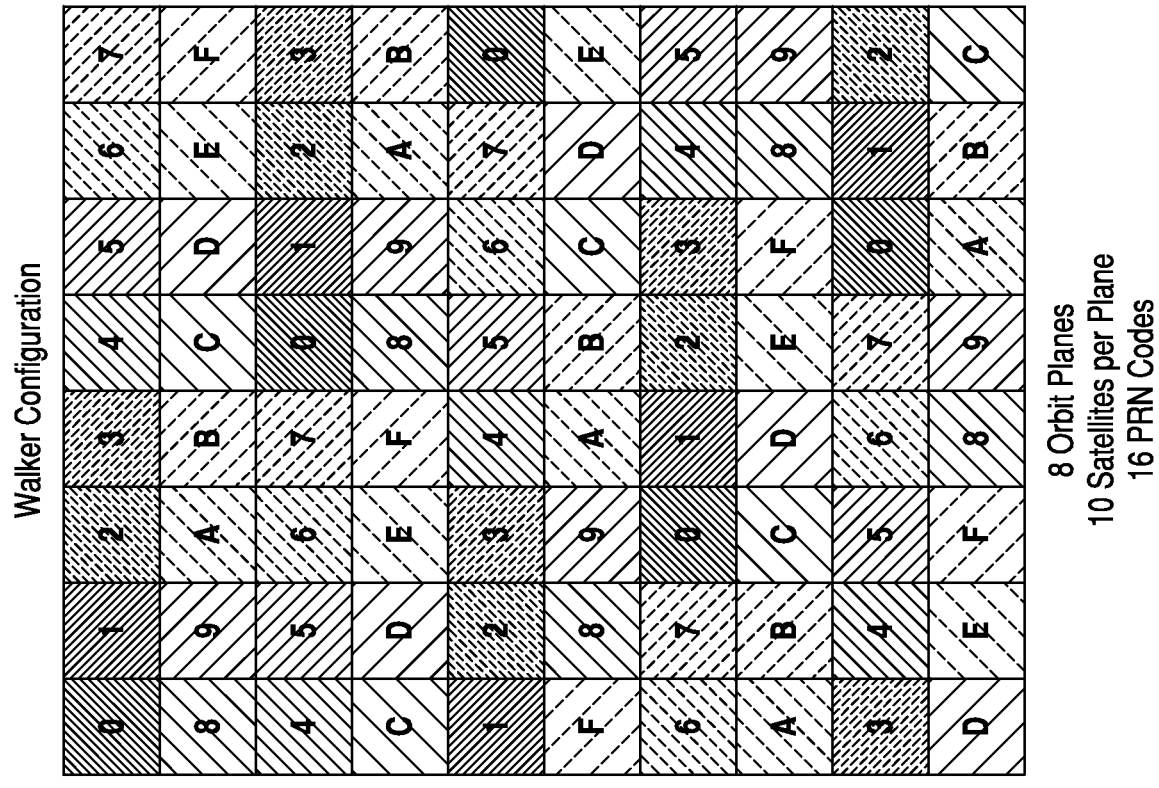
FIG. 10 shows an example of code re-use in the constellation.

FIG. 10 shows an example of code re-use in the constellation. Such re-use is especially necessary for GPS C/A Code which has both high cross correlation and a limited number of defined assignments available to cover the total number of transmitters in the constellation. Efficient use must be made by a new PNT constellation. No PRN can occupy an orbital position adjacent with itself for all possible constellation geometries over time. The diagram shows an example of how this can be accomplished for a Walker configuration with 8 orbit planes, providing at least 2 satellites in view for users at most latitudes. In this case the Walker configuration can be made to require only 16 unique PRN codes for all time phasing. No PRN code is used in overlapping or adjacent footprints, and there is spatial maximum separation when a PRN code is reused.

Insertion, Maintenance, and Redundancy

Figure 11:
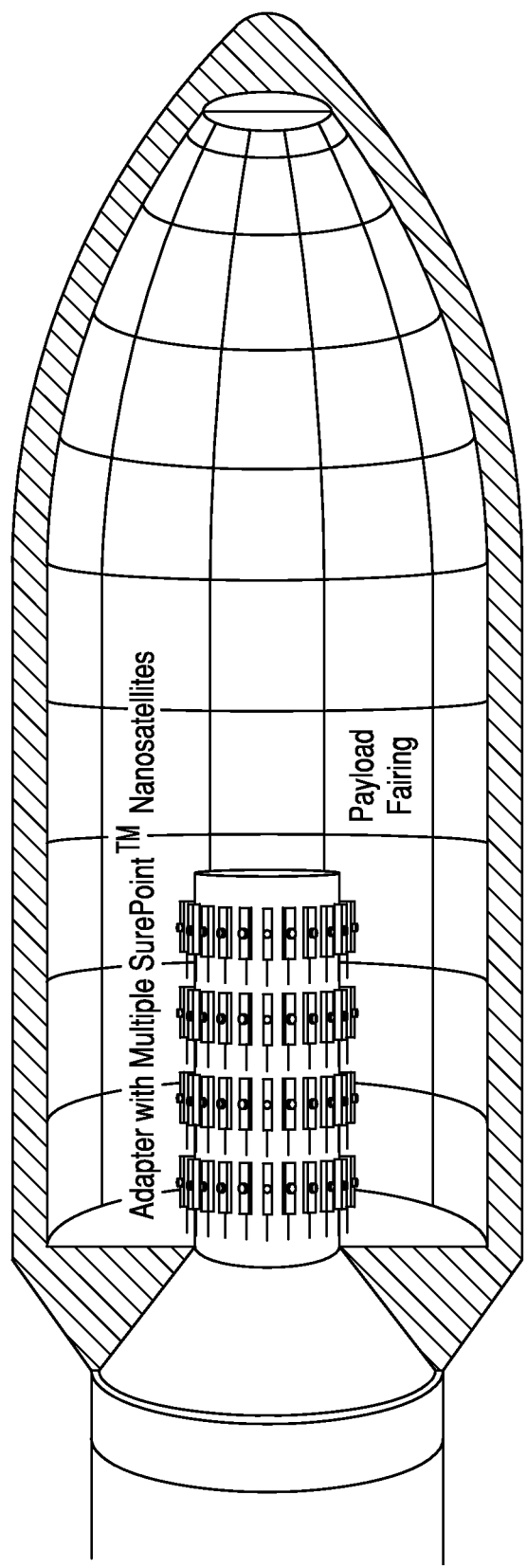
FIG. 11 shows the constellation single-launch configuration.
Figure 12:
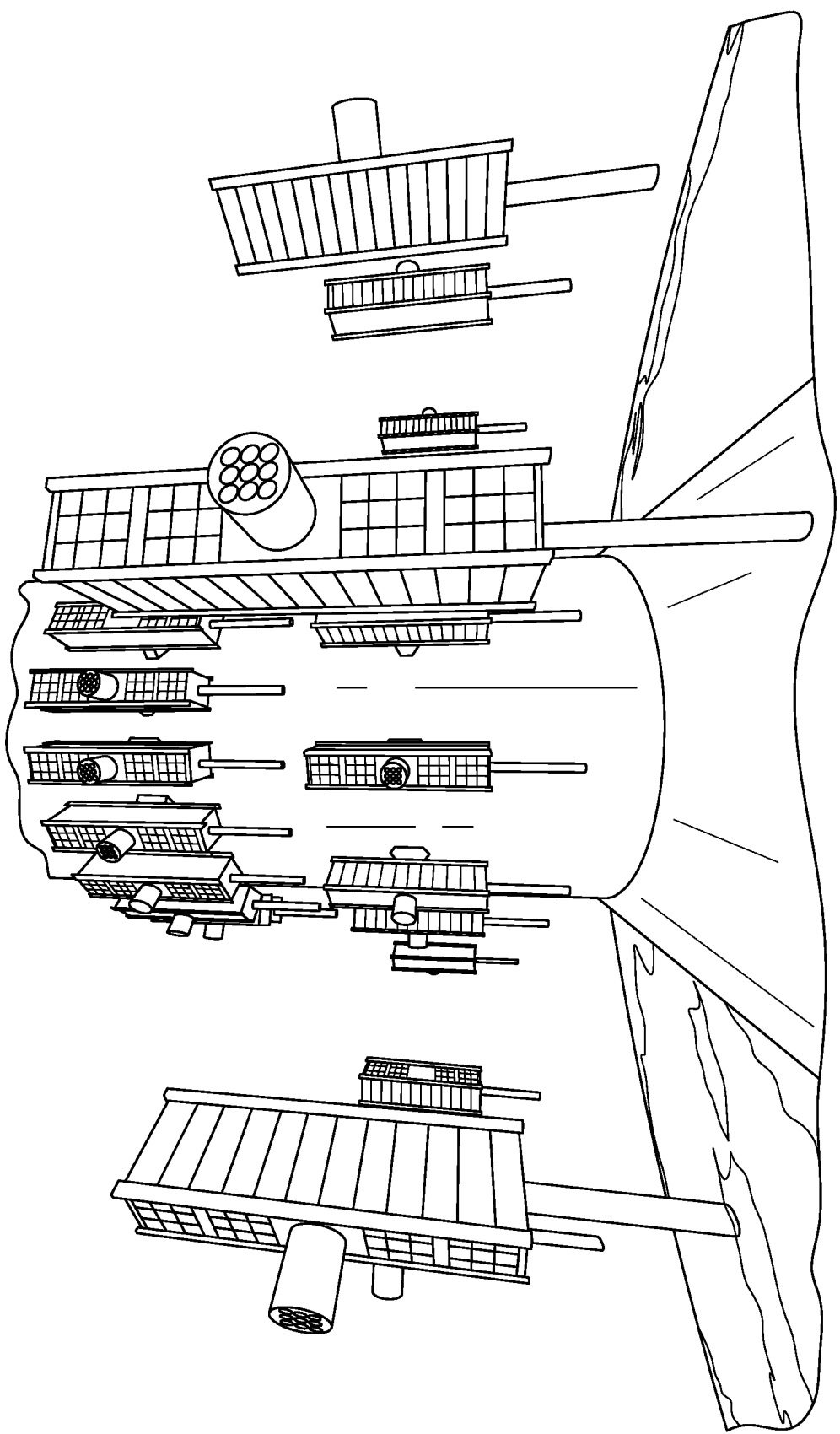
FIG. 12 depicts sequenced deployment of multiple satellites designed to preclude re-contact.

In MEO, satellite orbital plane changes are impractical. In principle, LEO satellites at a given inclination can be launched into any right ascension, then precessed to any other plane using nodal regression. Changing planes can be especially inexpensive at launch if precession is made part of the insertion sequence. For economies of scale, large numbers of smaller satellites can share the same launch vehicle. Subsequently, each satellite can be targeted individually to any plane and slot based on how long each is allowed to drift. Rapid drifting can be indefinite for spares in storage orbits. Once a satellite is in an operational orbit, further drift of that satellite to another plane is still an option, trading propellant usage versus time to address a failure. Such easy access from one slot to the next enables a single-string sparing strategy. LEO satellites offer the ability to plug virtually any satellite failure within days. Meanwhile, users hardly notice the outage, at least because it passes so quickly and at most because the predictability of those short LEO passes enable users to plan around its availability. Drift-based insertion open up a whole range of launch vehicle options. FIGS. 11 and 12 show how satellites may be launched in groups, and possibly the entire constellation at once, to lower costs and harness launch vehicle opportunistic availability. A single medium-lift booster launch vehicle yields mass and volume margin. A sequenced deployment of multiple satellites precludes re-contact.

Figure 13:
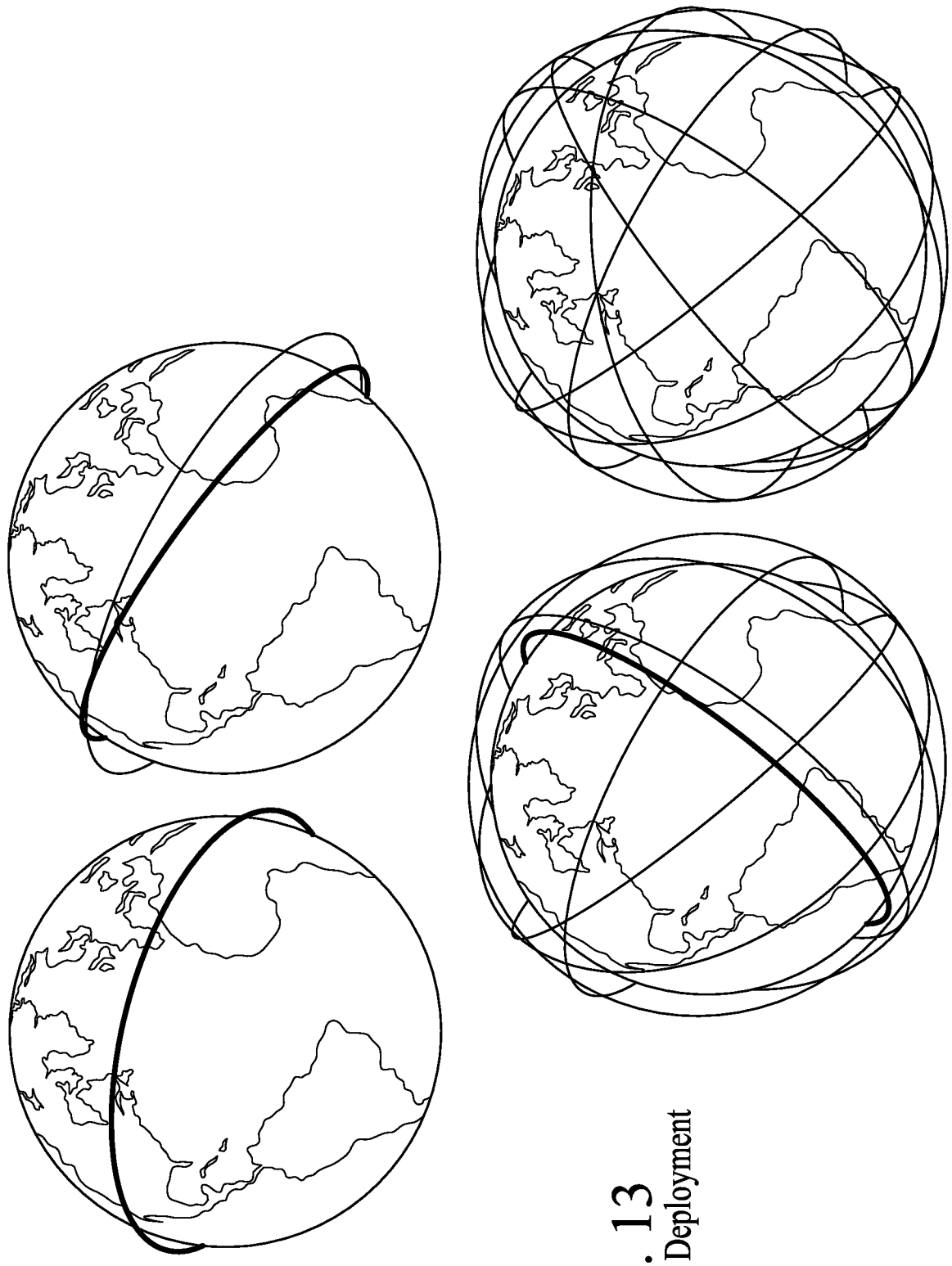
FIG. 13 shows deployment phased by orbit plane for the single-launch insertion.

The preferred embodiment employs electric propulsion for the full life cycle, including insertion, station keeping, reconfiguration, and de-orbit. Once launch vehicle insertion has occurred, there is time to configure orbits at low thrust and therefore take advantage of high efficiency. Electrospray thrusters have high specific impulse, require minimal Size, Weight, and Power (SWaP), operate on low DC input voltages generally found on small satellites, offer a compact propellant in an easy-to-handle liquid form, and offer precision maneuver resolution to minimize disruption to navigation mission functions FIG. 13 shows the single-launch deployment sequence. The viewing frame is a time lapse over a few months, wherein the right ascension of the viewer travels with that of the reference ascending node of the operational constellation. For viewing clarity, the Earth rotation angle (time of day of viewing) is also fixed with respect to the reference ascending node of the constellation. The insertion orbit, shown in cyan, drifts at a constant nodal precession rate relative to the operational constellation. Plane-by-plane, the onboard thrusters fire to raise groups of satellites to the operational altitude and phasing. In this frame, the operational planes appear stationary. When the insertion orbit completes its precession, the orbits of the final group of satellites are raised, and the deployment is complete.

In a similar manner, multiple launches can insert single planes or groups of a small number of adjacent planes.

Carrier Phase Timing and Ranging Framework

The following treatment addresses satellite orbit and clock estimation as well as user position and clock estimation.

Figure 14:
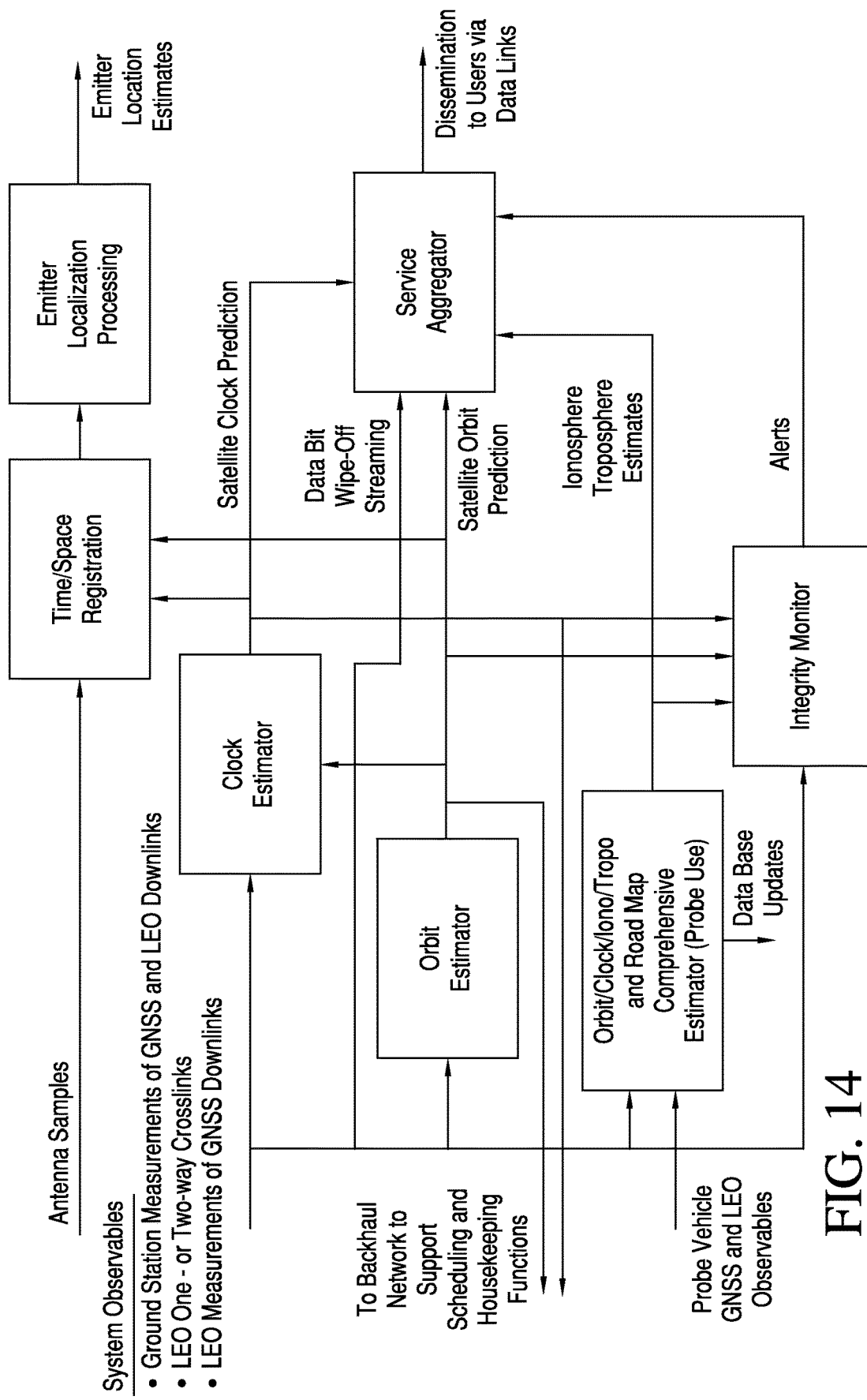
FIG. 14 illustrates the service data processing function.

FIG. 14 illustrates the Service Data Processing function. The system observables are routed to the Orbit Estimator, the Clock Estimator, and the Integrity Monitor. The Orbit Estimator is designed to provide sub-decimeter level solutions with effectively continuous predictive look-ahead. The Clock Estimator operates depending on the availability of sufficient system observables, some or all of which may be unavailable due to interference, and makes predictions to the extent that a complete state estimate is not possible. The Service Data Aggregator packages the solutions, along with system housekeeping data and GNSS data bit wipe-off information and routes it to users via the available data link paths, including direct satellite broadcast and terrestrial data link. The Integrity Monitor continually parses the raw observables and solutions and flags discrepancies. Alerts are also routed to users. Orbit solutions are routed via the backhaul to support ground and space segment housekeeping functions. The Emitter Localization functionality is also shown. Samples taken by the nadir mission antennas are registered in time and space, and then routed to the cross-correlation based TDOA/FDOA emitter localization-processing block. A comprehensive global estimator operates on all the data to the extent that probe vehicles are employed. Ionosphere and troposphere estimates are routed to users. Comprehensive solutions, including road height and mapping updates, are accumulated offline.

Applicable to both satellites and users, the navigation equations in the rotating Earth-fixed reference frame are $$c(t'_i - t) = |r_j(t) + \Omega_e \times r_j(t)(t'_i - t) - r_i(t)|$$

where c is the speed of light, $t'_i$ is the time the ith transmitter signal is received by the jth receiver, t is the time the signal is broadcast by the transmitter, $r_j$ is the jth receiver position, $\Omega_e$ is the Earth rotation vector, and $r_i$ is the position of the ith transmitter, all given in the Earth fixed reference frame. Neglecting higher-order terms, $$c(t'_i - t) = |r_j(t) - r_i(t) + \Omega_e \times r_j(t)(t'_i - t)|$$

$$\cong |r_j(t) - r_i(t)| + \frac{r_j(t) - r_i(t)}{|r_j(t) - r_i(t)|} \cdot \Omega_e \times r_j(t)(t'_i - t)$$

$$= |r_j(t) - r_i(t)| + \frac{r_j(t) - r_i(t)}{c} \cdot \Omega_e \times r_j(t)$$

As familiar in the art, the pseudorange from a transmitter to a receiver is given by the sum of the vacuum medium speed of light distance and the transmitter and receiver clock offsets as $$\rho_{ij}(t) = c(t'_i - t) + c\delta t_j(t) - c\delta t_i(t) + \text{measurement errors}$$

where $\delta t_i$ is the transmitter clock bias and $\delta t_j$ is the receiver clock bias. In a practical implementation, the measurement errors can be included as follows $$\rho_{ij}(t) = c(t'_i - t) + c\delta t_j(t) - c\delta t_i(t) - \delta\rho_{ij}^{iono} + \delta\rho_{ij}^{tropo} + b_{ij} + \delta\rho_{ij}^{multipath} + n_i(t)$$

$$= |r_j(t) - r_i(t)| + \frac{r_j(t) - r_i(t)}{c} \cdot \Omega_e \times r_j(t) + c\delta t_j(t) - c\delta t_i(t) - \delta\rho_{ij}^{iono} + \delta\rho_{ij}^{tropo} + b_{ij} + \delta\rho_{i}^{multipath} + n_i(t)$$

where $\delta\rho_{ij}^{iono}$ is the ionosphere error, $\delta\rho_{ij}^{tropo}$ is the troposphere error, $b_{ij}$ is the carrier phase cycle ambiguity error applicable to carrier phase pseudorange measurements, $\delta\rho_{ij}^{multipath}$ is multipath error, and $n_{ij}(t)$ is thermal noise and interference for each channel.

We assume an approximate estimate of transmitter and receiver position, $\bar{r}_i(t)$ and $\bar{r}_j(t)$, respectively, neglect small terms, and solve for perturbations of position about that approximation. The resulting residual pseudorange is given by $$\Delta\rho_{ij}(t) \equiv \rho_{ij}(t) - |\bar{r}_j(t) - \bar{r}_i(t)| + \frac{\bar{r}_j(t) - \bar{r}_i(t)}{c} \cdot \Omega_e \times \bar{r}_j(t)$$

$$\cong \hat{r}_{ij} \cdot (\delta r_j - \delta r_i) + c\delta t_j(t) - c\delta t_i(t) - \delta\rho_{ij}^{iono} + \delta\rho_{ij}^{tropo} + b_{ij} + \delta\rho_{ij}^{multipath} + n_{ij}(t)$$

where $\hat{r}_{ij}$ is the unit vector from each transmitter to the receiver and $\delta r$ is the position estimate error. More elaborate a priori position models can also be employed, for example, including an orbit model whose perturbations are functions of Cartesian initial position and velocity, and an inertial measurement unit model, whose perturbations are functions of Cartesian position and velocity bias and attitude, accelerometer, and gyro biases. In the general case a lever arm correction vector, b, is used to map a user or satellite vehicle position, $r_{reference}$, as defined by the center of mass or any other reference point to an antenna phase center position, $r_{antenna}$, by a 3×3 orthonormal rotation matrix, A, as a function of vehicle attitude q (in this example parameterized by a quaternion representation)

$$r_{antenna} = r_{reference} + A(q)b$$

Given the $1/f^2$ ionosphere error dependence, dual- or multi-frequency measurements enable an ionosphere-free observable to be constructed by scaling and differencing the observation equations among the bands. In the case of crosslinks of a high enough frequency, such as Ka band, it is possible to use a single frequency or window of frequencies and bound the ionosphere error. In the case of carrier phase measurements, a simplifying assumption for this treatment is that multipath is small, or at least on par with measurement noise. In practice, one skilled in the art can apply various treatments for multipath to maximize performance, including a Gauss-Markov model.

Satellite Orbit and Clock Estimation

Prior to carrying out user positioning, it is important to establish the GPS and LEO spacecraft orbits. Ground networks of GPS receivers such as the IGS network can establish precise GPS orbit and clock solutions. These GPS solutions can then be combined with raw pseudorange measurements from GPS taken by the LEO spacecraft where the observation equation in simplified form is given as $$\Delta \rho_{ij}(t) = \hat{r} \cdot \delta r_j \cdot c \delta t_j(t) + b_{ij} + n'_{ij}(t)$$

where the n prime notation is adopted to indicate a slightly noisier measurement resulting from the ionosphere-free observable construction and each observable is given from GPS satellite i to LEO satellite j. In general, a time series of observations among multiple GPS satellites is collected and then used to solve for the position offset and biases. Each successive solution iteratively informs an improved orbit estimate $\bar{r}(t)$ until convergence.

In general, the use of GPS alone to determine the LEO satellite orbit will not be sufficient. For example, jamming in the GPS band may prevent proper reception of the GPS signal by the LEO satellite. But on a more regular basis, when the LEO satellite is transmitting in the GPS band, it is generally impractical to simultaneously receive in the GPS band. In these cases, out-of-band crosslinks are combined with ground-based downlink ranging of the LEO satellite broadcast. The crosslink observation equations then become $$\Delta \rho_{ij}(t) = \hat{r}_{ij} \cdot (\delta r_j - \delta r_i) + c \delta t_j(t) - c \delta t_i(t) + b_{ij} + n'_{ij}(t)$$

where each observable is given from satellite i to j. In the preferred embodiment, crosslinks are also operated in a two-way mode, allowing for improved observability. However, crosslink measurements by themselves are not sufficient to fully characterize the LEO satellite orbit and clock. Ground measurements of the LEO transmitter downlinks are added to the observables as $$\Delta \rho_{ij}(t) = -\hat{r}_{ij} \cdot \delta r_i + c \delta t_j(t) - c \delta t_i(t) + \delta \rho_{ij}^{tropo} + b_{ij} + n'_{ij}(t)$$

where each observable is given from LEO satellite i to ground reference station j. For the ground measurements, we assume that the receiver clock and troposphere are known well, either through a separate atomic standard or through concurrent monitoring of GPS satellites at the ground reference site. Therefore, the ionosphere-free ground downlink observables are given by $$\Delta \rho_{ij}(t) = -\hat{r}_{ij} \cdot \delta r_i - c \delta t_i(t) + b_{ij} + n'_{ij}(t)$$

For any given epoch, $t_k$, the simultaneous observables for the GPS satellites, crosslinks, and downlinks for multiple LEO satellites are collected and combined into the following observation matrix:

$$\begin{bmatrix} \Delta \rho_{GPS1-LEOi} \\ \Delta \rho_{GPS2-LEOi} \\ \vdots \\ \Delta \rho_{GPSN-LEOi} \\ \Delta \rho_{LEOi-LEOj} \\ \Delta \rho_{LEOj-LEOi} \\ \Delta \rho_{LEOi-Ref1} \\ \Delta \rho_{LEOi-Ref2} \\ \vdots \\ \Delta \rho_{LEOi-RefM} \\ \Delta \rho_{LEOj-Ref1} \\ \Delta \rho_{LEOj-Ref2} \\ \vdots \\ \Delta \rho_{LEOj-RefM} \end{bmatrix}_k =$$

$$\begin{bmatrix} 1 & 0 & \hat{r}^T_{GPS1-LEOi} & 0 & I \\ 1 & 0 & \hat{r}^T_{GPS2-LEOi} & 0 & I \\ \vdots & \vdots & \vdots & \vdots & \vdots \\ 1 & 0 & \hat{r}^T_{GPSN-LEOi} & 0 & I \\ -1 & 1 & -\hat{r}^T_{LEOi-LEOj} & \hat{r}^T_{LEOi-LEOj} & 1 \\ 1 & -1 & -\hat{r}^T_{LEOi-LEOj} & \hat{r}^T_{LEOi-LEOj} & 1 \\ -1 & 0 & -\hat{r}^T_{LEOi-Ref1} & 0 & I \\ -1 & 0 & -\hat{r}^T_{LEOi-Ref2} & 0 & I \\ \vdots & \vdots & \vdots & \vdots & \vdots \\ -1 & 0 & -\hat{r}^T_{LEOi-RefM} & 0 & I \\ 0 & -1 & 0 & -\hat{r}^T_{LEOj-Ref1} & I \\ 0 & -1 & 0 & -\hat{r}^T_{LEOj-Ref2} & I \\ \vdots & \vdots & \vdots & \vdots & \vdots \\ 0 & -1 & 0 & -\hat{r}^T_{LEOj-RefM} & I \end{bmatrix}_k \begin{bmatrix} c\delta t^{(k)}_{LEOi} \\ c\delta t^{(k)}_{LEOj} \\ \delta r_{LEOi} \\ \delta r_{LEOj} \\ b_{GPS-LEOi} \\ b_{LEOi-LEOj} \\ b_{LEOj-LEOi} \\ b_{LEOi-Ref} \\ b_{LEOj-Ref} \end{bmatrix} +$$

$$n'_k$$

where the object of the construction is to solve for the orbits and clocks of an adjacent pair of LEO satellites, i and j, as well as the vector of biases of the GPS ranging links to LEO satellite i, $b_{GPS-LEOi}$, the two-way crosslink biases between the pair of LEO satellites, $b_{LEOi-LEOj}$ and $b_{LEOj-LEOi}$, and the two vectors of biases from each LEO satellite to the ground reference network, $b_{LEOi-Ref}$ and $b_{LEOj-Ref}$. The stacked vector n' discretizes the continuous noise over a pre-detection interval the measurement noise for each residual carrier phase pseudorange.

In general, a time history of the observation equations is required to solve for the unknowns with high integrity. The following shorthand notation abbreviates the above matrix equation:

$$\begin{bmatrix} \Delta\rho_{GPS,i} \\ \Delta\rho_{i,j} \\ \Delta\rho_{i,Ref} \\ \Delta\rho_{j,Ref} \end{bmatrix}_k =$$

$$\begin{bmatrix} +1 & - & R_{GPS,i}^T & 0 \\ \mp 1 & \pm 1 & -R_{i,j}^T & R_{i,j}^T \\ -1 & 0 & -R_{i,Ref}^T & 0 \\ 0 & -1 & 0 & -R_{j,Ref}^T \end{bmatrix} \begin{bmatrix} I_{GPS,i} \\ & I_{i,j} \\ & & I_{i,Ref} \\ & & & I_{j,Ref} \end{bmatrix}_k \begin{bmatrix} c\delta t_{LEOi}^{(k)} \\ c\delta t_{LEOj}^{(k)} \\ \delta r_{LEOi} \\ \delta r_{LEOj} \\ b_{GPS,i} \\ b_{cross} \\ b_{i,Ref} \\ b_{j,Ref} \end{bmatrix} + n_k'$$

where the 1 matrices are an abbreviated notation for n×1 vectors of ones with appropriate signs, the R matrix is a stack of unit vectors, and the I matrices are identity matrices. In the case of the crosslinks, the identity matrices have been expanded with appropriate zero spaces. In general, the clocks and orbits of many LEO satellites may be estimated concurrently. The observation matrix from a single epoch then takes on the following structure:

$$\begin{bmatrix} \Delta\rho_{1,2} \\ \Delta\rho_{1,3} \\ \Delta\rho_{2,3} \\ \Delta\rho_{GPS,1} \\ \Delta\rho_{3,Ref} \end{bmatrix}_k =$$

$$\begin{bmatrix} \mp 1 & \pm 1 & 0 & -R_{1,2}^T & R_{1,2}^T & 0 \\ \mp 1 & 0 & \pm 1 & -R_{1,3}^T & 0 & R_{1,3}^T \\ 0 & \mp 1 & \pm 1 & 0 & -R_{2,3}^T & R_{2,3}^T \\ +1 & 0 & 0 & R_{GPS,1}^T & 0 & 0 \\ 0 & 0 & -1 & 0 & 0 & -R_{3,Ref}^T \end{bmatrix} \begin{bmatrix} I_{1,2} \\ I_{1,3} \\ I_{2,3} \\ I_{GPS,1} \\ I_{3,Ref} \end{bmatrix}_k$$

$$\begin{bmatrix} c\delta t_{LEO1}^{(k)} \\ c\delta t_{LEO2}^{(k)} \\ c\delta t_{LEO3}^{(k)} \\ \delta r_{LEO1} \\ \delta r_{LEO2} \\ \delta r_{LEO3} \\ b_{GPS,1} \\ b_{cross} \\ b_{3,Ref} \end{bmatrix} + n_k'$$

In the preferred embodiment, the observable structure is robust to jamming and interference, including from the LEO transmitter itself. In this example, the transmitters from LEO satellites 2 and 3 prevent reception of GPS at the given epoch. Orbit solutions can be estimated over long intervals with a combination of GPS, crosslink, and downlink observables, wherein the slowly changing orbit components and constant bias components can be incorporated into the left-hand side of the observation equation in terms of new primed measurements, thereby leaving the more rapidly changing clock components to be estimated as follows:

$$\begin{bmatrix} \Delta\rho'_{1,2} \\ \Delta\rho'_{1,3} \\ \Delta\rho'_{2,3} \\ \Delta\rho'_{GPS,1} \\ \Delta\rho'_{3,Ref} \end{bmatrix} = \begin{bmatrix} \mp 1 & \pm 1 & 0 \\ \mp 1 & 0 & \pm 1 \\ 0 & \mp 1 & \pm 1 \\ +1 & 0 & 0 \\ 0 & 0 & -1 \end{bmatrix} \begin{bmatrix} c\delta t_{LEO1} \\ c\delta t_{LEO2} \\ c\delta t_{LEO3} \end{bmatrix} + n_k'$$

In this example, GPS contributes to calibrating the clock solution for LEO satellite 1, the ground reference network contributes to calibrating the clock solution for LEO satellite 3, while the crosslinks among the three pairings of the three LEO satellites tie the clock solutions for the three satellites together to provide an optimal clock estimate for the ensemble.

In shorthand form, the orbit and clock observation equation may be written as $$\Delta\rho_k = [\,+1 \quad R_k^T \quad I_{bias}\,] \begin{bmatrix} c\delta t_k \\ \delta r_{LEO} \\ b \end{bmatrix} + n_k'$$

where $\Delta\rho_k$ is a vector of residual pseudorange measurements for each LEO satellite of the GPS, crosslink, and downlink observables, $1_{clock}$ is a concatenation of the clock matrices, $R_k^T$ is a concatenation of the satellite unit vectors, $I_{bias}$ is a concatenation of the pseudorange bias identity matrices, $c\delta t_k$ is the vector of the LEO satellite clock bias solutions for each epoch, $\delta r_{LEO}$ is the vector of the orbit error estimates for each LEO satellite, and b is the vector of the GPS, crosslink, and downlink biases. The observation matrix can be stacked over K epochs as follows:

$$\begin{bmatrix} \Delta\rho_1 \\ \Delta\rho_2 \\ \vdots \\ \Delta\rho_K \end{bmatrix} = \begin{bmatrix} +1 & & & & R_1^T & I_{bias} \\ & +1 & & & R_2^T & I_{bias} \\ & & +1 & & \vdots & \vdots \\ & & & +1 & R_K^T & I_{bias} \end{bmatrix} \begin{bmatrix} c\delta t_1 \\ c\delta t_2 \\ \vdots \\ c\delta t_K \\ \delta r_{LEO} \\ b \end{bmatrix} + \begin{bmatrix} n_1' \\ n_2' \\ \vdots \\ n_K' \end{bmatrix}$$

This set of equations can be solved over an interval up through the present using the method of least-squares. In practice, not all the matrix elements are filled in. Appropriate excisions from the matrix account for unavailable observables or satellite geometry that brings various timing and ranging links in and out of view. In the preferred embodiment, a Kalman filter implementation of the observation equations is combined with refined clock and orbit models. In the preferred embodiment, the estimation is also augmented with code phase based estimation with an appropriate code phase multipath model.

Integrity of the solution can be assessed using RAIM. The residual test statistic, Q, for a single satellite is formed as follows:

$$Q = \left\| \begin{bmatrix} \Delta\rho_1 \\ \Delta\rho_2 \\ \vdots \\ \Delta\rho_K \end{bmatrix} - \begin{bmatrix} +1 & & & \\ & +1 & & \\ & & +1 & \\ & & & +1 \end{bmatrix} \begin{bmatrix} R_1^T & I_{bias} \\ R_2^T & I_{bias} \\ \vdots & \vdots \\ R_K^T & I_{bias} \end{bmatrix} \begin{bmatrix} c\delta t_1 \\ c\delta t_2 \\ \vdots \\ c\delta t_K \\ \delta r_{LEO} \\ b \end{bmatrix} \right\|_2$$

The preferred embodiment expands the solution and test statistic to include concurrently all satellites and associated estimation parameters over multiple epochs.

User Position Estimation

Figure 15:
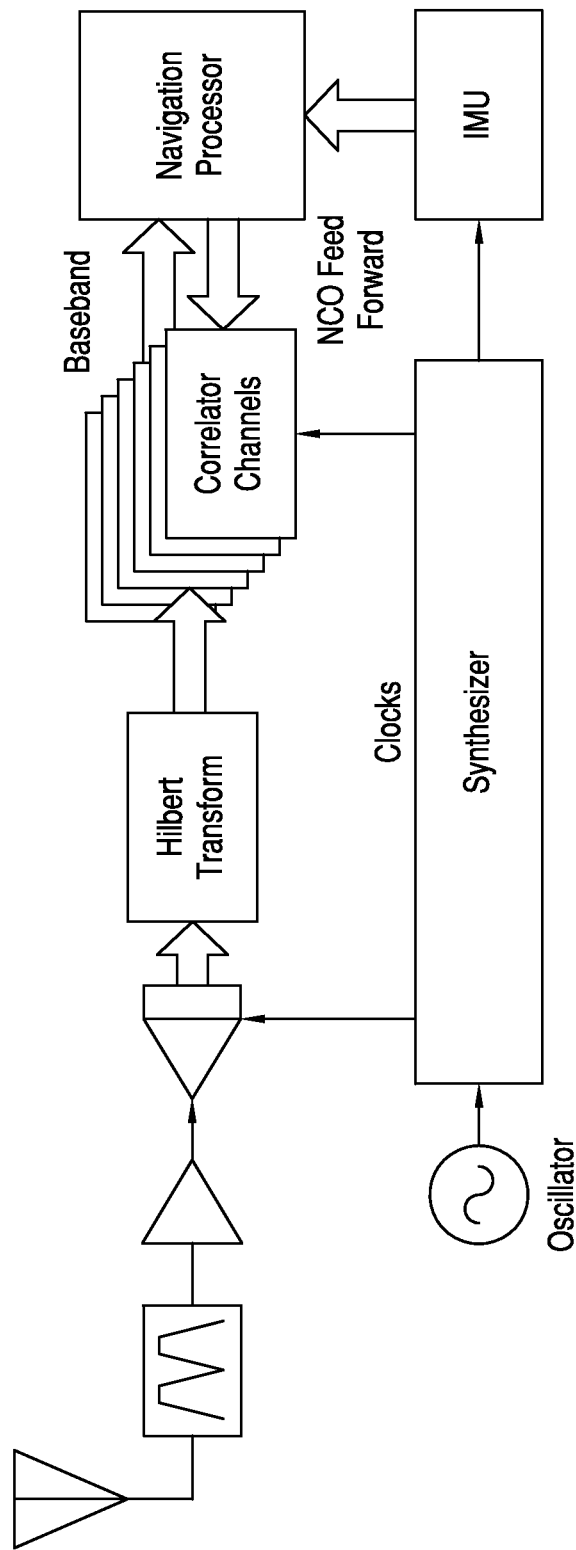
FIG. 15 shows the user equipment hardware.

FIG. 15 shows the user equipment hardware. A dual-band front-end allows for timing and ranging measurements that are free of ionosphere error. The oscillator drives the local oscillator synthesizer that provides coordinate timing for the entire device. The r.f. signals directly downconverted to baseband through sampling. The Hilbert transform produces a stream of complex baseband samples for the correlators.

Figure 16:
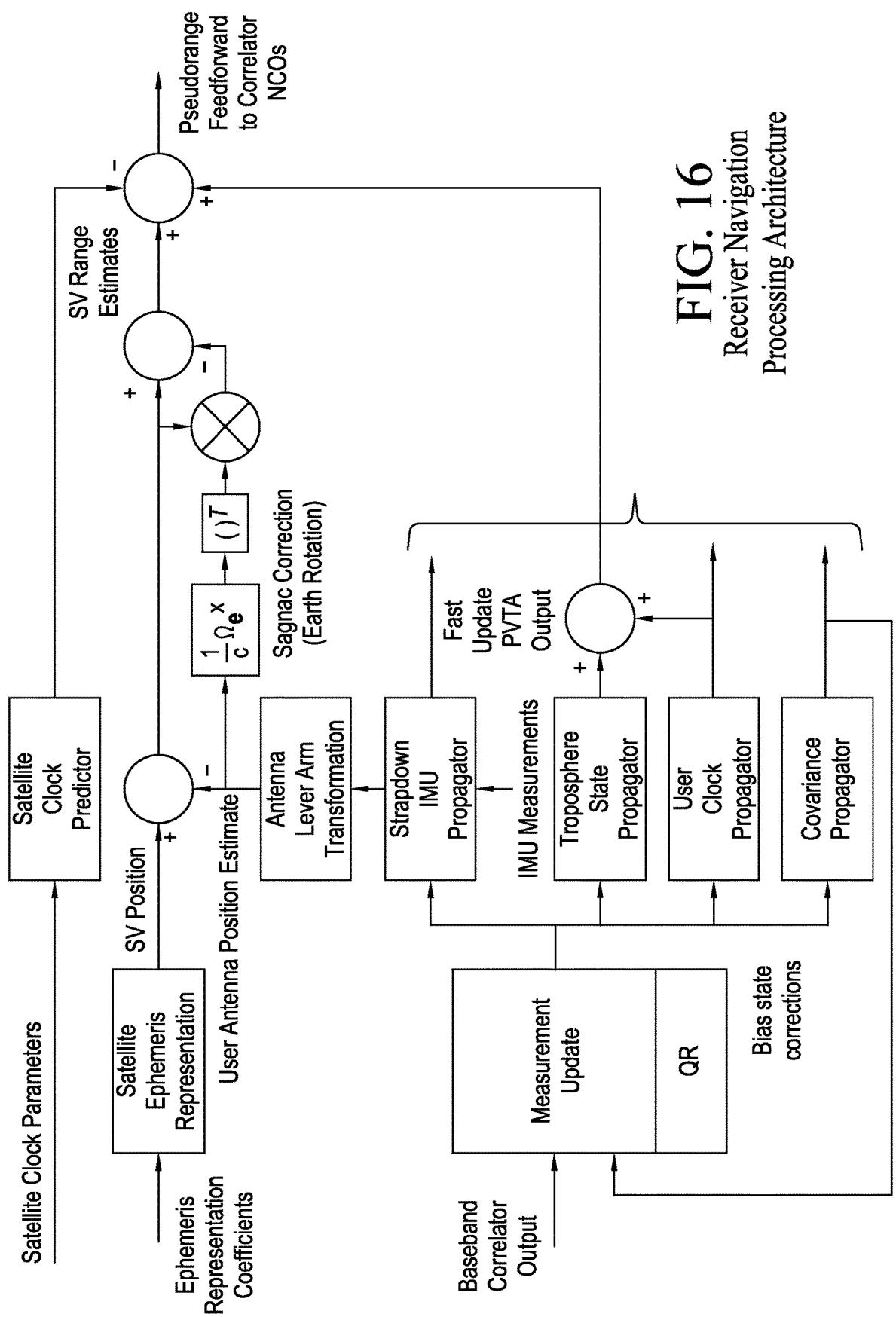
FIG. 16 shows the receiver navigation processing architecture.

FIG. 16 shows the Receiver Navigation Processing Architecture. The state is defined as vector position, velocity, attitude, user clock time and rate, accelerometer bias, gyro bias, zenith troposphere, and a clock and clock rate term for each GNSS and SurePoint™ satellite in view. A Kalman Filter time update is shown as the bank of propagators, including covariance. The satellite position is generated using ephemeris representation parameters disseminated from the Operations Center Service Data Processor. Clock parameters from the Operations Center are also used to predict the satellite clock states. The a priori state propagation is used to generate the feedforward pseudorange for the correlator NCOs. The measurement update is facilitated by the numerical stability of a square-root information implementation and an efficient QR matrix decomposition.

Once the LEO satellite clock and orbits are accurately known, this information is parameterized and passed to the user to aid user positioning. As shown in FIG. 1, orbit and clock information can be passed to the user through the terrestrial data network or the space network.

Troposphere error is estimated using multiple satellites in view over a long time constant using its zenith value multiplied by an obliquity factor of $h_i = 1/\sin El_i$, where $El_i$ is the satellite elevation angle. Because of the rapid angle coverage of the LEO satellites, it will be readily appreciated that more elaborate troposphere models may also be employed, for example, incorporating an azimuthal component to accommodate irregular weather features such as a nearby front. Carrier phase multipath is again assumed to be averaged down without further special attention.

Inertial aiding is an option for interference scenarios. If the user equipment has no requirement for interference rejection, the inertial treatment below may be set aside.

The user equipment in the preferred embodiment does leverage Inertial Measurement Units (IMUs) as highly complementary to the SurePoint™ estimations. For avionics retrofit, many operational aircraft already employ high-quality IMUs. Trends in IMU performance and cost are also favorable. MEMS technology can typically provide several seconds of carrier phase-level stability. Furthermore, new technology is forthcoming, including new high-performance IMUs based on interference patterns from Bose-Einstein condensates, as are currently being researched by DARPA. The preferred embodiment harnesses the full potential of any such new IMU technology at such time it may become available.

For satellite i, the user state estimation equations are $$\Delta\rho_i(t) = \hat{r}_i(t) \cdot [\delta x(t) - \delta r_i] - c\delta t_i(t) + c\delta t(t) + h_i(t)b_T + b_i + n'_i(t)$$

where $\delta x$ is the user residual position estimate error with respect to the North, East, Down coordinate system, and $\delta t$ is the user clock error. Since the satellite orbit and clock errors are estimated, these terms can be collected on the left side of the equation in terms of a new primed observable, $\Delta\rho$, as follows:

$$\Delta\rho'_i(t) = \hat{r}_i(t) \cdot \delta x(t) + c\delta t(t) + h_i(t)b_T + b_i + n'_i(t)$$

The inertial model applies the three-dimensional, linearized equations for error propagation derived by Bar-Itzhak [Reference 8] as follows:

$$\frac{d}{dt} \begin{bmatrix} \delta x \\ \delta v \\ \delta\phi \\ b_a \\ b_g \end{bmatrix} = \begin{bmatrix} & I & & & \\ G_{vr} & \Omega_{vv} & G_{v\phi} & I & \\ & & \Omega_{\phi\phi} & & I \\ & & & -\tau_a^{-1}I & \\ & & & & -\tau_g^{-1}I \end{bmatrix} \begin{bmatrix} \delta x \\ \delta v \\ \delta\phi \\ b_a \\ b_g \end{bmatrix} + \begin{bmatrix} 0 \\ w_{VRW} \\ w_{ARW} \\ w_a \\ w_g \end{bmatrix}$$

as comprised of inertial measurement unit state position estimate error $\delta x$, velocity estimate error $\delta v$, linearized 3-axis attitude estimate error $\delta\phi$ relative to the nominal user attitude, accelerometer bias $b_a$, and gyro bias estimate error $b_g$, and where all w vectors represent random noise errors. The Gauss-Markov model approximation for gyro and accelerometer biases has also been added.

Furthermore, the following definitions apply:

$$G_{vr} = -\frac{g}{R} \begin{bmatrix} 1 & 0 & 0 \\ 0 & 1 & 0 \\ 0 & 0 & -2 \end{bmatrix}$$

$$\Omega_{vv} = - \begin{bmatrix} 0 & 2\Omega_D & 0 \\ -2\Omega_D & 0 & 2\Omega_N \\ 0 & -2\Omega_N & 0 \end{bmatrix}$$

$$G_{v\phi} = \begin{bmatrix} 0 & g & 0 \\ -g & 0 & 0 \\ 0 & 0 & 0 \end{bmatrix}$$

$$\Omega_{\phi\phi} = - \begin{bmatrix} 0 & \Omega_D & 0 \\ -\Omega_D & 0 & \Omega_N \\ 0 & -\Omega_N & 0 \end{bmatrix}$$

where g is the local acceleration due to gravity, R is the radius of the Earth, and $\Omega_N$ and $\Omega_D$ are the components of the Earth rotation vector projected into the North and Down directions, respectively.

The user can employ multiple antennas on a vehicle if the application warrants. The estimation equation simply repeats for each antenna used, but with a separate lever arm value for each antenna. This framework could also also be applied to integrating a Controlled Radiation Pattern Antenna (CRPA).

A traditional ultra-tightly coupled, non-coherent dot product discriminator is first used to approximately estimate the user position and ensure that the receiver stays in coarse lock. However, this discriminator does not provide a foundation for sustained coherent integration. Under interference or jamming, the accuracy of such a discriminator degrades to a large fraction of a code chip, i.e., several meters in the case of the military signal.

Coherent integration provides precision observables under interference conditions. The process noise driving the inertial and clock terms can be characterized in a simplified form in terms of the time interval over which a time or position stability of a small fraction of a wavelength can be maintained. The objective is order 0.5 cm in terms of position—equal to about 20 picoseconds in terms of time times the speed of light. Some use cases employ an inertial measurement unit with a time constant longer than 20 seconds, while the oscillator used is typically sufficiently stable for only a few hundred milliseconds. Observables for N satellites in view may be stacked as follows:

$$\begin{bmatrix} \Delta\rho'_1(t) \\ \Delta\rho'_2(t) \\ \vdots \\ \Delta\rho'_N(t) \end{bmatrix} = \begin{bmatrix} \hat{r}_1^T(t) & 1 & h_1(t) & 1 & & & \\ \hat{r}_1^T(t) & 1 & h_2(t) & & 1 & & \\ \vdots & \vdots & \vdots & & & \ddots & \\ \hat{r}_N^T(t) & 1 & h_N(t) & & & & 1 \end{bmatrix} \begin{bmatrix} \delta x(t) \\ c\delta t(t) \\ b_T \\ b_1 \\ b_2 \\ \vdots \\ b_N \end{bmatrix} + n'(t)$$

In the absence of excess measurement noise, this equation can be expressed in shorthand form as follows:

$$\Delta\rho'(t) = [\, R^T(t) \;\; +1 \;\; h(t) \;\; I\,] \begin{bmatrix} \delta x_k(t) \\ c\delta t(t) \\ b_T \\ b \end{bmatrix} + n'(t)$$

From GPS satellite observables, the inertial biases are generally observable, with the exception of the position offset over an inertial measurement unit time constant. Therefore, when the inertial model is integrated with the above observation equation, the combination simplifies to the following effective observation equation:

$$\Delta\rho'(t) = [\, R^T(t) \;\; +1 \;\; h(t) \;\; I\,] \begin{bmatrix} \delta x \\ c\delta t(t) \\ b_T \\ b \end{bmatrix} + n'(t)$$

Sustained coherent integration is employed to the extent possible for interference rejection over the oscillator time constant, typically 300 to 500 milliseconds to form a vector of Δρ' observables for an epoch, k:

$$\Delta\rho'_k = [\, R_k^T \;\; +1 \;\; h_k \;\; I\,] \begin{bmatrix} \delta x \\ c\delta t_k \\ b_T \\ b \end{bmatrix} + n'_k$$

This equation may be further stacked over K (multiple) epochs as follows:

$$\begin{bmatrix} \Delta\rho'_1 \\ \Delta\rho'_2 \\ \vdots \\ \Delta\rho'_K \end{bmatrix} = \begin{bmatrix} R_1^T & +1 & & & h_1 & I \\ R_2^T & & +1 & & h_2 & I \\ \vdots & & & \ddots & \vdots & \vdots \\ R_K^T & & & +1 & h_K & I \end{bmatrix} \begin{bmatrix} \delta x \\ c\delta t_1 \\ c\delta t_2 \\ \vdots \\ c\delta t_K \\ b_T \\ b \end{bmatrix} + \begin{bmatrix} n'_1 \\ n'_2 \\ \vdots \\ n'_K \end{bmatrix}$$

In practice, not all the matrix elements are necessarily filled in. Appropriate excisions from the matrix account for unavailable observables or satellite geometry that brings various timing and ranging links in and out of view.

This set of equations can be solved over an interval up through the present using the method of least-squares. The rapid change in geometry provided by the LEO satellites as manifested in both the R and h matrix elements provides strong observability and convergence within tens of seconds when operating far from any forward-based infrastructure, as opposed to tens of minutes using GPS alone.

RAIM is added by evaluating the following test statistic, Q, to establish integrity.

$$Q = \left\| \begin{bmatrix} \Delta\rho'_1 \\ \Delta\rho'_2 \\ \vdots \\ \Delta\rho'_K \end{bmatrix} - \begin{bmatrix} R_1^T & +1 & & & h_1 & I \\ R_2^T & & +1 & & h_2 & I \\ \vdots & & & \ddots & \vdots & \vdots \\ R_K^T & & & +1 & h_K & I \end{bmatrix} \begin{bmatrix} \delta x \\ c\delta t_1 \\ c\delta t_2 \\ \vdots \\ c\delta t_K \\ b_T \\ b \end{bmatrix} \right\|_2$$

In the preferred embodiment, a Kalman filter implementation of the observation equations is combined with refined clock and orbit models. In the preferred embodiment, the estimation is also augmented with code phase based estimation with an appropriate code phase multipath model. Furthermore, in applications where integrity is important, the preferred embodiment is a forward-backward smoother whose look-back interval is set to ensure the availability of service.

Joerger et al. describe how a high-integrity solution can be obtained using a smoother. [Reference 9]

In the preferred embodiment the integrity processing includes all the satellite states which affect the solution along with the user state.

High Integrity for Safety of Life

The preferred embodiment significantly tightens SBAS and GBAS accuracy and RAIM integrity. WAAS alerts, GPS measurements, and FDE normally degrade with interference. The SurePoint™ system compensates by enabling tight RAIM alert limits (~1 m) for high margin under interference for all phases of flight—including Category III precision landing performance levels. Such tight RAIM preserve the validity of FDE—even if satellite alerts cannot be communicated to aircraft. And the built-in interference localization accelerates emitter takedown to eliminate the source of disruption to navigation and surveillance.

Other favorable integrations are possible. Aviation implementations can also integrate the new capability with existing and/or improved Distance Measuring Equipment (DME). The GBAS data link can be used as the backup LEO data link.

The net result is that the invention enables both improved interference rejection as called for to implement NextGen terminal operations and SBAS and GBAS-based precision landing. When integrated with the WAAS, the preferred embodiment potentially enables Category III SBAS for zero visibility operations and autoland.

Using existing avionics in many aircraft, more safe on time arrivals are possible at more airports worldwide. ANSPs, including the FAA, can have a new opening to win credit for safely retiring legacy infrastructure, especially SSR and ILS.

The preferred embodiment provides a robust, high-performance where-in-lane capability for automobiles. It converges to the needed integrity significantly faster than GPS alone. As automobiles gain more autonomous capability in growing numbers, the importance of rigorously managing rare yet inevitable component failures becomes more important to address. The preferred embodiment achieves integrity consistent with a where-in-lane performance requirement. Outputting hard statistical information, the system quantifies predicted and actual statistics in practical terms that auto insurance companies can understand and use—eliminating unknown unknowns in scaling up a new capability. A satellite-based service integrated with a car-to-car data link to disseminate position in real time also complements "relative" sensors, such as cameras, RADAR, and LIDAR, that degrade with road conditions—provides robust "absolute" positioning in any weather or environment. And because the user equipment can scale globally using hardware components that are already planned in vehicles, the incremental bill of materials cost is essentially zero.

Figure 17:
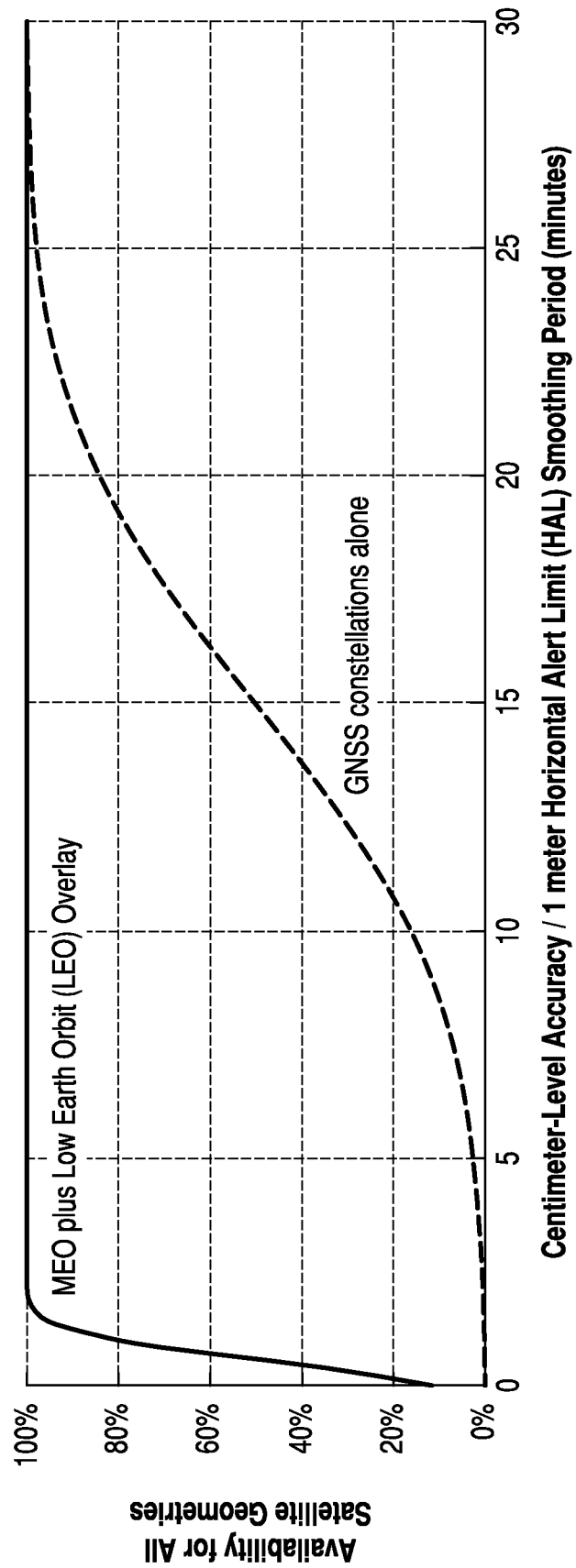
FIG. 17 shows an example approximating the availability of integrity for users.

FIG. 17 shows an example approximating the availability of integrity for users. In this example for automobiles, the Horizontal Alert Limit (HAL) is defined to be 1 meter, consistent with safety-of-life autonomous lane keeping. Since Medium Earth Orbit (MEO) GNSS satellites move across the sky slowly, there is insufficient geometry to detect faults using RAIM until tens of minutes have elapsed. The probability of RAIM availability is plotted as a function of smoothing period (consistent with time required for a cold start). For SurePoint™ satellites, availability reaches 100% within a time constant of tens of seconds.

Figure 18:
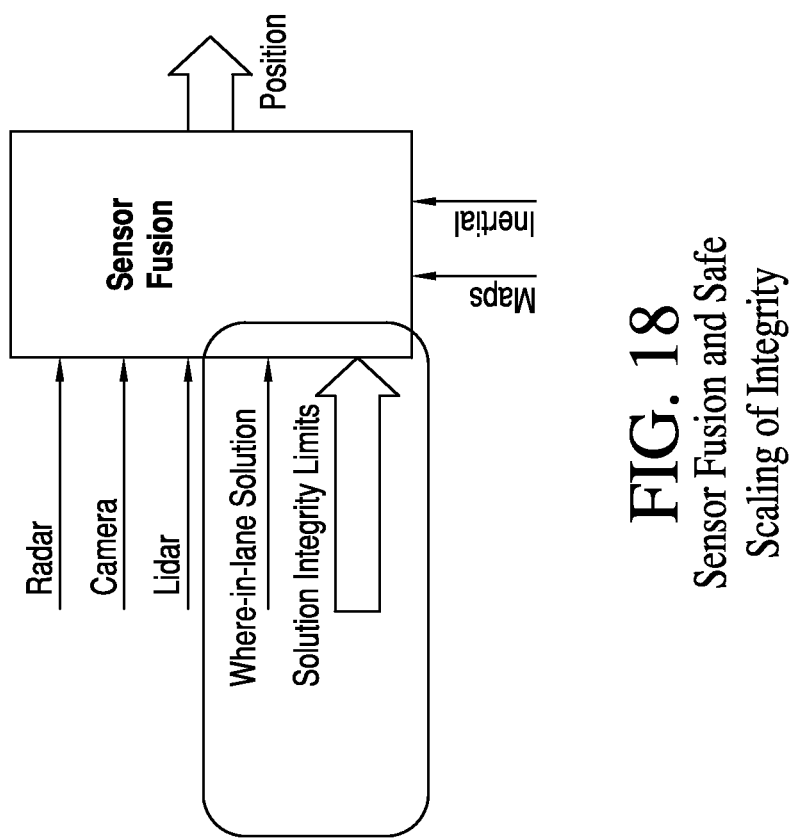
FIG. 18 shows the sensor fusion function providing safe scaling with integrity.

Satellite navigation integrity enabled herein can also benefit the fusion of GPS with other diverse sensors. Non-GPS-based sensors generally do not possess intrinsic integrity. FIG. 18 shows the sensor fusion function incorporating the SurePoint™ satellites. The receiver integrity function outputs an indication of when and by how much it should be trusted. Weighting among sensors during fusion can then be optimized around overall integrity—including even those sensors without intrinsic integrity.

Low-Cost User Equipment Under Interference

In cases of high interference or jamming, the noise contribution may be too large for coherent tracking using a receiver with an ordinary oscillator. In the preferred embodiment for a high-interference mode, a differencing operator, $\pi$, is applied to both sides of the observable equation for an epoch, k, as follows:

$$\Pi \Delta \rho'_k = \Pi [R_k^T \quad +1 \quad h_k \quad I] \begin{bmatrix} \delta x \\ c \delta t_k \\ b_T \\ b \end{bmatrix} + \Pi n'_k$$

where $$\Pi = \begin{bmatrix} 1 & -1 & 0 & 0 & 0 \\ 1 & 0 & -1 & 0 & 0 \\ 1 & 0 & 0 & -1 & 0 \\ 1 & 0 & 0 & 0 & -1 \\ 0 & 1 & -1 & 0 & 0 \\ 0 & 1 & 0 & -1 & 0 \\ 0 & 1 & 0 & 0 & -1 \\ 0 & 0 & 1 & -1 & 0 \\ 0 & 0 & 1 & 0 & -1 \\ 0 & 0 & 0 & 1 & -1 \end{bmatrix}$$

for the case of 5 satellites. The H matrix can be generalized for any number of satellites in view. Assuming that the noise is approximately equal across each channel, the differencing operator essentially produces a cancellation of the clock estimate in a balanced manner across all satellites irrespective of geometry as follows:

$$\Delta \rho''_k = [\Pi R_k^T \quad \Pi h_k \quad \Pi] \begin{bmatrix} \delta x \\ b_T \\ b \end{bmatrix} + n''_k$$

where $\rho''$ and $n''$ are shorthand notation for the vector of inter-satellite double differences and noise terms. In a key step, the observation equation is rendered independent of user clock and only depends on slowly changing or constant state variables.

At this point it is important to cover practical considerations in accumulating the raw phase measurements. In the preferred embodiment, accumulations at baseband aggregate $\Delta\rho'$ in-phase and quadrature components for each satellite over the pre-detection interval set to be less than or equal to the user oscillator coherent time constant, typically a few hundred milliseconds. The arctangent of the in-phase and quadrature components yield $\Delta\rho'$ for each particular satellite and epoch, which are then in turn differenced across satellite pairs to form the double difference, $\Delta\rho''$. The post-detection double difference is then integrated for a longer interval over multiple epochs, consistent with the time constant of the inertial navigation unit. A mathematical expression of the process is given as follows at a given epoch for a satellite pair i and j $$I_i = \cos(\alpha_i + \beta) + n_{Ii},$$

$$Q_i = \sin(\alpha_i + \beta) + n_{Qi}$$

$$\Delta\rho'_i = a\tan_2(Q_i, I_i),$$

$$\Delta\rho''_{ij} = \Delta\rho'_i - \Delta\rho'_j = a\tan_2(Q_i, I_i) - a\tan_2(Q_j, I_j)$$

$$\Delta\bar{\rho}'_{ij} = \langle a\tan_2(Q_i, I_i) - a\tan_2(Q_j, I_j) \rangle$$

where I is the in-phase, baseband pre-detection component for each satellite plus an in-phase noise contribution and Q is the quadrature, baseband pre-detection component for each satellite plus a quadrature noise contribution. It is assumed that any data modulation on the carrier is stripped off, either based on a priori predictive knowledge or via streaming through the space and/or ground network. The arctangent function can be implemented efficiently as a look-up table. The noise contribution is normalized versus a unity signal. The variable β is a stand-in for the rapidly varying clock term common to all satellites, whereas the variable α embedded in the observable is a stand-in for all other state variable contributions which are slowly changing or constant. In the presence of interference, the signal-to-noise ratio may be low, i.e., the noise term may tend to be order unity or larger. The noise is averaged down in the final step as the double difference is integrated over the inertial time constant. Because the noise term is large, a non-linearity is introduced in the arctangent function that tends to average out.

The cancellation of the clock term concurrent with the detection step can also be seen in an alternate vector product form. A coherent discriminator is expressed as follows as a function of the pre-detected raw in-phase and quadrature measurement components, I and Q, for each satellite pair with satellite indices i and j.

$$\bar{I}_{ij} = \langle Q_i Q_j + I_i I_j \rangle$$

$$\bar{Q}_{ij} = \langle Q_i I_j - I_i Q_j \rangle$$

Substituting the previously defined identities into the discriminator equations, $$\bar{I}_{ij} = \langle [\sin(\alpha_i+\beta)+n_{Qi}][\sin(\alpha_j+\beta)+n_{Qj}]+[\cos(\alpha_i+\beta)+n_{Ii}][\cos(\alpha_j+\beta)+n_{Ij}] \rangle$$

$$\bar{Q}_{ij} = \langle [\sin(\alpha_i+\beta)+n_{Qi}][\cos(\alpha_j+\beta)+n_{Ij}]-[\cos(\alpha_i+\beta)+n_{Ii}][\sin(\alpha_j+\beta)+n_{Qj}] \rangle$$

Invoking product-to-sum identities, it is assumed that the β component associated with the user clock traverses large excursions relative to $2\pi$ over the averaging interval and is further modulated by random noise so that such terms may be neglected. Consolidating the remaining squared noise terms, the $$\bar{I}_{ij} \approx \cos(\alpha_i-\alpha_j) + \langle n_{Qi} n_{Qj} \rangle + \langle n_{Ii} n_{Ij} \rangle$$

$$\bar{Q}_{ij} \approx \sin(\alpha_i-\alpha_j) + \langle n_{Qi} n_{Ij} \rangle - \langle n_{Ii} n_{Qj} \rangle$$

In this discriminator, the common mode component of a baseband signal is eliminated, leaving only a differential residual. The only common mode quantity across satellites in the above estimation equations—corresponding to the angle β that drops out altogether—is the user clock. Therefore, with this discriminator, coherent integration becomes sustainable over a much longer interval than would otherwise be permitted by the user clock, thereby significantly increasing the coherent interference rejection performance of the receiver.

Taking advantage of the rapid angle change in geometry, K epochs can be stacked as follows to solve for the position offset, zenith troposphere, and carrier phase biases:

$$\begin{bmatrix} \Delta\rho_1'' \\ \Delta\rho_2'' \\ \vdots \\ \Delta\rho_K'' \end{bmatrix} = \begin{bmatrix} \Pi R_1^T & \Pi h_1 & \Pi \\ \Pi R_2^T & \Pi h_2 & \Pi \\ \vdots & \vdots & \vdots \\ \Pi R_K^T & \Pi h_K & \Pi \end{bmatrix} \begin{bmatrix} \delta x \\ b_T \\ b \end{bmatrix} + \begin{bmatrix} n_1'' \\ n_2'' \\ \vdots \\ n_K'' \end{bmatrix}$$

This system of equations can be solved via a least squared fit. In practice there may be missing measurements that can be appropriately excised in the matrix construction. MEO satellites move slowly across the sky. The LEO rapid angle motion dramatically evolves the geometrical matrix elements thereby enabling the state to be observable within tens of seconds. In the preferred embodiment, a Kalman filter implementation is employed, except in applications where integrity is also important, in which case a forward-backward smoother is employed.

To highlight the improvement provided by the above discriminator, it is helpful to compare it with a typical carrier phase tracking loop used in the art that may employ a discriminator of the following form:

$$\bar{I}_i^2 \Delta\rho_i' = Q_i I_i$$

For this discriminator, the estimation error is given by [Reference 10]

$$\sigma_\phi^2 \approx \frac{B_L}{C/N_0}\left(1 + \frac{1}{2C/N_0 T}\right)$$

where $C/N_0$ is the carrier power to noise power spectral density ratio, T is the correlator pre-detection interval, and $B_L$ is the phase lock loop tracking bandwidth.

In accordance with the H operator, all the pairings of satellites are symmetrically applied. The squared noise term is essentially doubled over what performance would be available with a more stable time reference. However, also in accordance with the H operator, roughly twice as many satellite measurement pairs are formed as in the non-differential case, thereby effectively recovering the factor-of-two dilution.

Figure 19:
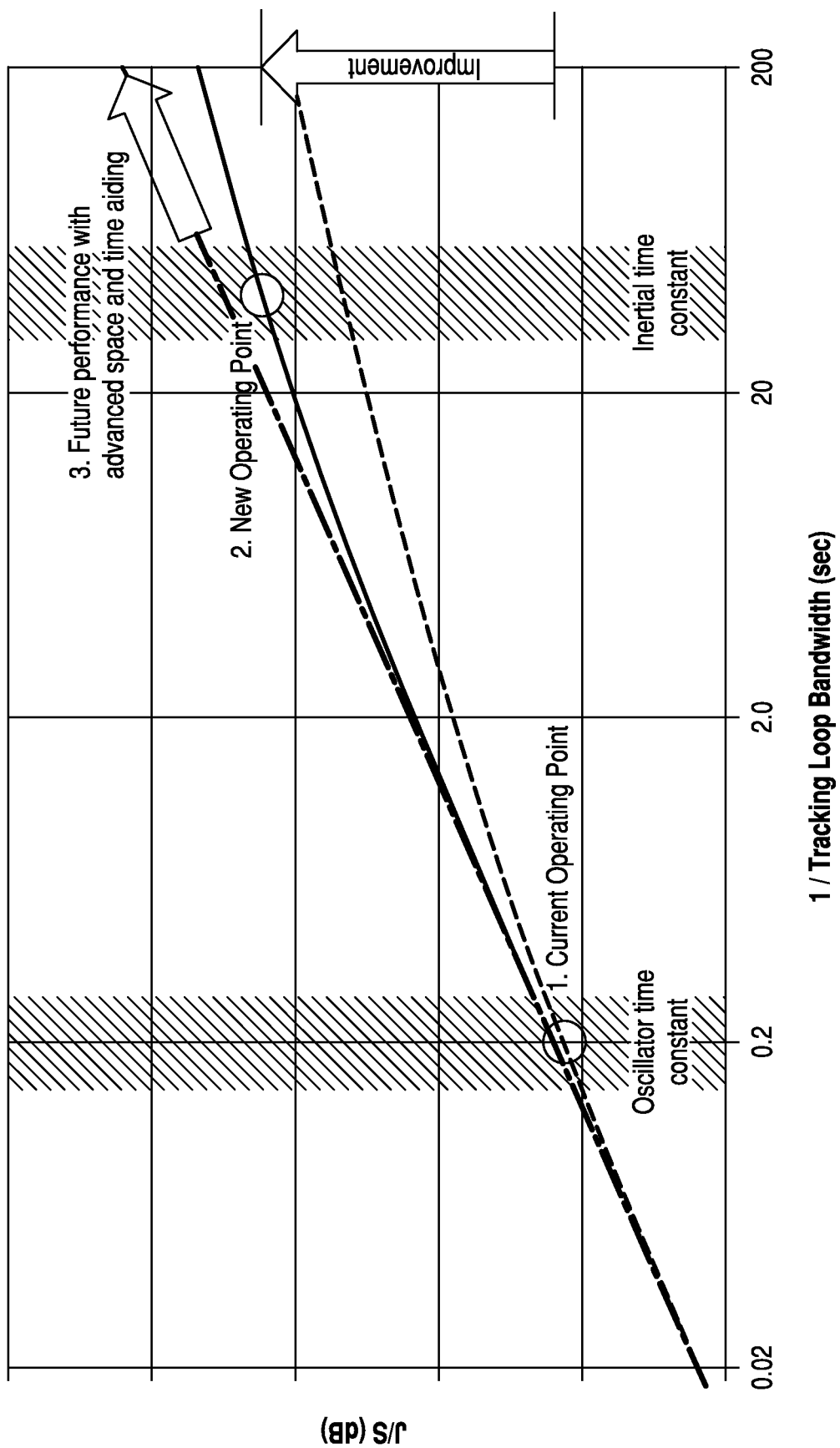
FIG. 19 shows improvements in interference rejection achieved with the system.

The resulting improvement in jamming performance as a function of inertial quality is shown in FIG. 19. The traditional discriminator is limited to time constants on the order of the oscillator stability, whereas the improved discriminator can extend the user integration time constant to be consistent with the user inertial, providing attendant improvement in interference rejection. Furthermore, neither GPS nor GNSS satellites provide observability for concurrent centimeter-level accuracy or high-integrity cycle ambiguity resolution. The LEO satellites provide the remaining unknowns.

The caveats for employing the new discriminator are as follows: (i) the receiver's baseband Numerically Controlled Oscillators (NCOs) must cover the LEO Doppler dynamic range (±40 kHz for LEO rather than ±5 kHz for MEO GNSS), (ii) the processor must have sufficient throughput to accommodate the altered tasking, and (iii) an r.f. bandpass filter may need to be inserted into the r.f. path between the antenna and receiver to attenuate residual out-of-band power.

Figure 20:
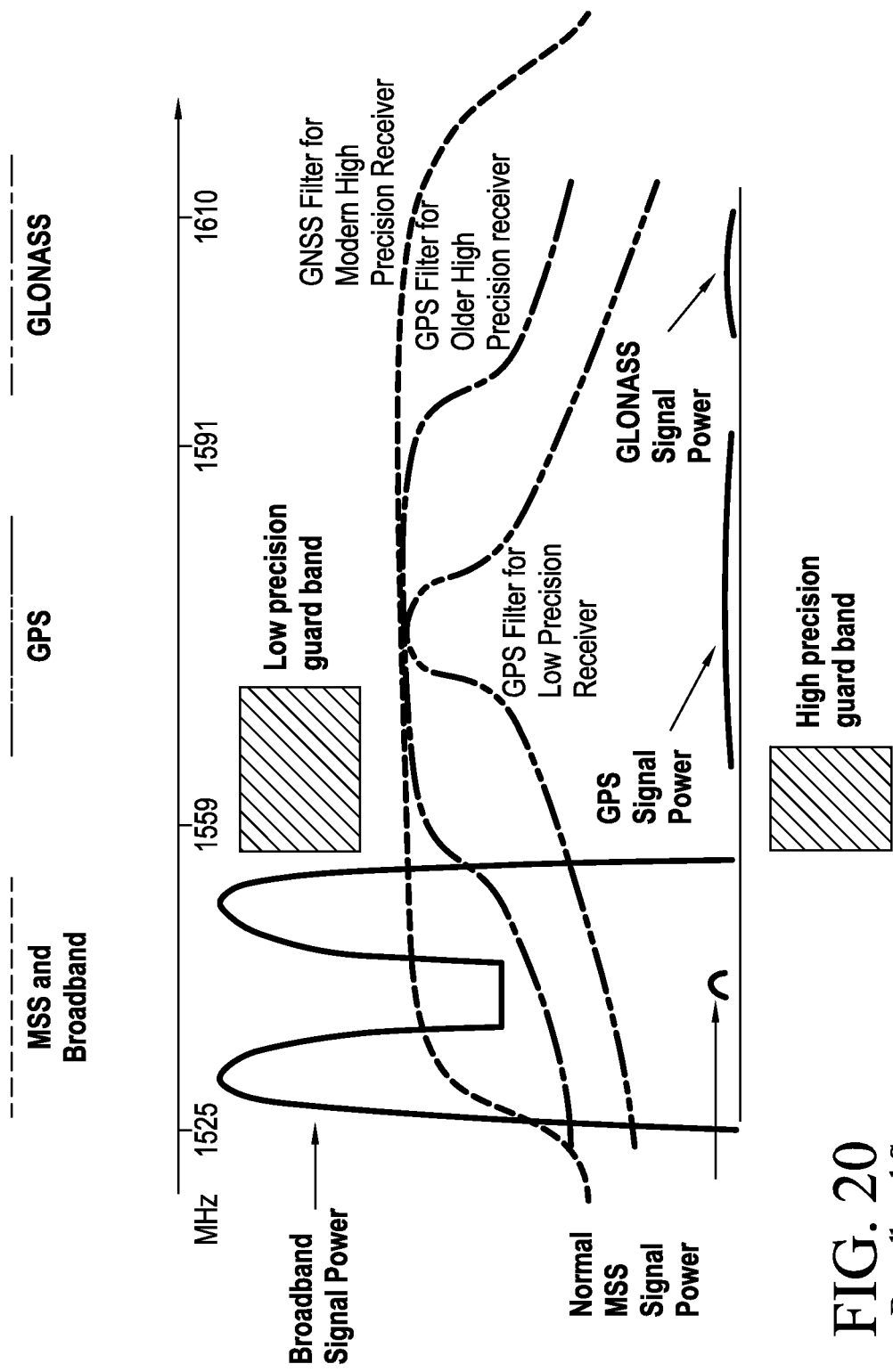
FIG. 20 shows the broadband spectrum adjacent to GPS.

FIG. 20 shows the broadband spectrum in the bands adjacent to GPS L1. The existing installed base of receivers generally occupy the three filter curves, labeled low precision, older high precision, and modern high precision, each with successively larger bandwidth usage. The Ancillary Terrestrial Component (ATC) band adjacent to GPS L1 is shown to the left in magenta. At the bottom are shown low power satellite signals from Mobile Satellite Services (MSS), GPS, and the Russian GLONASS. One proposed broadband service is shown in red at the left at a low power level. A concern is that the front end filters of many existing GPS receivers will lead to interference at the proposed broadband power levels. In the case of the modern high precision receiver, the bands overlap because these GPS receivers use the same r.f. front end to track MSS satellites.

Because of its emphasis on carrier phase, the spectrum requirements of the preferred embodiment are narrow. In particular, so long as the GPS signal can be compressed to reconstruct the carrier (even with partial access to the spread component), that carrier is generally sufficient for high-integrity, full-performance positioning.

Since the invention enables narrowed GPS spectrum to achieve full high-integrity position fixing even under adverse interference conditions, the green regions may be defined as guard bands between GPS and adjacent broadband. A relatively low-cost band pass filter may be inserted retroactively in fielded user equipment so as to impose a penalty of minimal bandwidth and GPS received power. The large guard band is associated with a 2 MHz bandwidth filter for C/A code GPS receivers. The small guard band is associated with a 20 MHz bandwidth filter for P(Y) code GPS receivers. Furthermore, since the PNT LEO satellite can broadcast precise position service corrections in the GPS band, a satellite broadcast is no longer needed in the adjacent MSS band.

Figure 21:
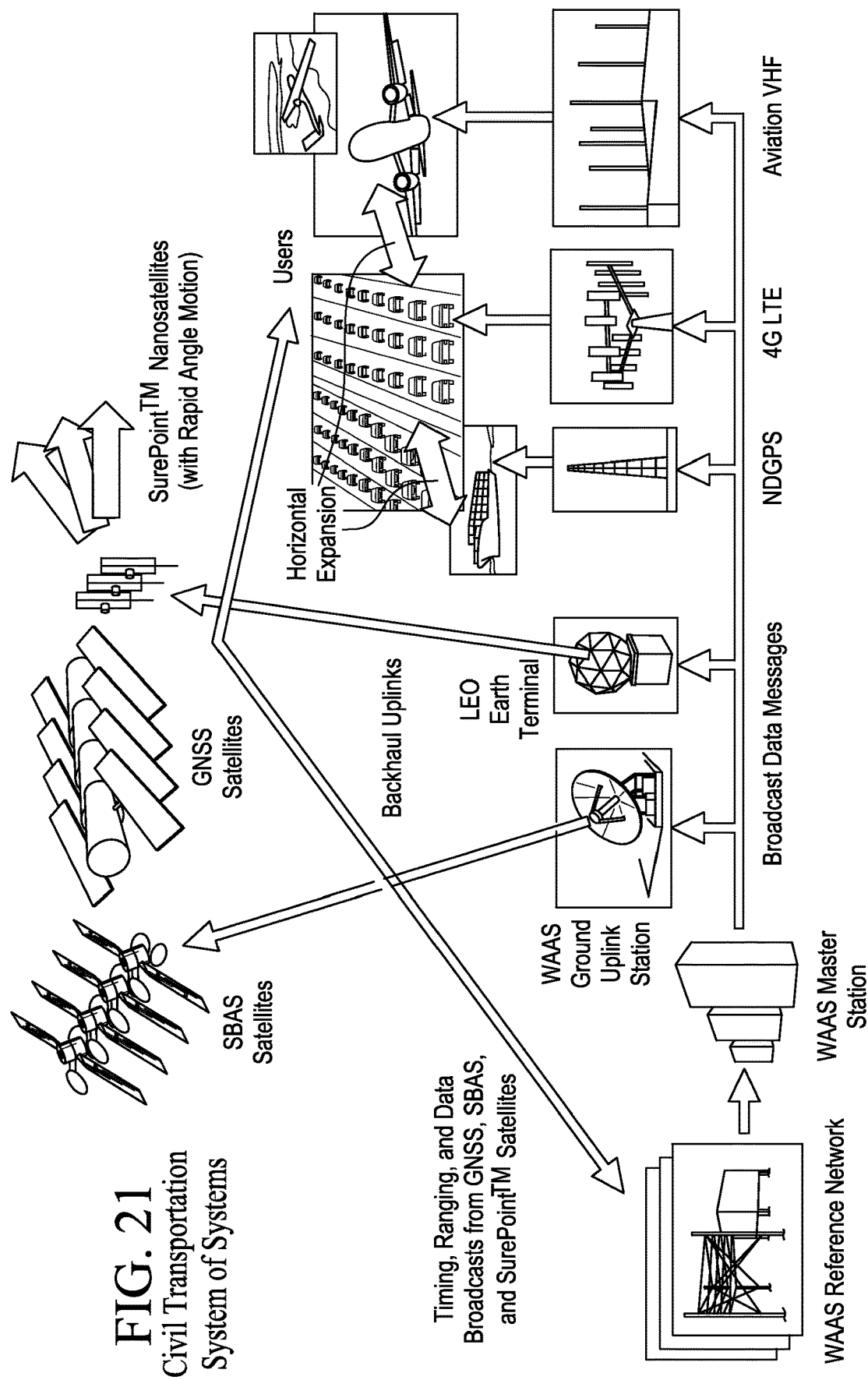
FIG. 21 shows the civil transportation system of systems.

FIG. 21 shows a concept for a civil transportation system of systems. Rather than constructing separate GPS augmentation systems for marine, surface, and aviation users, an integrated precision service is enabled by the invention. The space segment includes GPS satellites, WAAS satellites, and LEO satellites. WAAS ground monitor stations with a software update track the timing and ranging signals of all three types of satellites. An integrated message is created at WAAS master station that includes the precise clocks and orbits of all the satellites as well as integrity alerts. This data message is promulgated to users via multiple data paths, including the WAAS and LEO satellites and ground-based data links. For aviation, the ground-based data link is VHF radio. For ground vehicles, the ground-based data link can include Dedicated Short Range Communications (DSRC) Vehicle to Infrastructure (V2I) roadside equipment (RSE) or bandwidth from a commercial wireless service provider, including 4G LTE. For marine users, the ground-based data link can be existing DOT and Coast Guard NDGPS beacons converted for data broadcast use rather than for timing and ranging.

The networked system with multiple data link paths adds resiliency and interference rejection when one or more timing, ranging, or data links are degraded or unavailable.

Mixed Space Segment Operations

Figure 22:
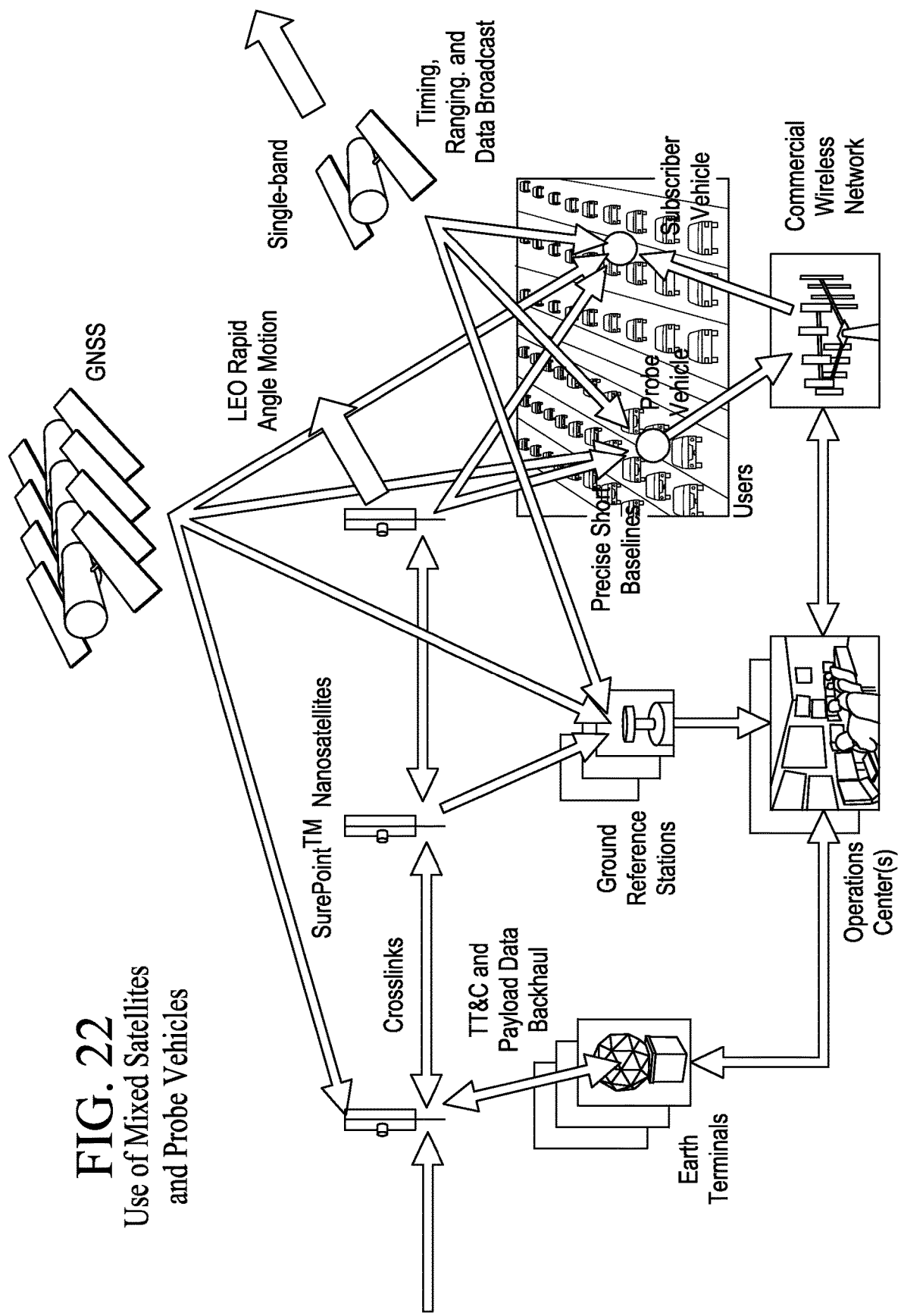
FIG. 22 shows integration of the system with single-frequency satellites and probe vehicles.

FIG. 22 shows integration of the system with single-frequency satellites and probe vehicles. The single-frequency satellites provide supplementary timing and ranging measurements while the probe vehicles provide additional feedback to the service data processor to help estimate ionosphere, troposphere, and roadway height. For the use of probe vehicles, a terrestrial backhaul data link is required. For the case where single-frequency SurePoint™ satellites are used or single-frequency operation is otherwise desirable, a subset of user-client vehicles form short baselines (with respect to distance scales of ionospheric variation) relative to the probe vehicles by receiving estimates of local ionosphere and troposphere computed by the service data processor.

A subset of vehicles, known as probe vehicles, are included in the solution to help build up and update road maps over time that can be used for integrity monitoring and aiding for other sensor, such as cameras. In an ancillary embodiment where a single-frequency LEO constellation may be available to augment the dual-band measurements, the network of probe vehicles is employed as a crowd-sourced means of accelerating acquisition for the broader mesh of users.

To the extent that probe vehicles are employed, the service operator enters into an incentive-based contract with the probe vehicle users to enable their participation. Probe vehicles route GNSS and LEO observables to the operations center. Under the terms of the incentive-based contract, the data is generally expected to be anonymized for privacy. A private wireless network, such as 4G LTE can provide the backhaul data link, although DSRC V2I RSE could also serve this purpose.

Figure 23:
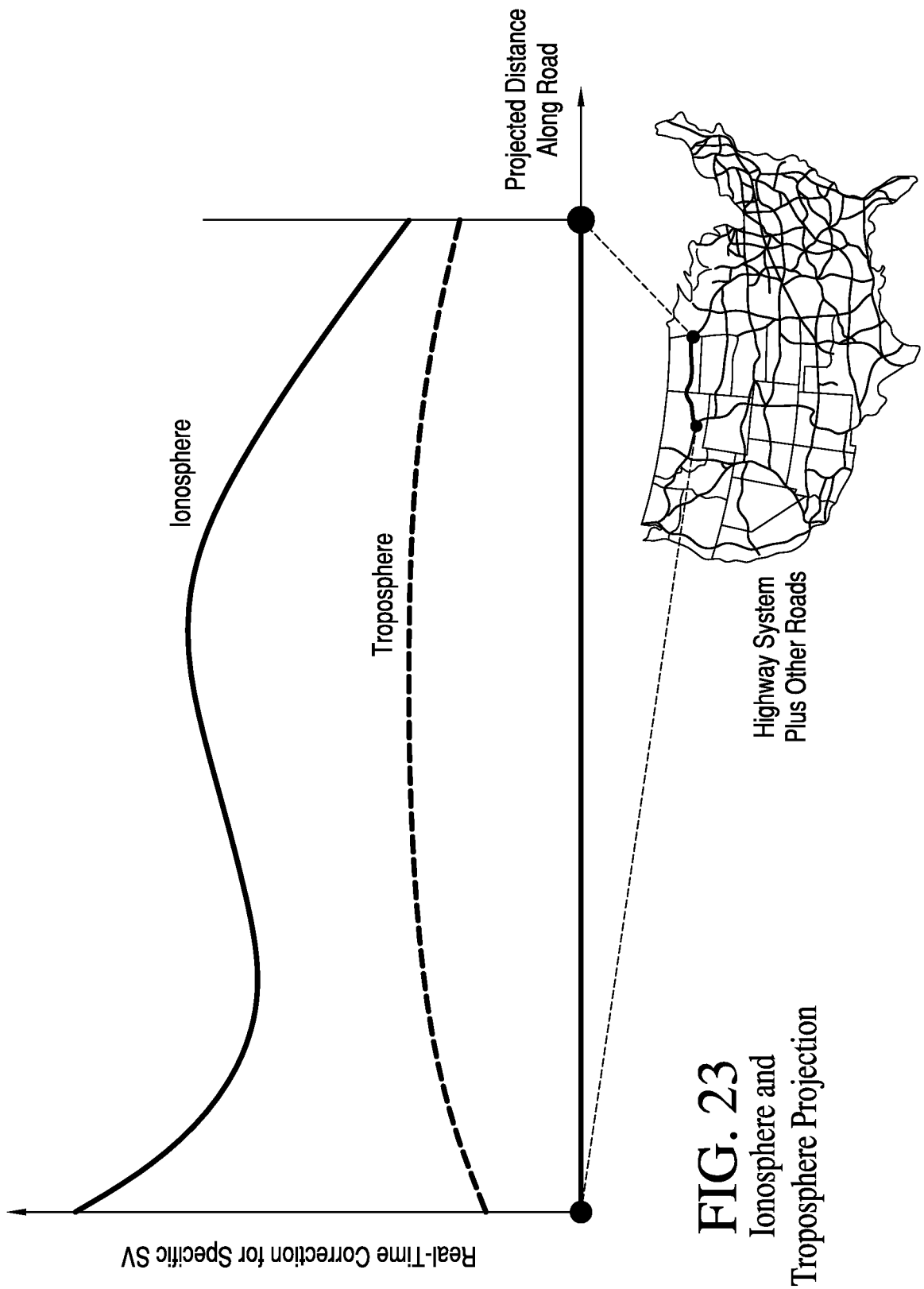
FIG. 23 shows an example of a projection of the estimated local ionosphere and troposphere projected along a roadway for a specific satellite.

For the map-only probe estimator, the operations center simultaneously estimates all GNSS and LEO orbits and clocks, probe vehicle locations, single-frequency ionosphere errors, troposphere, and maps the road, possibly with other cues such as camera images. The estimation time constant on the road map is long to ensure that spurious data points are suppressed. In the case where single frequency LEO satellites are mixed into the solution, the ionosphere and troposphere estimates for those satellites are included in the real-time data broadcast. Because of the complex, three-dimensional nature of the ionosphere and troposphere working in opposition to the high precision needed for the single-frequency timing and ranging measurements, a short-hand representation of each is constructed along roadways only for each satellite. Therefore, the only data that needs be included in the broadcast is that associated with integrated slices of the ionosphere that will (i) actually be needed by automobiles and (ii) be observable in the first place. In the most likely embodiment, a Total Electron Content (TEC) spline interpolates each mile marker, and a zenith troposphere spline interpolates each mile marker, both by space vehicle. FIG. 23 shows an example of a projection of the estimated local ionosphere and troposphere projected along a roadway for a specific satellite.

Commercial Signal Design for Non-Interference

Figure 24:
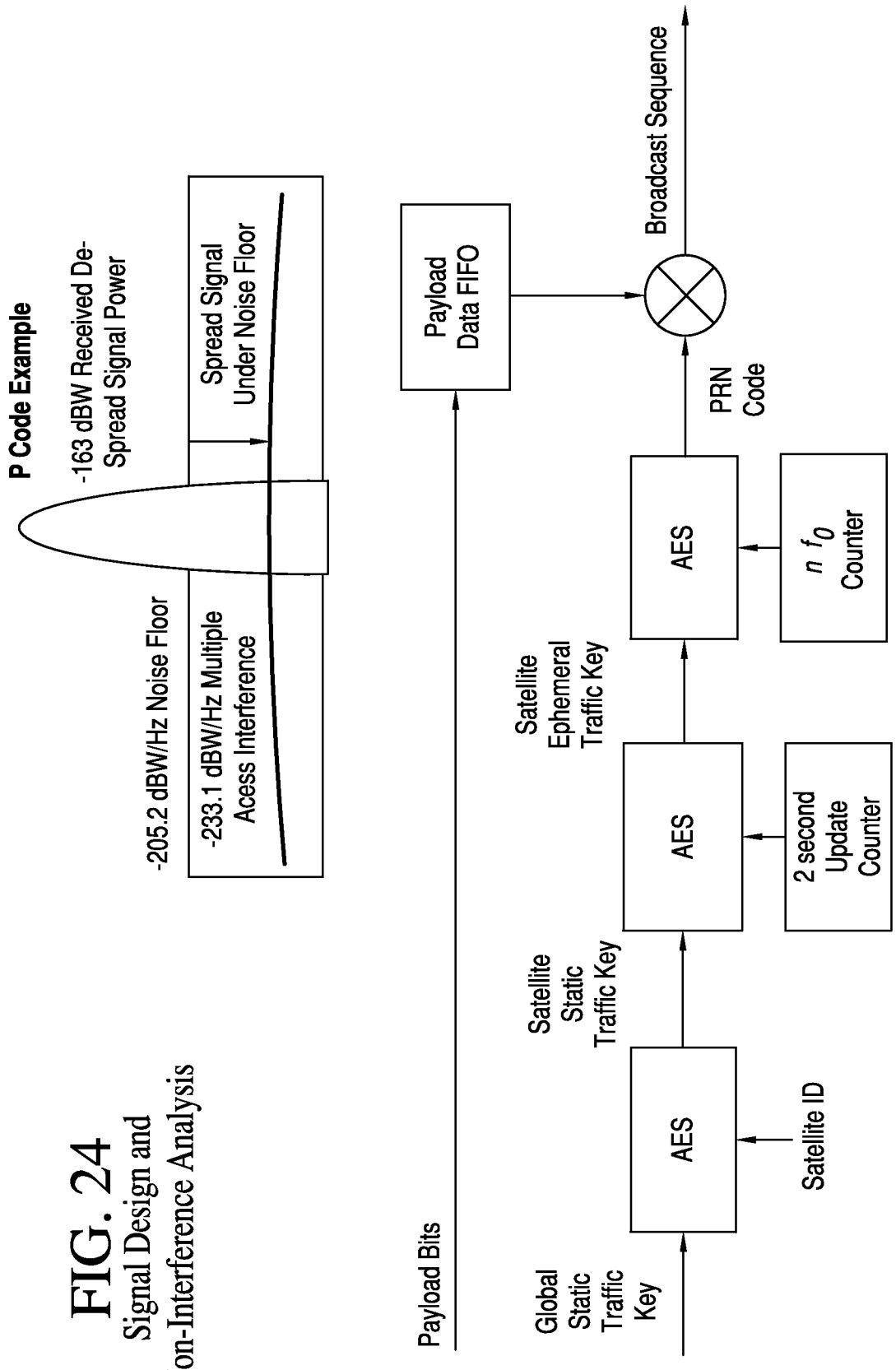
FIG. 24 shows the signal design in the context of non-interference analysis.

Maintaining a non-interfering signal relative to those of other GNSS satellites is vital. FIG. 24 shows the signal design in the context of non-interference analysis. Operating in LEO limits any potential C/A Code cross correlation to the 21.6 dB limit [Reference 11] for any 1023 period Gold Code and any Doppler shift. The cross correlations of L5, L1C, and L2C codes are significantly lower than the C/A code level.

Civil and commercial use will require encryption to preclude unauthorized use of the signals. Chipping rates are integer multiples, n, times the basic chipping frequency, $f_0$, of 1.023 Mcps. The value of n is selected to be compatible with existing or planned mobile devices, taking on the value of 1, 6, or 10, depending on the specific application. The block diagram in FIG. 24 shows the commercial code generator based on the Advanced Encryption Standard (AES) that is used on board the spacecraft and the user equipment. AES is known to be effectively indistinguishable from true random sequences.

The 10 $f_0$ chipping rate output yields crosscorrelation interference of −53.1 dB by same criteria as P Code. [Reference 12] Similarly, a chipping rate of 1 $f_0$ yields −43.1 dB crosscorrelation interference, all of which are compatible with existing GNSS satellites and receivers.

The encryption architecture provides for a chain of 128-bit symmetric traffic keys. The chain starts with a global static traffic key that is applicable system wide. The satellite identification converts the global key into a static traffic key that is unique to each satellite. Another rapid cycling step creates an ephemeral key that updates every other second. Depending on the trust level of a specific user device, either the global key or the ephemeral traffic key is disseminated to that user. Dissemination of the traffic keys is discussed further below for each use case.

Civil Signal Authentication

Today, GNSS signals are vulnerable to being spoofed. Many proposals have been made for protecting against civil spoofing, yet each has various practical shortcomings.

Figure 25:
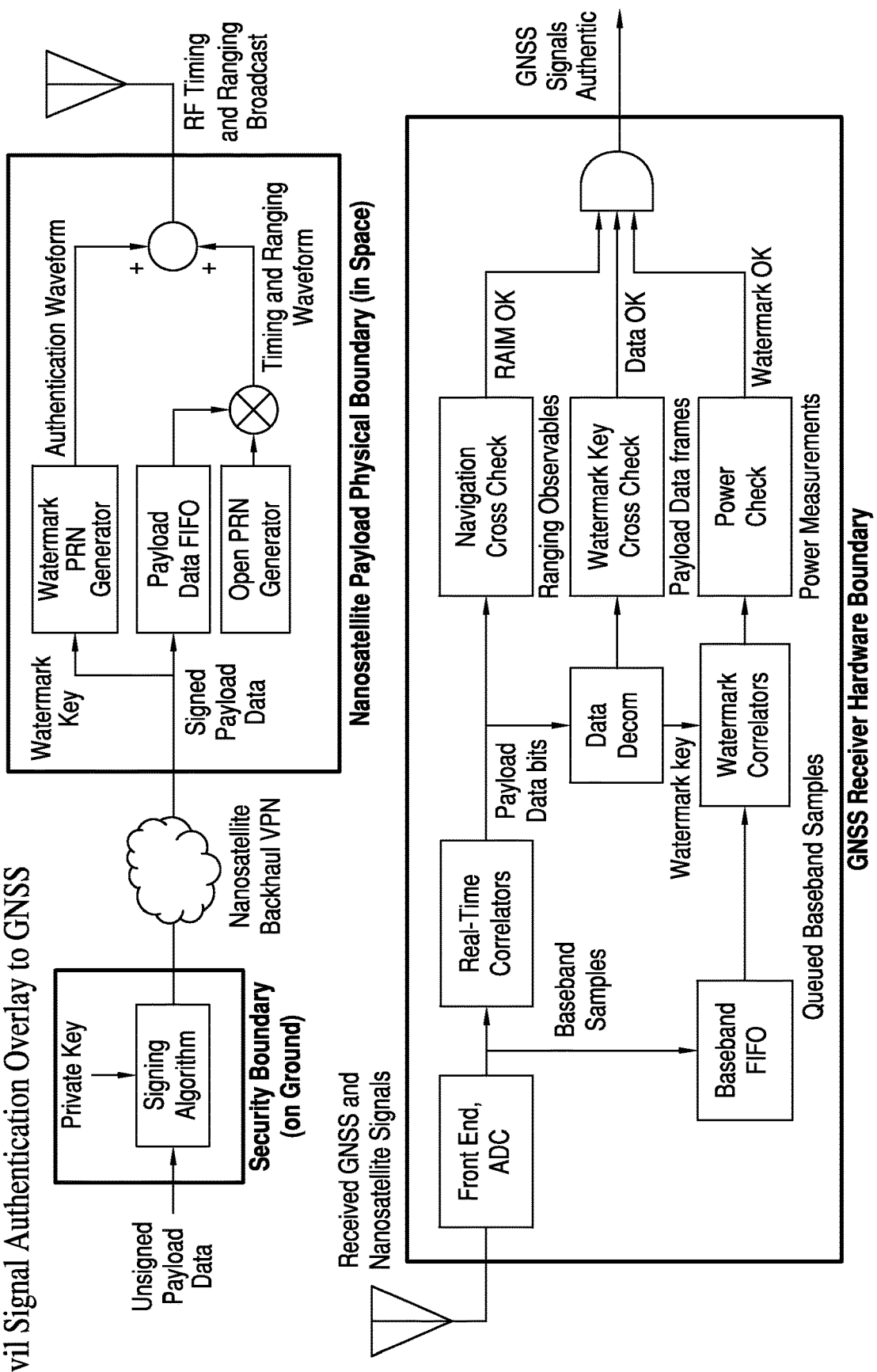
FIG. 25 shows the civil signal authentication overlay to GNSS.

FIG. 25 shows the civil signal authentication overlay to GNSS. The protection makes no assumptions about the structure of the GNSS signals. Furthermore, the GNSS space and control segments are assumed to be non-participatory and do not need to be modified. Only the signals broadcast by the SurePoint™ Nanosatellite overlay are required. SurePoint™ enables SurePoint™ Nanosatellite signal authentication to be transferred to the GNSS signals. Encryption of the GNSS signals is not required. The approach has the potential to work with most existing civil receiver designs or otherwise require only minimal modifications.

A trusted Air Navigation Service Provider (ANSP) such as the FAA controls the SurePoint™ Nanosatellite watermark traffic key. It can do so by operating or having operated the components of the ground and space segments that disseminate the SurePoint™ Nanosatellite payload data.

A digital signing algorithm that can be known to the public operates on the unsigned subframe of payload data. The signing function is carried out inside a secure hardware boundary and uses a private signing key that is known only to the trusted ANSP. The result is a symmetric watermark traffic key that is appended to the end of a subframe of payload data so as to be embedded in reserved bits in the final frame of the subframe. The signed payload data including the watermark key for each SurePoint™ Nanosatellite are uploaded and stored. The upload is protected in transit via a VPN. The payload data resides in a FIFO buffer. An open PRN code generated with an openly known algorithm, such as L1C or L5, synthesizes the SurePoint™ Nanosatellites' primary timing and ranging waveform. The payload data is modulated onto this open PRN code. Concurrently, the watermark key is used to generate an encrypted, spread-spectrum PRN code that serves as the watermark. This watermark code is combined with the data-modulated open code, and the aggregate is broadcast. The watermark and open waveforms can be arbitrarily defined. In the preferred embodiment, the watermark waveform provides a continuous rather than pulsed signal modulated with a defined relative power and phase (i.e., lying at a specific point in the continuum of in-phase and quadrature as defined by the watermark key) with respect to the open waveform, then summed with the open waveform.

Initially, the watermark key is not publicly available. The watermark key is embedded in the final frame of the payload data and is broadcast only at the conclusion of each subframe, i.e., after the rest of the subframe data has already been broadcast. In the payload data transmit sequence, the watermark key is finally broadcast in the final frame of the subframe, thereby making it known publicly after the fact.

The user equipment front end includes a low-noise amplifier, downconverter, and analog-to-digital converter. Correlator banks are divided into real-time and delayed (re-processed) versions. The re-processing capability enables the baseband samples to be analyzed once the watermark key is known for the presence of a proper watermark. By tracking the open component of the aggregate signal, the user receiver can demodulate and decommutate the payload data. The final frame of the subframe produces the watermark key. In a first authentication step, the data authentication algorithm operating on the payload data, the watermark key, and a public key that is pre-distributed and known to all must pass.

The prior baseband signal is then re-played and correlated with the watermark PRN code generated by the newly decoded watermark key. In a second authentication step, the vector power ratio (i.e., the magnitude and phase) of the watermark relative to the open signal components (or time varying profile thereof) must be consistent with the known broadcast configuration.

As the LEO satellites impress rapid angle motion onto the lines of sight of each SurePoint™ Nanosatellite, position fixes incorporating the GNSS satellites must pass simultaneous Receiver Autonomous Integrity Monitoring (RAIM) checking, and do so irrespective of the rapidly changing geometry.

To carry out the RAIM check with a tight integrity threshold, the combined GNSS and SurePoint™ Nanosatellite measurements from the above treatment of a carrier phase position fix and their solution are assembled together over K epochs as follows to create a residual test statistic, Q, such that $$Q = \left\| \begin{bmatrix} \Delta\rho'_1 \\ \Delta\rho'_2 \\ \vdots \\ \Delta\rho'_K \end{bmatrix} - \begin{bmatrix} R_1^T & +1 & & & h_1 & I \\ R_2^T & & +1 & & h_2 & I \\ \vdots & & & \ddots & \vdots & \vdots \\ R_K^T & & & +1 & h_K & I \end{bmatrix} \begin{bmatrix} \delta x \\ c\delta t_1 \\ c\delta t_2 \\ \vdots \\ c\delta t_K \\ b_T \\ b \end{bmatrix} \right\|_2$$

A threshold is selected to test against the hypothesis that the user is being spoofed over the measurement collection interval. In a simplified case where code phase is employed along with an a priori model of the troposphere, a simplified test statistic is employed as follows:

$$Q = \left\| \begin{bmatrix} \Delta\rho'_1 \\ \Delta\rho'_2 \\ \vdots \\ \Delta\rho'_K \end{bmatrix} - \begin{bmatrix} R_1^T & +1 & & \\ R_2^T & & +1 & \\ \vdots & & & \ddots \\ R_K^T & & & +1 \end{bmatrix} \begin{bmatrix} \delta x \\ c\delta t_1 \\ c\delta t_2 \\ \vdots \\ c\delta t_K \end{bmatrix} \right\|_2$$

In a further simplified case where no IMU is employed, the test statistic reduces to $$Q_k = \left\| \Delta\rho_k - [R_k^T \quad +1] \begin{bmatrix} \delta x_k \\ c\delta t_k \end{bmatrix} \right\|_2$$

The complete civil signal authentication requires all three separate tests (RAIM, power, and data) to pass. If any separate test fails, the user equipment issues an alarm that would indicate the presence of a fault, rare normal conditions, or possible spoofing.

Proof of User Position

Another key problem is establishing proof of position. Such capability can also be useful for authentication, establishing identity by using position as a factor. Proof of position is applicable to preventing fraud in financial transactions, law enforcement, toll road verification, pay-as-you-drive automobile insurance, protection of critical infrastructure, and resisting air traffic surveillance hacking.

Figure 26:
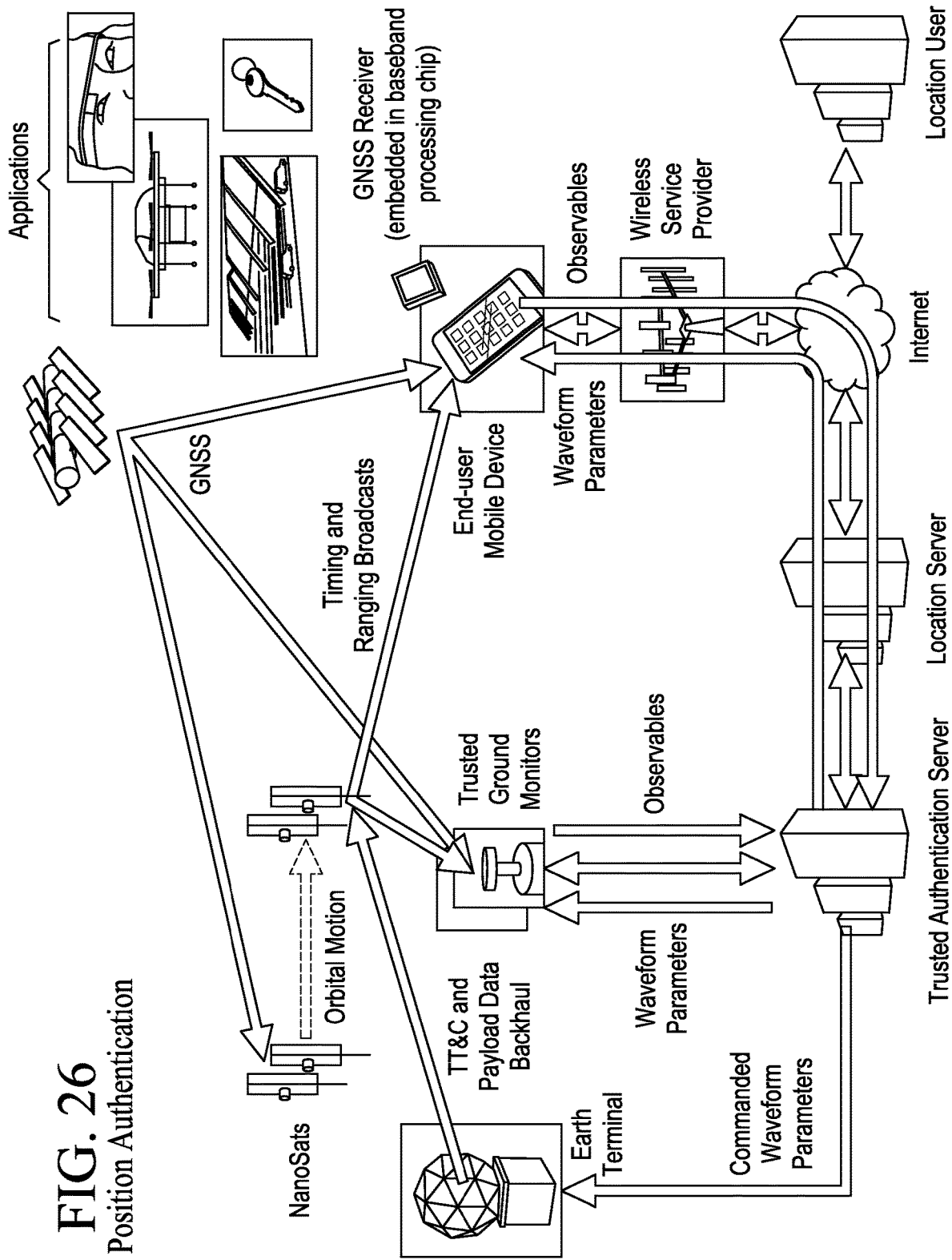
FIG. 26 shows the concept of operations for proof of user position.

FIG. 26 shows the concept of operations for proof of user position. Similar to the authentication waveform generated by the SurePoint™ Nanosatellite in the previous section on signal authentication, an encrypted, spread-spectrum waveform broadcast is the basis for user position authentication. The system network infrastructure is assumed to be trusted so as to protect the encryption keys used to generate the broadcast. Assuming that the orbits and clocks of the SurePoint™ Nanosatellites are already calibrated, trusted ground monitors in surveyed locations provide an independent check that the broadcast is operating properly.

The authentication server makes available to users a set of waveform parameters that can user devices can employ as aiding information for acquiring and tracking the Nanosatellite broadcasts. The waveform parameters include for each Nanosatellite user ID clock and ephemeris coefficients. For trusted use cases for authorized users, the waveform parameters also include traffic keys for the Nanosatellite broadcast to enable direct user device tracking of the encrypted waveform broadcasts. The authentication server is then able to access measurement observables generated by the mobile user devices.

A GNSS receiver operating normally tracks the GNSS satellites in view and estimates the user position and clock offset. In the preferred embodiment, the GNSS satellite timing and ranging observables are checked for consistency with one or more encrypted LEO Nanosatellite timing and ranging observables along one or more lines of sight to the satellite. A full user position authentication requires at least four, independent encrypted pseudoranges for three components of position plus time. LEO Nanosatellites offer a definitive test with fewer satellites, specifically with at two satellites in view operating over a short interval. Depending on the level of authentication required, even a single Nanosatellite servicing the entire Earth can offer value. If the Nanosatellite is performing random "spot checks" for user position fraud or if there is less time urgency to its detection, then fewer satellites are required. In the preferred embodiment, the constellation is sized to position at least a pair of Nanosatellites over every point on Earth at any given time. In such a configuration, position fraud can be detected in most cases nearly instantaneously upon demand, or with the remaining cases, to a very high confidence within tens of seconds.

Delegation of trust is employed. Three scenarios are considered in FIG. 27a-27c, including low, medium, and high trust of the user device. A Hardware Security Module (HSM) and standard Public Key Infrastructure (PKI) is used to disseminate information between the authentication server and one or more user devices. The user device that contains the HSM is initialized at a trusted facility. The HSM generates an asymmetric public-private key pair for encryption and a second pair for digital signing. The public key is provided to the authentication server. When the authentication server needs to securely convey encrypted information such as new traffic key (or precise clock and ephemeris aiding data) to a specific user device, it encrypts the information using that user device's public encryption key, and then transmits the data to the user device. The user device HSM then uses its private encryption key to decrypt the information. The user device is designed such that the private key, traffic key, or ciphers cannot be readily accessed via physical attack. Similarly, measurement observables generated by a user device are digitally signed by the HSM, then the data package is conveyed to the authentication server.

Figure 27A:
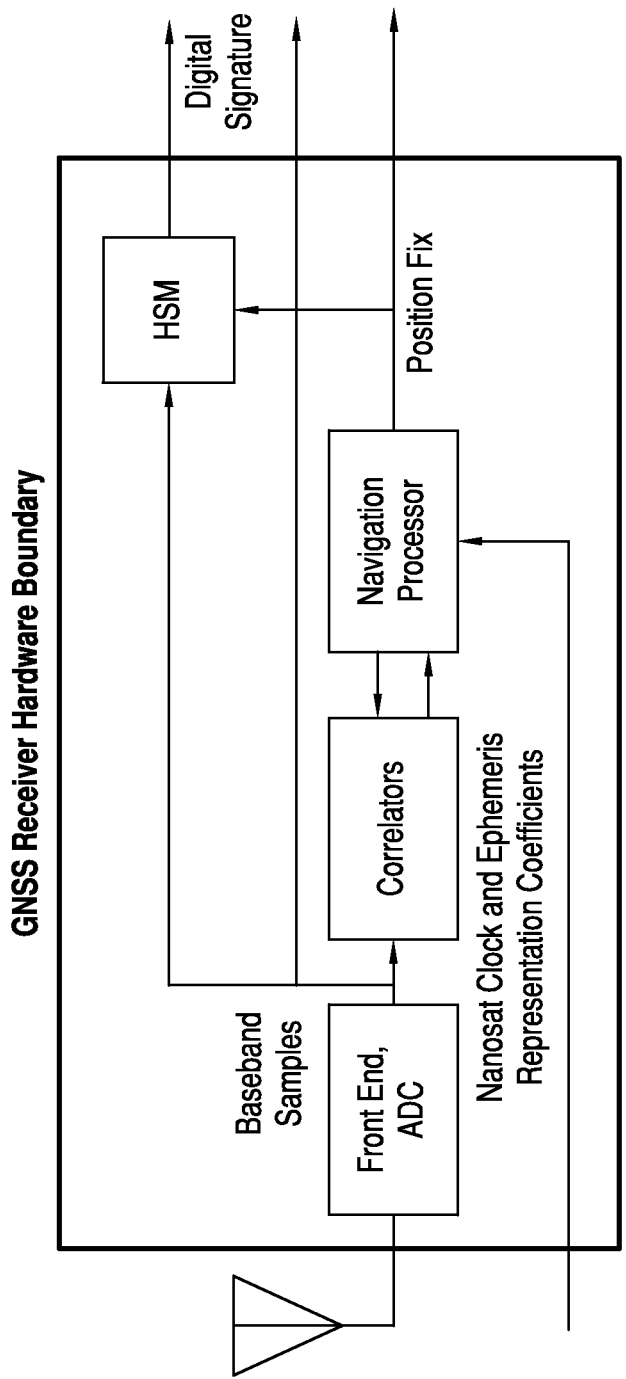
FIGS. 27a, b, and c show support components for proof of position.

The low-trust user device case, shown in FIG. 27a, conveys digitally signed position fix and raw baseband measurement observables back to the authentication server, wherein the GNSS and (with knowledge of the traffic key) Nanosatellite measurement observables are converted into pseudorange measurements. These pseudorange measurements are converted into a position fix and a RAIM flag consistent with the RAIM variants provided in the previous section on signal authentication. For the position fix to be authenticated, the Nanosatellite received signal power must lie within the proper envelope, and the RAIM check must pass. The low trust user device case has a minimum of security provisions, although there is a penalty of increased bandwidth.

Figure 27B:
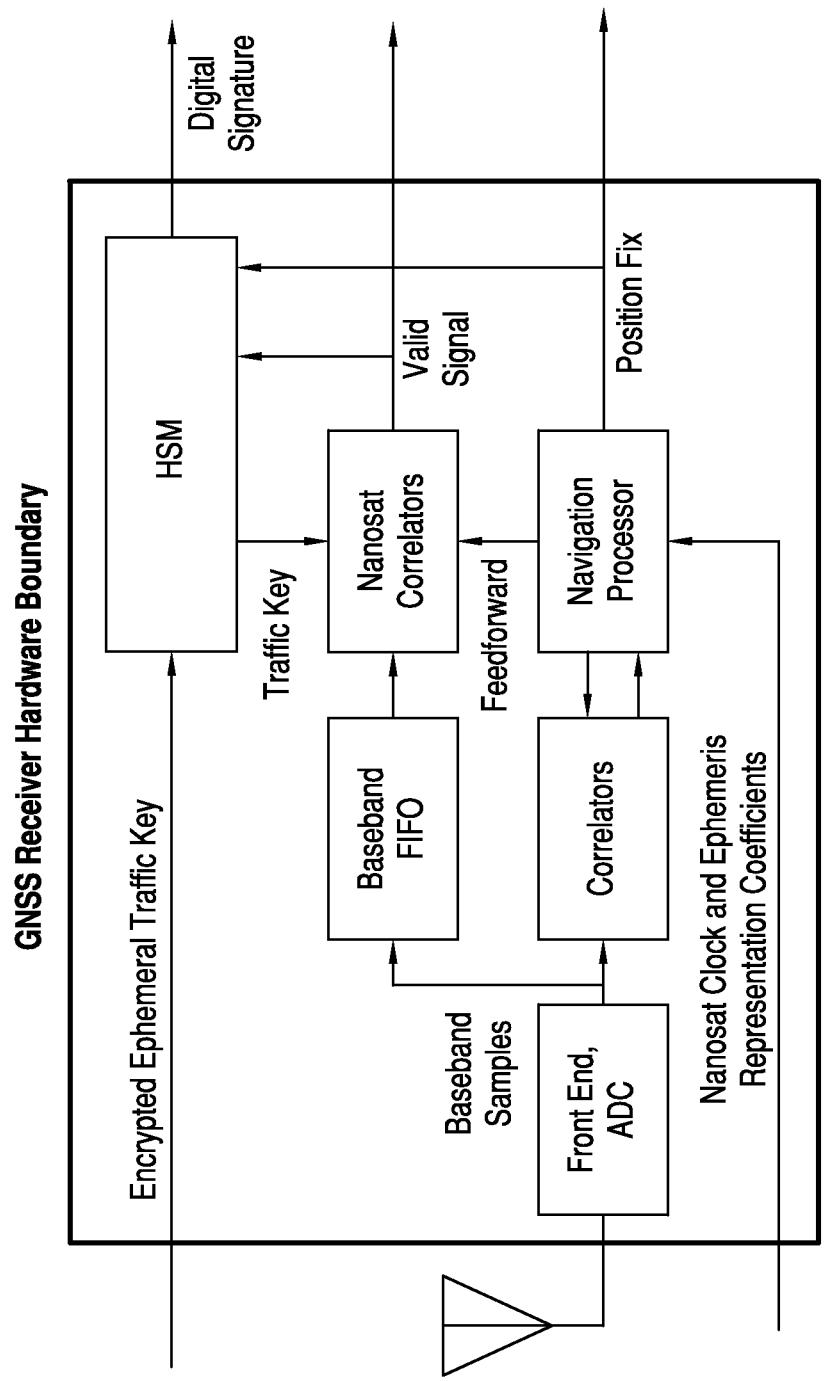
Figure 27C:
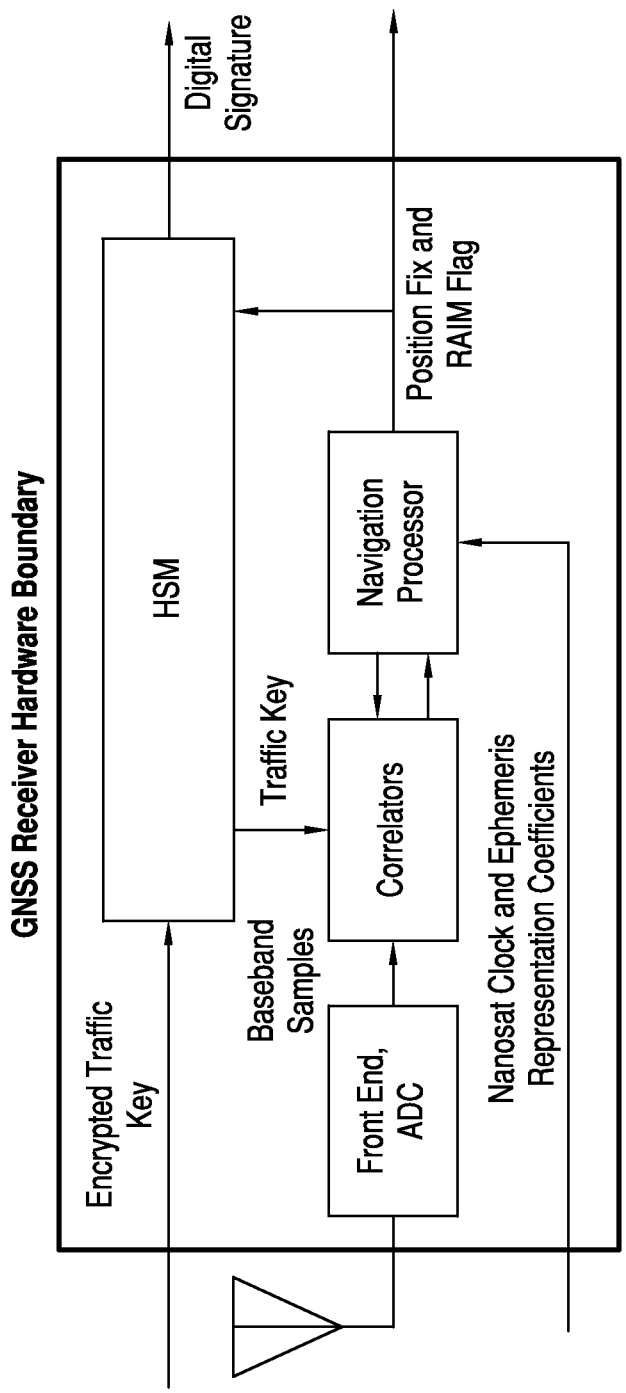

The medium-trust user device, shown in FIG. 27b, envisions a scenario where there is some risk of an attack on a single user device article that would compromise a system-wide traffic key that an adversary would exploit for forgeries. The baseband FIFO delays the baseband samples for a short period of time, and the traffic key is disseminated to the user device after the fact, i.e., a second or two in the case of the rapid cycling ephemeral traffic key shown in FIG. 24. The authentication, therefore, lags by a second or two. The position fix estimates are used in conjunction with the SurePoint™ Nanosatellite orbit and clock predictions to calculate a pseudorange and Doppler feedforward for the Nanosatellite correlators. For the position fix to be authenticated, the Nanosatellite received power levels must lie within the proper range, i.e., the valid signal discrete will be affirmative. Minimal bandwidth demands are made of the network.

For the high-trust user device case, the PKI securely disseminates the global traffic key to the trusted device HSM. In this case, the real-time correlators include all GNSS satellites and Nanosatellites with the correlators outputting pseudorange in real time. The high-trust user device case carries out all-in-view positioning with both the GNSS and SurePoint™ Nanosatellites, employing the RAIM integrity check from the previous section on signal authentication. For the position fix to be authenticated, the Nanosatellite received power levels must lie within the proper range, and the RAIM check must pass. The digitally signed position fix and RAIM residuals are transmitted back to the authentication server, requiring only minimal bandwidth demands of the network.

User Estimation of Spacecraft Clock

Common wisdom is that satellite navigation requires an atomic clock in the spacecraft. In fact, a system designer may have multiple sub-system options for keeping spacecraft time, including crosslinks and other ultra-stable clocks. Each will have attendant performance and cost considerations. To the extent that a system designer would realize cost benefits by having the choice of a possible lower-cost alternative, the following development shows how an oven-controlled crystal oscillator (OCXO) could be employed for accurate, carrier-phase-based positioning to open up the choices and available trade space.

Consider a satellite, i, in a known orbit but with an uncalibrated clock. From above, the corresponding user observation equation becomes $$\Delta \rho'_i(t) = \hat{r}_i(t) \cdot \delta x + c \delta t(t) - c \delta t_i(t) + h_i(t) b_T + b_i + n'_i(t)$$

Satellite clock frequencies maintain their stability according to their Allan deviation. A simplified linear model applies a defined satellite clock stability time constant, wherein the transmitted carrier phase can be bounded to within a specified range tolerance, such as 0.5 cm. The user observation equation then becomes $$\Delta\rho'_i(t) = \hat{r}_i(t) \cdot \delta x + c\delta t(t) - c(\alpha_i + \alpha'_i t) + h_i(t) b_T + b_i + n'_i(t)$$

Under this definition the satellite clock bias is indistinguishable from the cycle ambiguity bias, which is now carried as $b'_i$ $$\Delta\rho'_i(t) = \hat{r}_i(t) \cdot \delta x + c\delta t(t) - c\alpha'_i t + h_i(t) b_T + b'_i + n'_i(t)$$

The observation equations may then be stacked into matrix form as above $$\begin{bmatrix} \Delta\rho'_1(t) \\ \Delta\rho'_2(t) \\ \vdots \\ \Delta\rho'_N(t) \end{bmatrix} = \begin{bmatrix} \hat{r}^T_1(t) & 1 \\ \hat{r}^T_2(t) & 1 \\ \vdots & \vdots \\ \hat{r}^T_N(t) & 1 \end{bmatrix} \begin{bmatrix} -t & & & \\ & -t & & \\ & & \ddots & \\ & & & -t \end{bmatrix} \begin{bmatrix} h_1(t) & 1 & & \\ h_2(t) & & 1 & \\ \vdots & & & \ddots \\ h_N(t) & & & & 1 \end{bmatrix} \begin{bmatrix} \delta x \\ c\delta t(t) \\ \hline ca'_1 \\ ca'_2 \\ \vdots \\ ca'_N \\ \hline b_T \\ \hline b'_1 \\ b'_2 \\ \vdots \\ b'_N \end{bmatrix} + n'(t)$$

This system of equations can be implemented in a sequential estimator over multiple epochs, k, so as to render the LEO clock slope observable. In the preferred embodiment, however, it is further desired to estimate the LEO satellite clock biases under conditions where the user equipment is (i) subject to jamming or interference and also (ii) employs a low-cost oscillator that can only provide coherent integration for a short interval. This case is further developed following the correlation approach initially described above.

In shorthand notation, a vector of $\Delta\rho\rho'$ observables is assembled for each epoch, k:

$$\Delta\rho'_k = [R^T_k \quad +1 \quad -It_k \quad h_k \quad I] \begin{bmatrix} \delta x \\ c\delta t_k \\ ca' \\ b_T \\ b' \end{bmatrix} + n'_k$$

As above with the inter-satellite detection case under interference, the differencing operator, $\pi$, is applied to both sides of the observable equation as follows:

$$\Pi\Delta\rho'_k = \Pi[R^T_k \quad +1 \quad -It_k \quad h_k \quad I] \begin{bmatrix} \delta x \\ c\delta t_k \\ ca' \\ b_T \\ b' \end{bmatrix} + \Pi n'_k$$

The resulting system of equations for the epoch is then given by $$\Delta\rho''_k = [\Pi R^T_k \quad -\Pi t_k \quad \Pi h_k \quad \Pi] \begin{bmatrix} \delta x \\ ca' \\ b_T \\ b' \end{bmatrix} + n''_k$$

Incorporating the known greater stability of the GPS satellite frequency standard, the GPS clocks are calibrated in advance of a satellite pass and therefore predicted and brought over to the left hand side of the observation equation. A new differencing operator, $\pi_{LEO}$, is defined that only retains columns of $\pi$ that operate on LEO satellites, leaving the following modified observation equation:

$$\Delta\rho''_k = [\Pi R^T_k \quad -\Pi_{LEO} t_k \quad \Pi h_k \quad \Pi] \begin{bmatrix} \delta x \\ ca'_{LEO} \\ b_T \\ b' \end{bmatrix} + n''_k$$

Taking advantage of the rapid angle change in geometry, K epochs can be stacked as follows to solve for the position offset, LEO clock bias rate, zenith troposphere, and carrier phase biases:

$$\begin{bmatrix} \Delta\rho''_1 \\ \Delta\rho''_2 \\ \vdots \\ \Delta\rho''_K \end{bmatrix} = \begin{bmatrix} \Pi R^T_1 & -\Pi_{LEO} t_1 & \Pi h_1 & \Pi \\ \Pi R^T_2 & -\Pi_{LEO} t_2 & \Pi h_2 & \Pi \\ \vdots & \vdots & \vdots & \vdots \\ \Pi R^T_K & -\Pi_{LEO} t_K & \Pi h_K & \Pi \end{bmatrix} \begin{bmatrix} \delta x \\ ca'_{LEO} \\ b_T \\ b' \end{bmatrix} + \begin{bmatrix} n''_1 \\ n''_2 \\ \vdots \\ n''_K \end{bmatrix}$$

This system of equations can be solved via a least squared fit. In practice there may be missing measurements that can be appropriately excised in the matrix construction. In the preferred embodiment, sequential estimation and RAIM is employed.

Assuming an altitude, h, of 800 km and a velocity, v, of 9 km/sec. The objective is to minimize the observation time constant, h/v, which can be accomplished by operating the satellite as low as possible to the Earth, but high enough such that atmospheric drag can be managed (thereby minimizing h) and operating the LEO satellites in retrograde orbits (thereby maximizing v). The resulting time constant for convergence is about 80-90 seconds in this example. MEO GNSS satellites have a time constant that is significantly longer.

Figure 28:
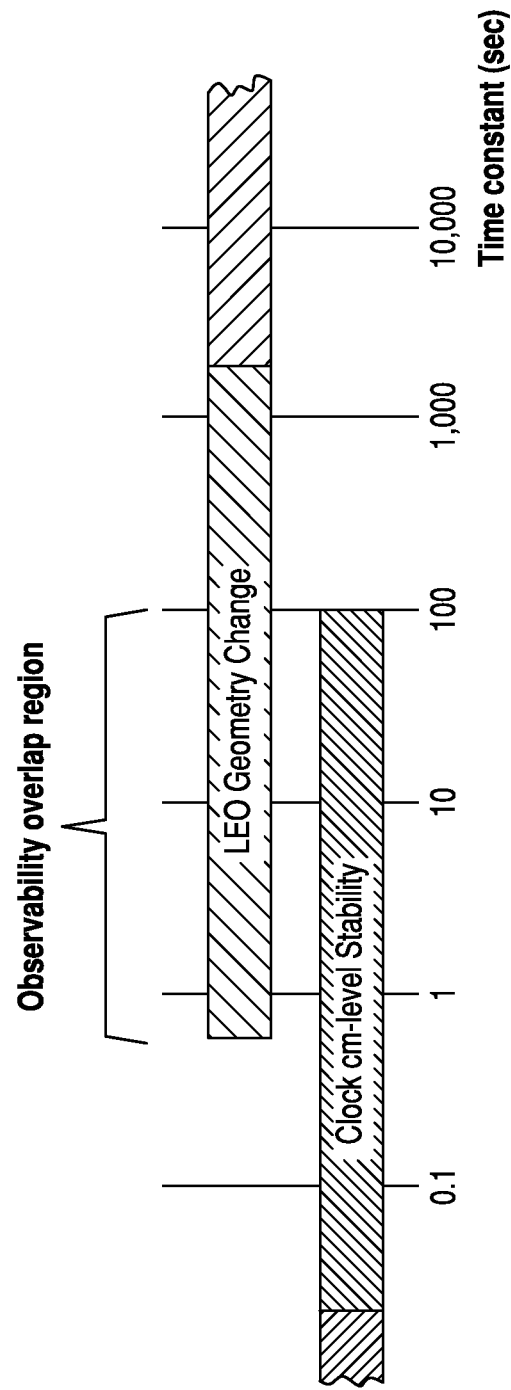
FIG. 28 shows how an uncalibrated clock can be applied to precise positioning.

FIG. 28 shows how the time scales of an uncalibrated clock and rapid angle LEO motion can be applied to solve for the unknowns in precise positioning. The objective is to align the above-derived observability time constant to be consistent with the time constant of satellite clock stability. The above convergence time of 80-90 seconds happens to be aligned with the stability that can be obtained from an OCXO for centimeter-level performance. Therefore, the OCXO running open loop can provide the spacecraft timing reference. Yet the overall system still provides high accuracy, integrity, and jamming resistance for safety of life applications.

The LEO Nanosatellites enable a high-integrity solution with as few as 2 LEO satellites in view. For higher availability to account for occasional satellite failures, the system redundancy can be architected for three LEO satellites to be in view of users for any location on Earth. The preferred embodiment ensures that three LEO satellites are in view of users for any location on Earth for the specified minimum elevation angle. In the event of a satellite failure, a spare is can be quickly drifted towards the open slot. In the meantime, users experience no interruption in service. In the unlikely event that two satellite failures occur over exactly the same location (this would lead to outages limited to a few minutes over small, unique locations on Earth with a rare repeat cycle), the short gap could be managed by predicting in advance when it would occur. Within a couple of weeks, spares can be operational.

Pseudolite Implementation

In urban areas, satellites may not be completely visible. Improved performance derived from the LEO satellites can be extended to urban areas even in locations where coverage of the sky may be blocked. In this example, pseudolites (pseudo satellites) can be employed on a line-of-sight basis to carry out positioning and to do so with RAIM for full integrity. The oscillators in the pseudolites are designed to operate on a free running basis, i.e., no synchronization is required. Yet, due to the intrinsic medium term stability of the device (on the order of ten seconds), the vehicle may solve for its position. In this case the transmitter can be low cost because it is run using an uncalibrated clock. There is no explicit need for the transmitter to have a data backhaul or an ultra-stable reference. The preferred embodiment is able to operate only with knowledge of the oscillator stability specification stored in its navigation database. For example, it may be known that a given device (i) is capable of sustaining centimeter-level error (root TVAR) over an interval of 10 seconds and (ii) has its clock rate be bounded by a certain number of parts per billion. Although the frequency offset of the device may be unknown and may in fact drift from day to day and with temperature and other factors, the short-term clock stability is what is exploited in the embodiment—just as in the case for the SurePoint™ satellite given in the above treatment for the case of an uncalibrated oscillator.

The new navigation treatment is therefore given as $$\begin{bmatrix} \Delta\rho_1'' \\ \Delta\rho_2'' \\ \vdots \\ \Delta\rho_K'' \end{bmatrix} = \begin{bmatrix} \Pi R_1^T & -\Pi_{PL}t_1 & \Pi \\ \Pi R_2^T & -\Pi_{PL}t_2 & \Pi \\ \vdots & \vdots & \vdots \\ \Pi R_K^T & -\Pi_{PL}t_K & \Pi \end{bmatrix} \begin{bmatrix} \delta x \\ c\dot{a}_{PL}' \\ b' \end{bmatrix} + \begin{bmatrix} n_1'' \\ n_2'' \\ \vdots \\ n_K'' \end{bmatrix}$$

where the troposphere is assumed to be neglected for the pseudolite links and calibrated for the satellite links by the ground network. Furthermore, the GPS and LEO clocks are also assumed to be calibrated by the ground network, so the differencing operator $\pi_{PL}$ only applies to the unknown clock rates for the pseudolites.

Figure 29:
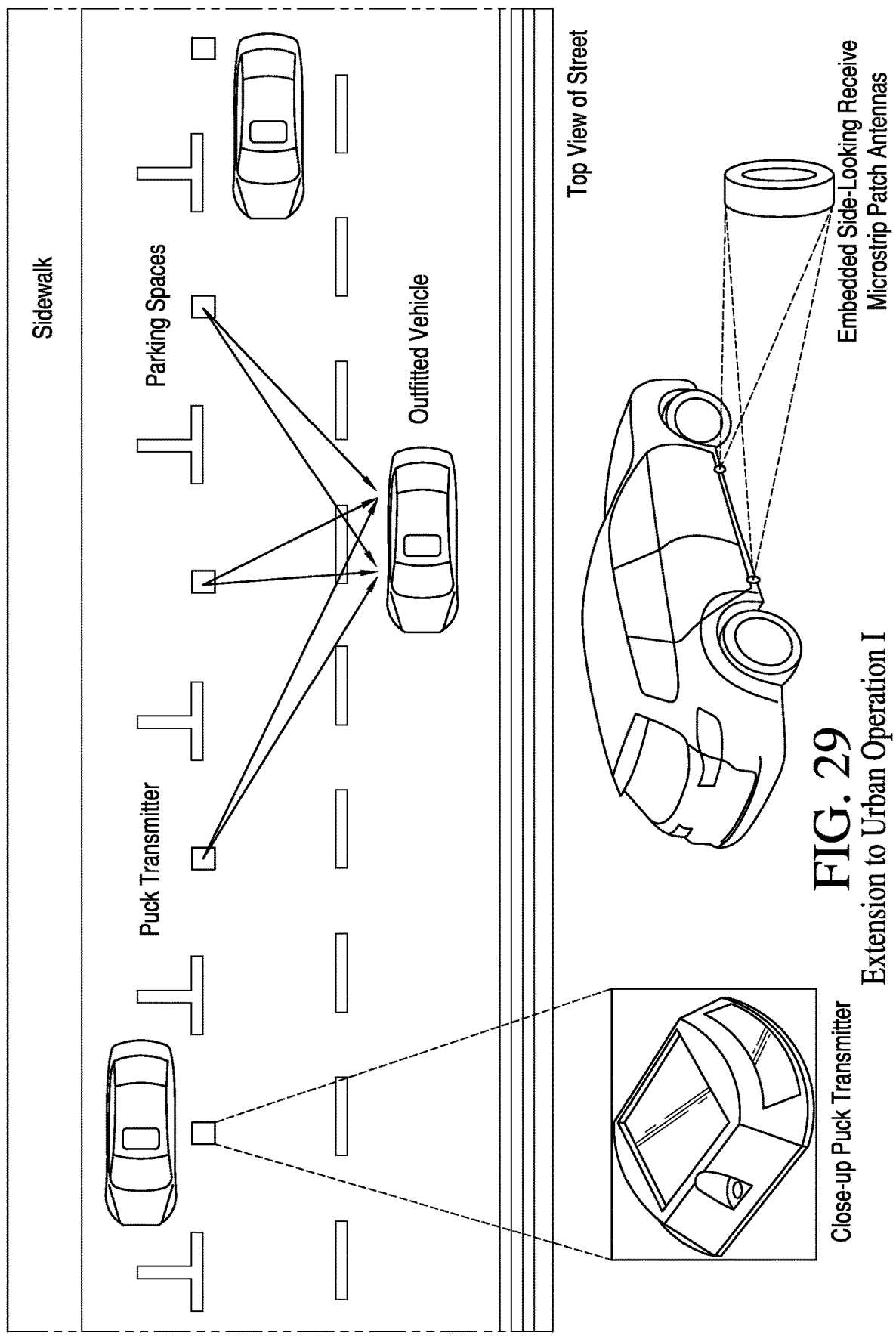
FIG. 29 shows an extension to urban operations using street-level pseudolites.

Two cases illustrate the approach: FIG. 29 shows a case where the pseudolites are mounted in the street embedded in puck transmitter, and FIG. 30 shows a case where the pseudolite is elevated above the street.

For the street-level approach, parking systems like Streetline are now already being installed nationwide based on puck sensors embedded in parking spaces that can detect the presence of a car. These parking pucks contain built-in transceivers to form ad hoc communication networks to route the sensor output to a service data processor. The broadcast from each transceiver could serve as a pseudolite to form an urban network of low-power, navigation broadcasts for vehicle use. In this implementation, radio receive antennas integrated into cars can receive the broadcast, measure the carrier phase, and perform radiometric ranging. Additional information, including heading, becomes available with two or more antennas integrated on the vehicle. The navigation processing equations introduced above for the case where the satellite broadcast clock is uncalibrated are directly applicable. Assuming that the pseudolite clock is uncalibrated but remains stable to the centimeter level for a time constant on the order of 10 seconds, the interval is long enough for the car to traverse a large angle relative to the pseudolite. The navigation processor in the car solves for the automobile position as well as the pseudolite clock and clock rate for each pseudolite used in the solution. Therefore, the only information required for installation of the pseudolite is an accurate survey.

For the elevated transmitter case in FIG. 30, again the transmitters are small, low cost items that can easily be embedded in large scale. This variant can also operate at low cost on a free-running basis. It can employ a low-power broadcast using solar power. Installation consists of physical mounting only on stable object. It can be self surveyed and monitored via probe vehicles. Its frequency can be tuned to selected bands, including the DSRC V2I band already planned for use with vehicles. In particular, since only the carrier component is used for navigation, pseudolite use is compatible with concurrent data modulation. Therefore, wireless applications using, for example, the 5.9 GHz band can be compatible with user equipment already planned for vehicles.

Defense and Intelligence Applications

GPS is legendary for its dual use attributes, enabling both national security and civil-commercial capabilities to benefit each other. In the following sections, further embodiments are described relating to dual use and defense and intelligence, including 1. re-applying the above-described civil and commercial PNT embodiments to defense and intelligence;
2. tailoring new PNT embodiments specifically for defense and intelligence;
3. describing new PNT-enabled embodiments for defense and intelligence; and
4. disclosing new embodiments for cost savings to benefit both civil-commercial use and defense and intelligence.

Military Anti-Jam and High Availability

For military use, the invention offers capacity for unprecedented new performance, including high mask angle visibility, rapid acquisition of sub-decimeter accuracy and safety of life integrity, enhanced robustness, and continuous regional high power with low recurring cost. GPS is an enormous U.S. success. Nevertheless, the new performance can address categorical GPS improvement needs, including reductions in sustainment costs for the GPS constellation, enhanced signal security, enhanced robustness of the constellation, reduced time to first fix, enhanced accuracy, enhanced canyon and urban canyon performance, and reduced jammer susceptibility.

Figure 31:
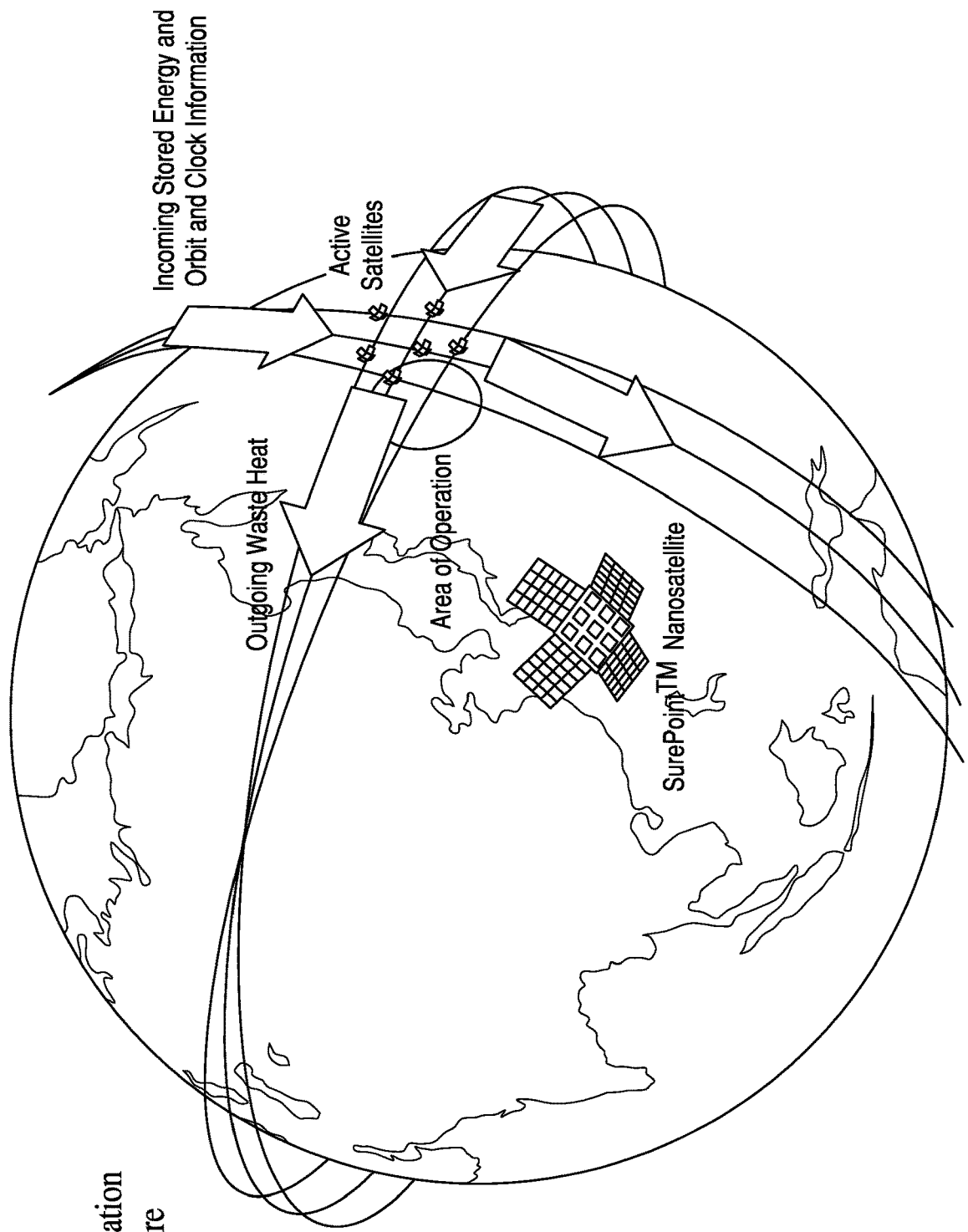
FIG. 31 shows the physical configuration for the military application to anti-jam and high-elevation-angle operations.

FIG. 31 shows the physical system architecture. At least 100 low-cost satellites (possibly nanosatellites, i.e., <10 kg) in low Earth orbit (LEO) form a global overlay to GPS. Integrated ranging and communications among the nanosatellites create a new network that provides new system-level resiliency against vulnerabilities to both GPS and the nanosatellites. A major emphasis is high power for anti-jam protection and indoor penetration and high elevation angle availability for mountainous and urban canyon environments. Anti-jam and new indoor capability is achieved by providing sustained raw broadcast power at a significantly increased power level within a defined regional Area of Operation (AoO). High availability is achieved by sizing the constellation to maintain low Precision Dilution of Precision (PDOP). Such PDOP is maintained above a high elevation mask threshold, for example 45 deg or more. Not all the satellites in the constellation are shown in the figure—only those over the AoO.

LEO satellites operate at sufficiently low altitude such that their broadcast power can be switched on and off or continuously modulated as they pass over various regions of the Earth, such as the AoO. A small-aperture, nadir-face phased array provides agile steering for the broadcast beam to precisely illuminate the AoO. By combining such power modulation and steering from a low altitude, simple hardware can maintain fine control of the illuminated region boundaries. Rather than emphasizing a continuously operating spot beam broadcast from high gain antennas on modified GPS satellites, the system employs onboard battery capacity and wide bandgap power amplifiers, such as Gallium Nitride (GaN), operating over short intervals of only a few minutes at high power, potentially one kiloWatt r.f. or more per satellite. An orbital cycle provides about 12 hours of precise orbit and clock estimation between AoO passes. Over the same interval, solar cells charge the battery. When the satellite reaches the AoO, the GaN power amplifier derives its energy from the charged battery to broadcast a high-power, GPS-compatible timing and ranging beam into the AoO. The pass lasts just a few minutes, during which waste heat from the power amplifier accumulates in a heat capacitor. Over the subsequent 12 hour recovery (which overlaps the aforementioned preceding 12 hour calibration and charging interval) the waste heat is dissipated.

The system harnesses deep integration of the electronics, power, thermal, and structural elements, such that the satellites can be more readily produced in quantity and at minimum volume, mass, and cost. Furthermore, by minimizing overall constellation mass, the launch costs can also be driven down.

Figure 32:
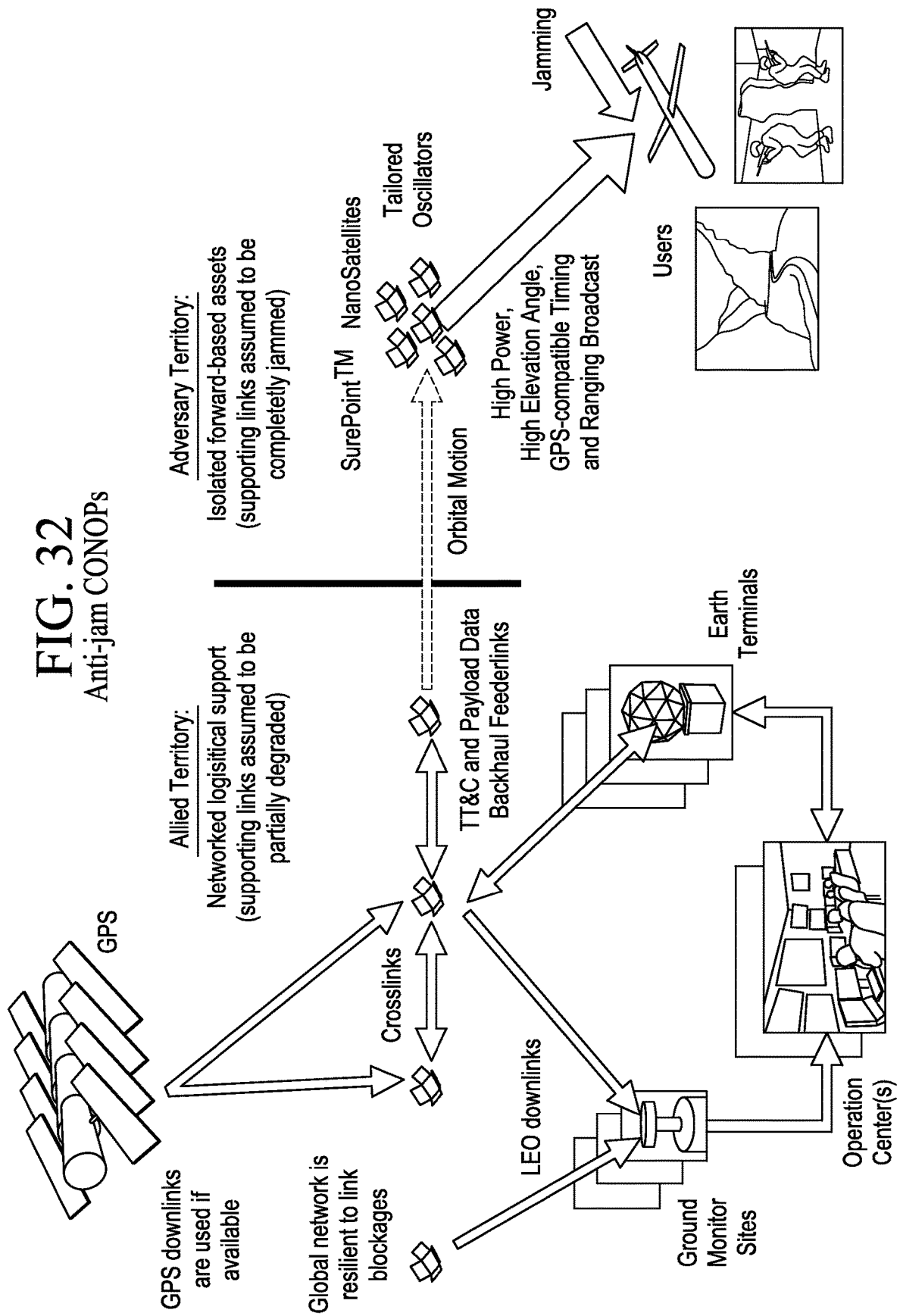
FIG. 32 shows the concept of operations for military anti-jam.

FIG. 32 shows the concept of operations. The satellite design supports the use of an oscillator whose stability is optimized to minimize part cost yet exploit the LEO orbit and network architecture to obtain full performance, potentially for sub-decimeter accuracy. The Earth is conservatively divided into two regions: semi- and fully adversarial. The satellite orbits and clocks are calibrated over allied (semi-adversarial) territory in preparation for transit into adversarial territory. In allied territory, it is assumed that attacks on the system only partially degrade estimation using the supporting GPS downlinks, LEO downlinks, crosslinks, and feederlinks. When the satellite overflies allied territory, the system forms a resilient network allowing the supporting links to be jammed all of the time in some places or some of the time in all places but not all of the time in all allied places. Over adversary territory, however, the satellite supporting links are assumed to be completely non-operational. The LEO downlink is then sized for brute force overpowering of adversary jamming against user equipment.

The high-power transmit signal can be in the GPS band, or the signal can be broadcast out of band to further elude adversary jamming. The in-band option is designed to be compatible with existing GPS user equipment, subject to a software modification.

The system architecture offers cost reduction by virtue of its physical design, offering categorical improvements in system- and satellite-level simplicity and, therefore, cost. Second, cost reduction can be further expressed in terms of on-orbit constellation mass as a proxy, since launch costs tend to dominate. The result is a significant regional increase in continuous broadcast power at high elevation angles at significantly lower cost.

The operational configurations can be highly flexible in terms of how they can be used with GPS. For example, multiple AoOs of larger size can be selectively illuminated with a higher power signal on an agile basis, subject to constellation power resource constraints. The LEO altitude enables the broadcast to conform precisely to the edges of an AoO boundary, further minimizing power consumption and collateral interference.

A key attribute of the system architecture is the simplicity of its thermal control subsystem. One of the biggest issues in designing and building reliable, low-cost, high-power satellites is thermal management of the payload power amplifiers, each generating more than several hundred Watts of r.f. power on a low duty cycle. In just a few minutes of on time, they generate significant waste heat that needs to be dissipated over the next 12-hour repeat cycle. An example 150 W power amplifier is shown FIG. 33 highlights its small physical size. The preferred embodiment employs a Phase Change Material (PCM).

Figure 33:
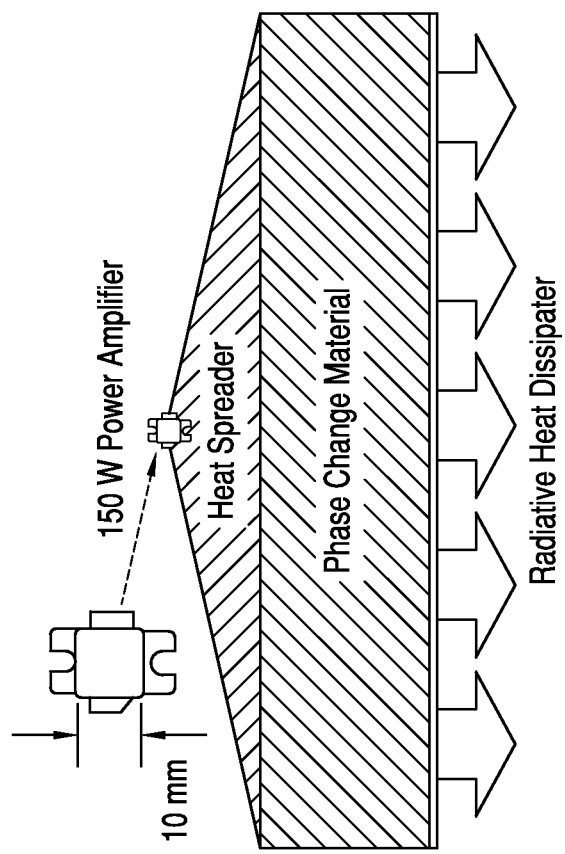
FIG. 33 shows a power amplifier and its associated thermal management.

PCMs have high heats of fusion; as a result, they can absorb significant energy during melting while temperature remains constant. PCMs can be a simple and low-cost solution. As a PCM absorbs the thermal energy, the temperature begins to rise to its melting point. Once melting has started in PCM, the temperature stays constant during the phase change. This occurs because the thermal energy from the heat source is being used to change the phase of the material from solid to liquid or vice versa. The selection and sizing of the PCM depends on the desired temperature and the amount of thermal energy generated by the power amplifiers. FIG. 33 illustrates the approach for how the PCM can capture the waste heat, then slowly dissipate it over time.

Figure 34:
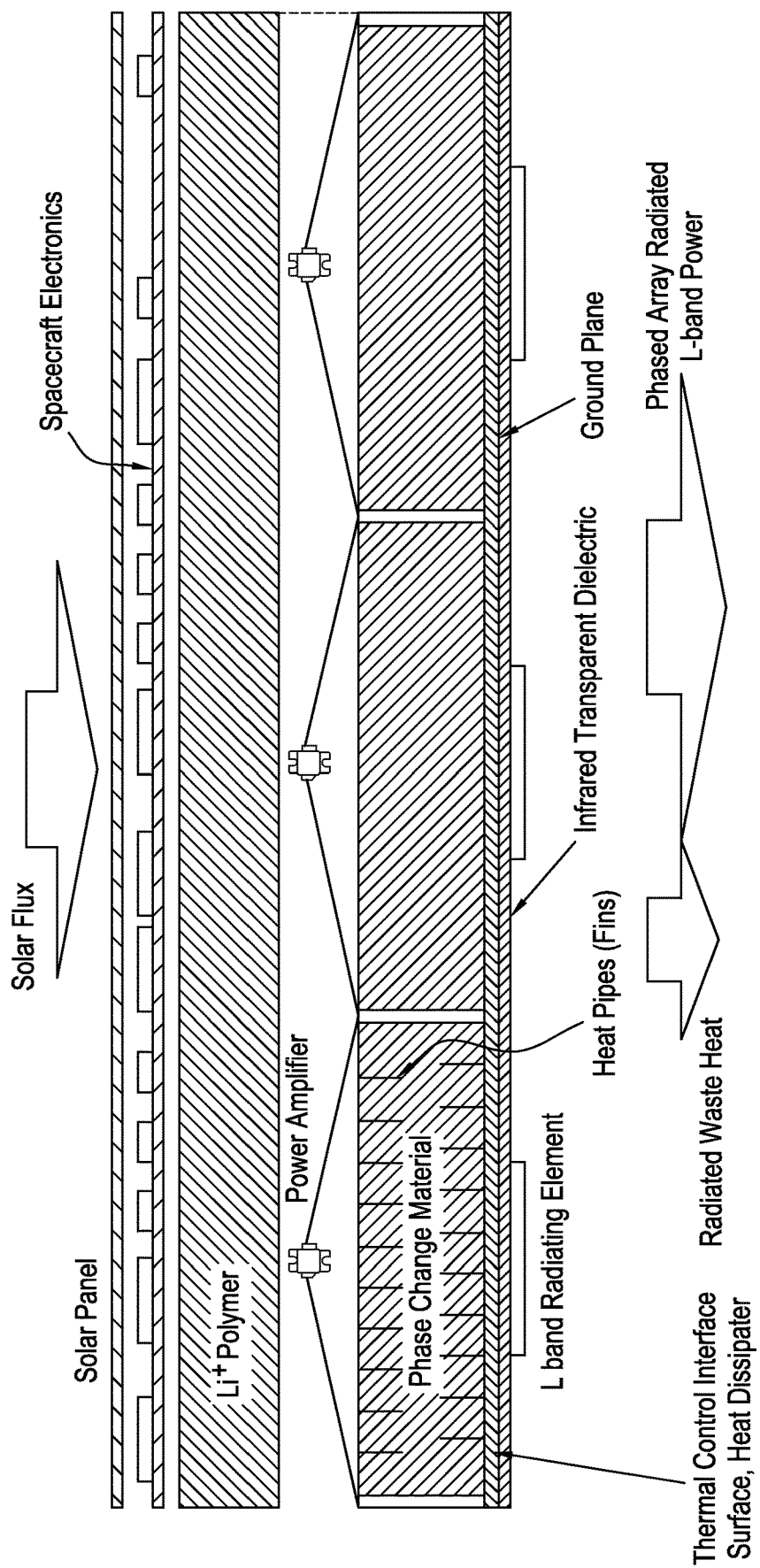
FIG. 34 shows a side view of the integrated spacecraft power and thermal subsystems.

FIG. 34 shows the mounting point for the power amplifier integrated into the rest of the spacecraft, including the thermal control interface surface between the PCM and spacecraft. The heat of fusion and melting point is targeted to be close to 20° C.—an efficient operating temperature for the example 150 W power amplifier. A PCM with attractive thermal properties is phosphonium chloride with melting point of 28° C. and high heat of fusion at 752 kJ/kg. [Reference 13]

Special material is selected for the L-band antenna face, which requires a dielectric structure to separate the ground plane and the radiating elements for the microstrip patch antenna elements. In the preferred embodiment, a material is used that is optically transparent in the infrared, such as zinc selenide. Another strategy includes selecting a dielectric with high thermal conductivity, such as aluminum nitride.

Figure 35:
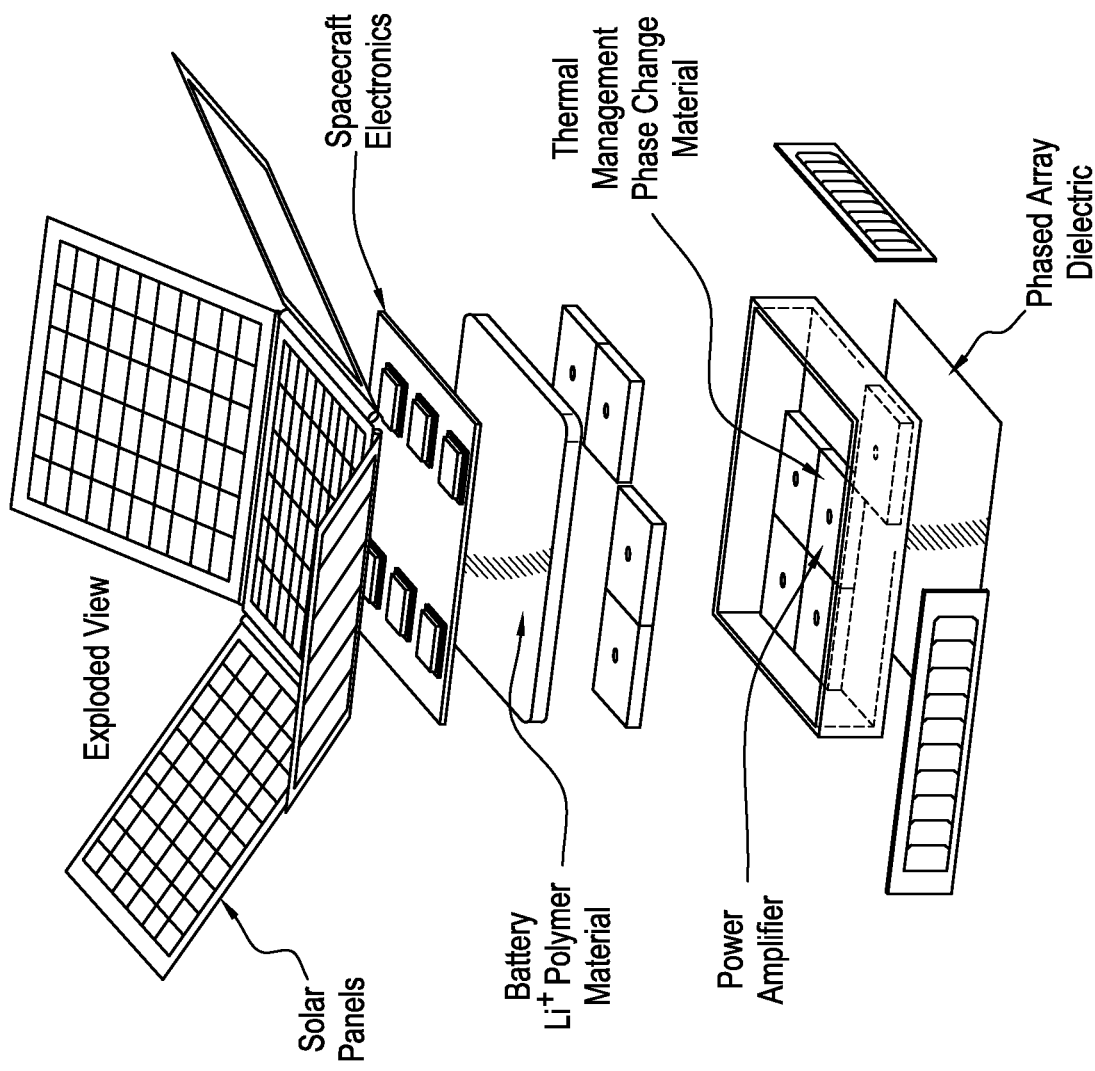
FIG. 35 shows the high-power spacecraft conceptual design.

A spacecraft conceptual design is shown in FIG. 35. In the preferred embodiment, the spacecraft architecture is essentially flat and deeply integrated for simplicity. A microstrip patch antenna array is oriented towards nadir on one side, the flat solar array faces in the opposite direction, and bulk quantities of battery and thermal phase change material are sandwiched in between. The amount of bulk material is proportional to the desired power output of the satellite.

Spacecraft size and constellation architecture are coupled. The orbit altitude and inter-satellite spacing are matched to the Earth eclipse time and recovery time for solar power generation as well as the payload, crosslink, and feederlink antenna aperture areas.

Spacecraft orientation toward the sun is varied during the recovery period to provide maximum power, optimizing between the power-thermal and payload-related functions.

On one hand, a sun/anti-sun orientation angles the thermal radiator away from the Earth and exploits the available solar power as well as the anti-sun cold thermal radiation background of deep space. On the other hand, the payload phase array is physically and/or electrically oriented towards GPS satellites to act in the receive mode as a CRPA to minimize the effects of jamming the satellite during orbit and clock calibration.

Figure 36:
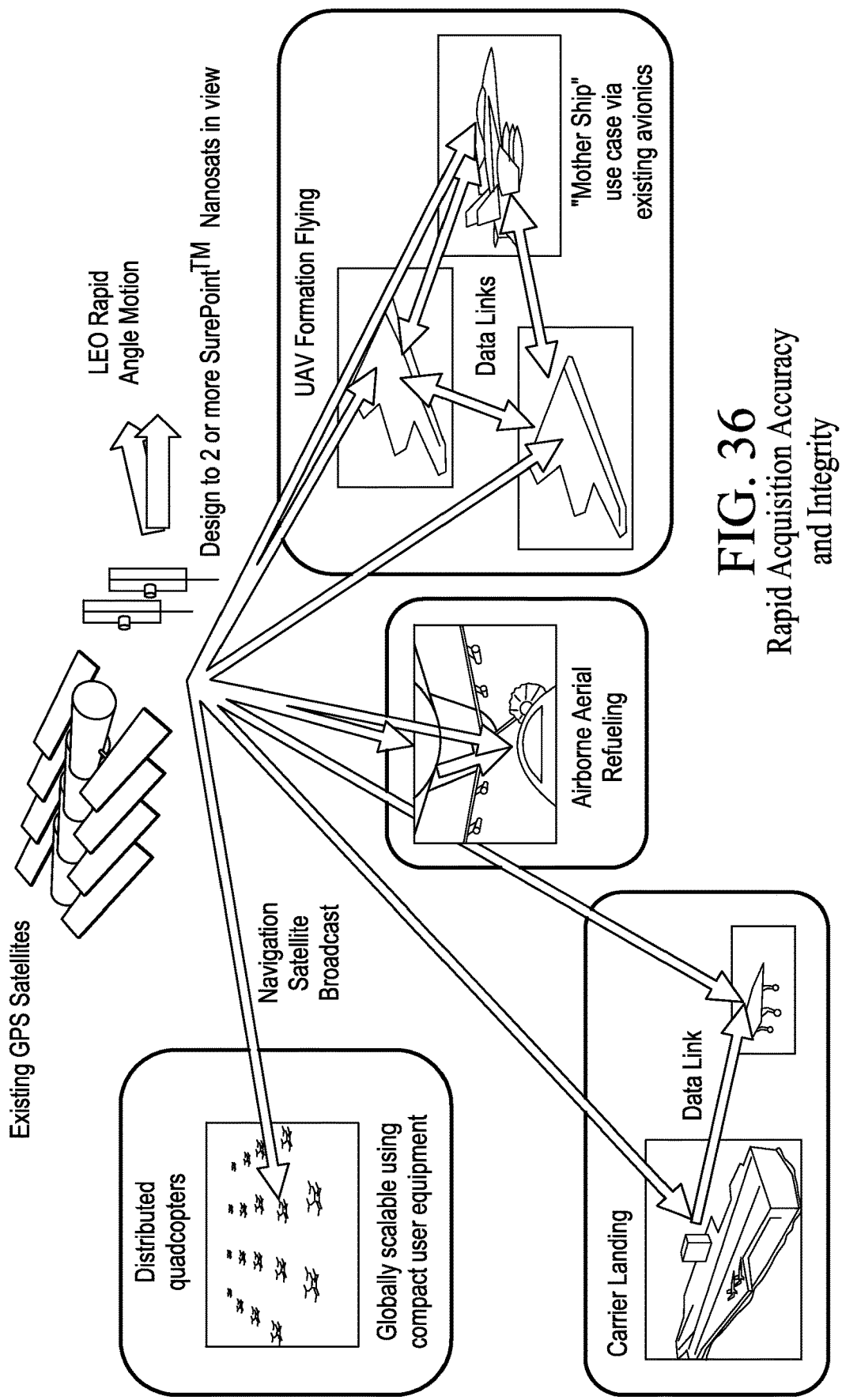
FIG. 36 shows the concept of operations for rapid acquisition accuracy and integrity.

FIG. 36 shows the concept of operations for military rapid acquisition accuracy and integrity as developed earlier for civil and commercial applications. The high-power output for the defense configuration provides concurrent additive anti-jam to the LEO-based rapid acquisition of centimeter-level accuracy and high integrity (1 m alert limit at $10^{-7}$ integrity risk). The system architecture further complements ultra-tightly coupled inertial aiding and coherent anti-jam, CRPA anti-jam, signals of opportunity, and is consistent with existing strike use cases.

Emitter Localization

Figure 37:
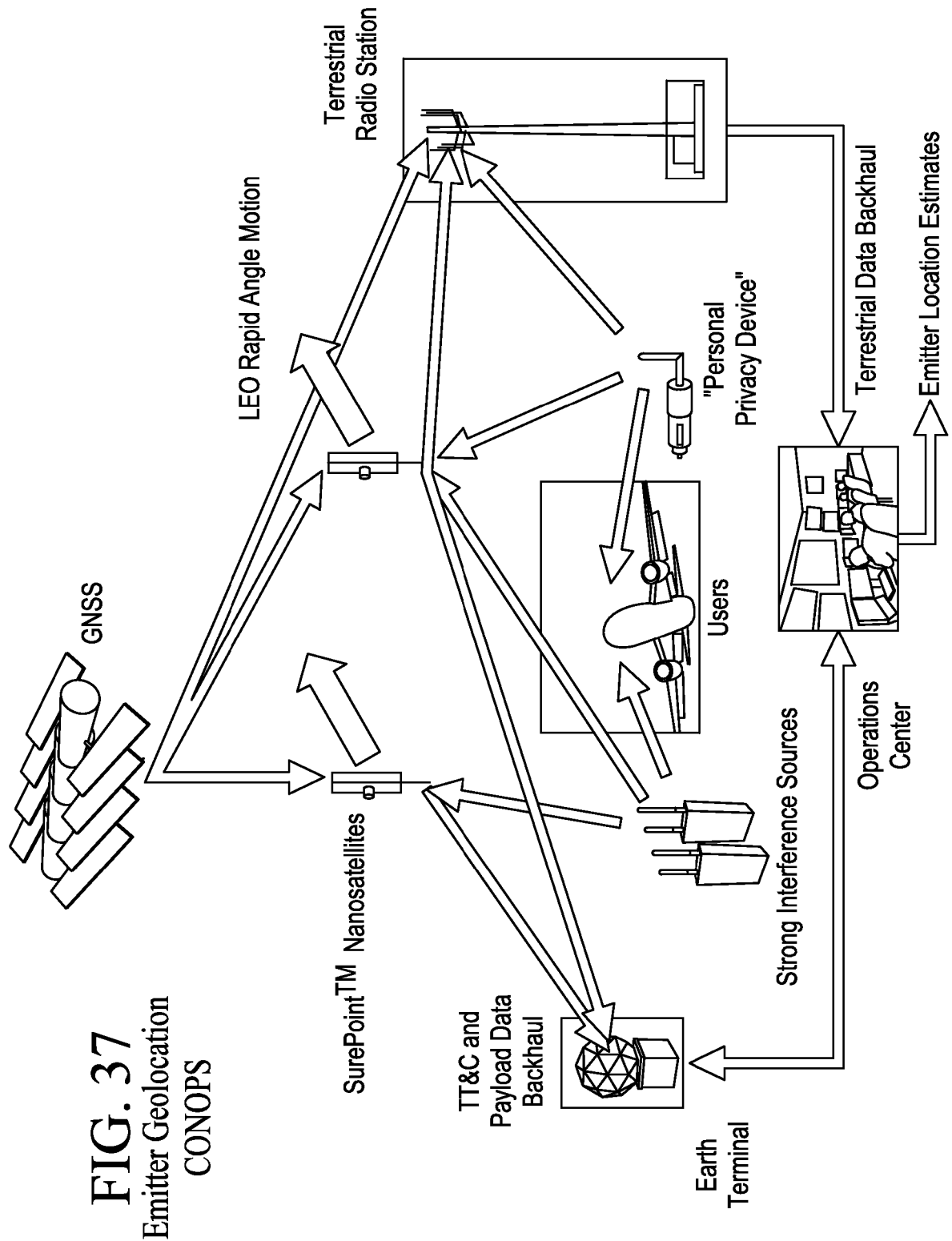
FIG. 37 shows the emitter geolocation concept of operations.

FIG. 37 shows the emitter geolocation concept of operations. At center, multiple emitters (intentional jammers and/or other interference sources) disrupt positioning. The SurePoint™ satellite nadir antennas downlink wideband samples via an Earth Terminal to the central server at the Emitter Localization Operations Center. The satellite orbit and clock solution enables centimeter-level position and time registration of the samples. The processor in the central server cross correlates the samples and produces a real-time estimate of the emitter locations using Time Difference of Arrival (TDOA) processing.

Figure 38:
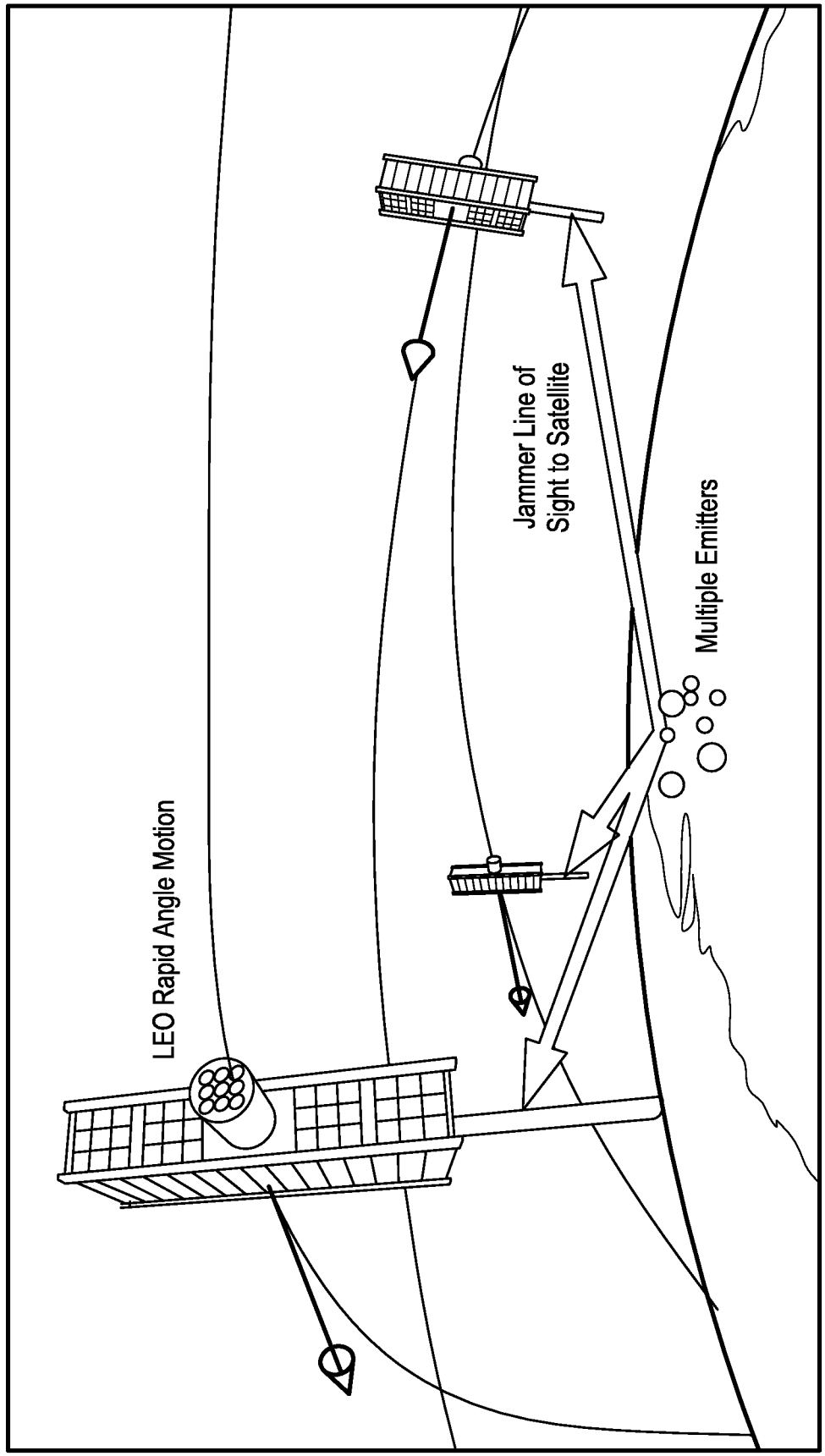
FIG. 38 shows the emitter geolocation geometry.

FIG. 38 shows a physical view of the emitter geolocation configuration geometry In this example, three SurePoint™ satellites—each collecting samples with the added benefit of rapid angle motion—concurrently sense multiple emitters.

Additional sensitivity is possible when space and ground-based measurements are combined. As shown in FIG. 37, precisely surveyed radio station sensors can be incorporated into the solution. The samples and their precise time registration are conveyed to the Operations center. If GPS is unavailable, the SurePoint™ feederlink can also be used for time registration as it is out of the GPS band.

In the preferred embodiment, the emitter localization function is an important complementary or stand-alone capability. As described above in a previous section, the robust PNT function defeats interference in real time by as much as 20 dB so as to ensure uninterrupted operations. Meanwhile, the emitter localization function enables authorities to quickly locate and remove the source of the interference.

Space provides an optimal vantage point with superior geometry and an unobstructed line of sight. Furthermore, tracking emitters over large angle LEO satellite motion enables special advantages. For narrow band emitters, cycle ambiguities can create image solutions that masquerade as the real source location. The LEO rapid angle motion provides significant leverage to resolve the ambiguities. LEO rapid-angle geometry enables tracking truly arbitrary emitter waveforms.

Radio Occultation

Tracking GPS on LEO satellites as the lines of sight occult the atmosphere and ionosphere has become an invaluable instrument for weather. Examples are GPS/MET, COSMIC, and PlanetIQ. In the prior art, the line of sight from the GPS satellite transmitter to the LEO receiver cuts deep into the Earth's atmosphere to create a phase profile measuring density. Dual-frequency measurements enable the ionosphere component to be separated out, leaving only the atmospheric refraction as an indicator of density.

Figure 39:
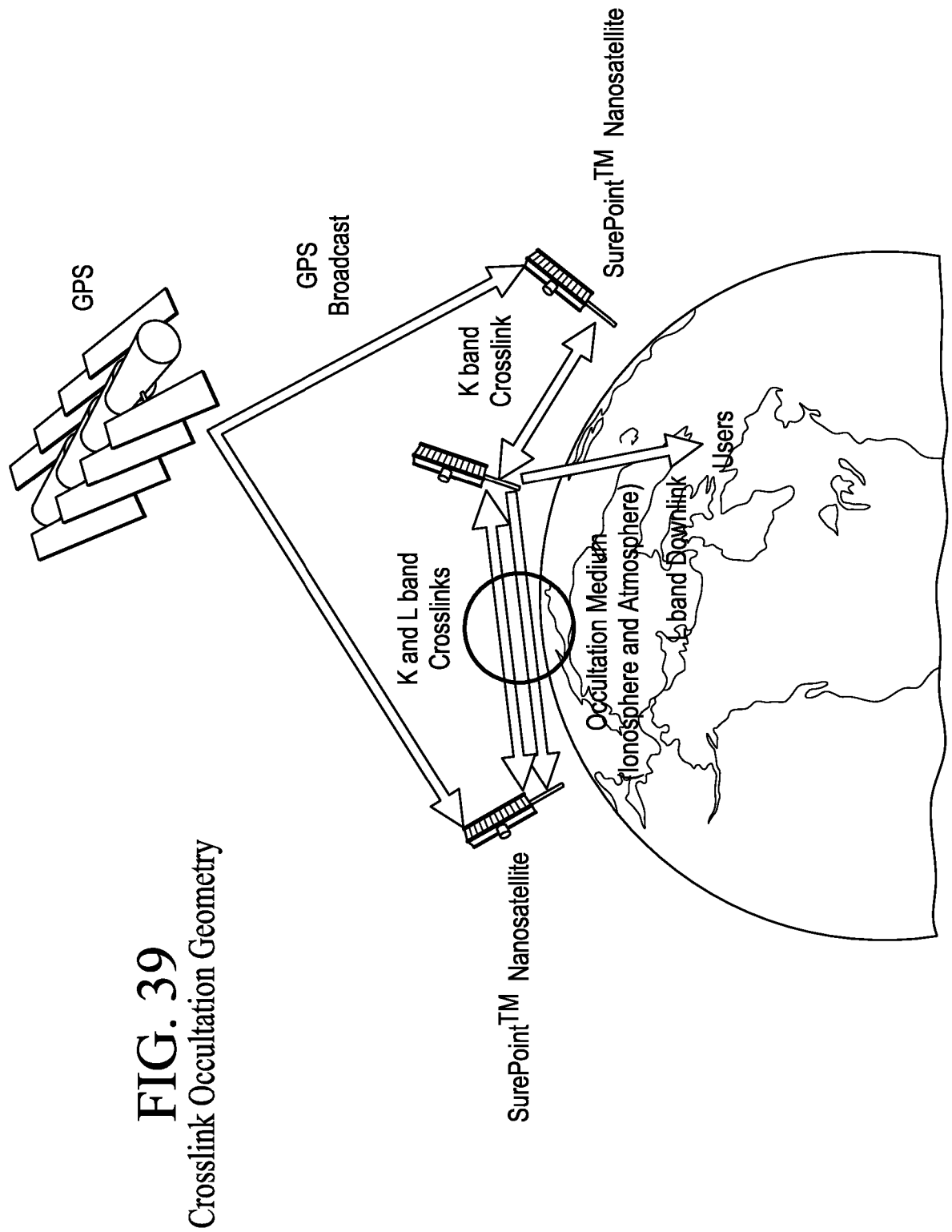
FIG. 39 shows the K band water vapor absorption line.

Unfortunately, the density is a combination of temperature, pressure, and water vapor, such that their individual contributions cannot be completely resolved. As shown in FIG. 39, a new observable becomes available by transmitting and receiving between adjacent SurePoint™ satellites and exploiting the K band crosslink in the preferred embodiment.

Figure 40:
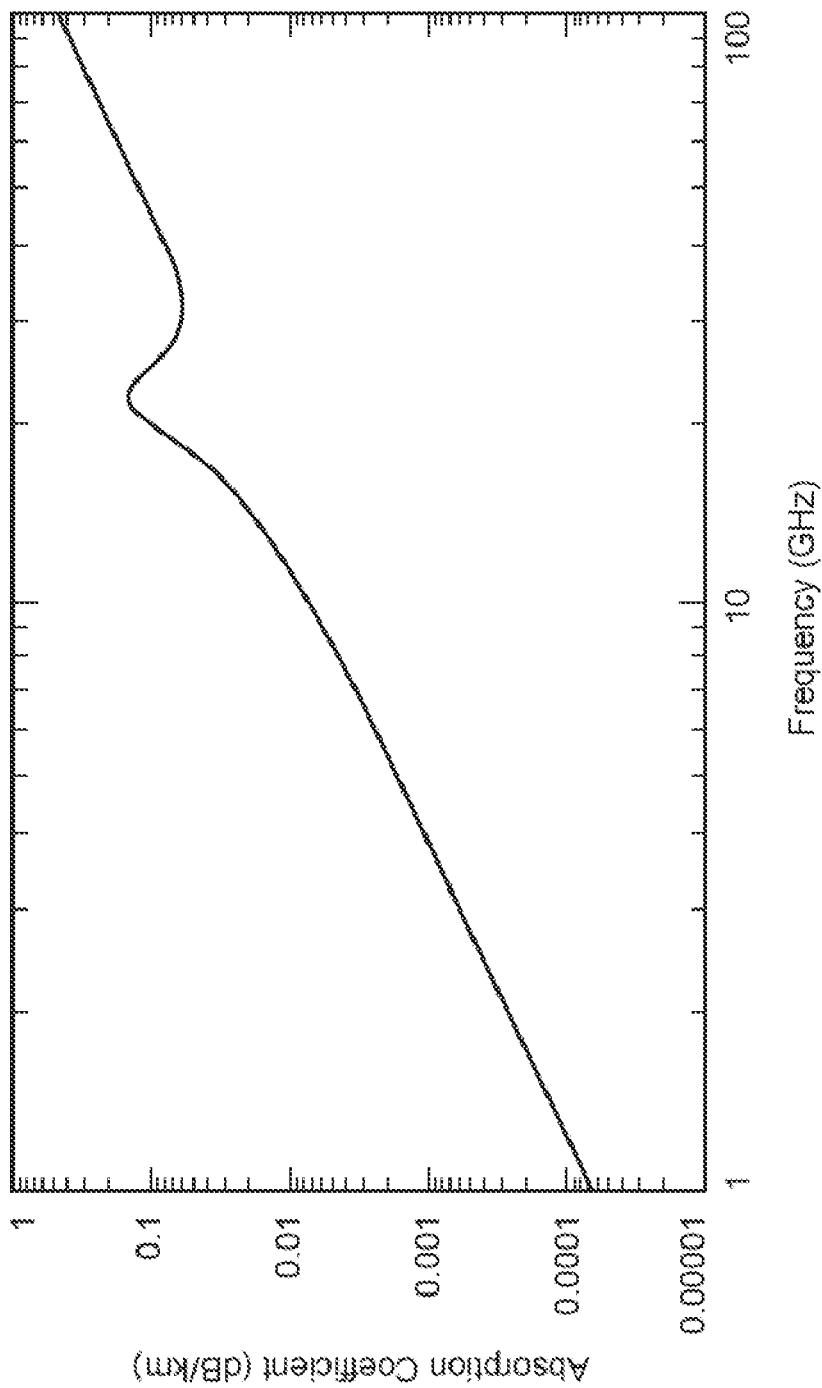
FIG. 40 shows the crosslink occultation geometry.

K band between 18 and 26.5 GHz is especially absorbed by water vapor. The $H_2O$ resonance peak is at 22.24 GHz. FIG. 40 shows the water vapor absorption line at K band. [Reference 14.] By comparing the K band and L band received amplitudes, the water vapor component can be estimated directly.

To build a comprehensive operational data set, LEO receivers, including the SurePoint™ Nanosatellites, can still employ GPS to provide supplemental occultations. Furthermore, GPS can continue to contribute to the time and space registration of the SurePoint™ Nanosatellites.

Nanosatellites can perform multiple roles as they traverse a region. For example, during an occultation event with an adjacent Nanosatellite, the transmitting Nanosatellite can also be broadcasting over a terrestrial region as shown in FIG. 39. In general, the SurePoint™ Nanosatellites can switch roles by orbital phase to take on multiple system-level functions, as further described in the following section.

Global and Regional Agility

At the system level, the constellation of SurePoint™ Nanosatellites provides an agile architecture that can handle multiple global functions at the same time. The various operating functions can be switched on and off by orbit phase to assume multiple roles as a function of where over the Earth a given satellite is traveling.

Figure 41:
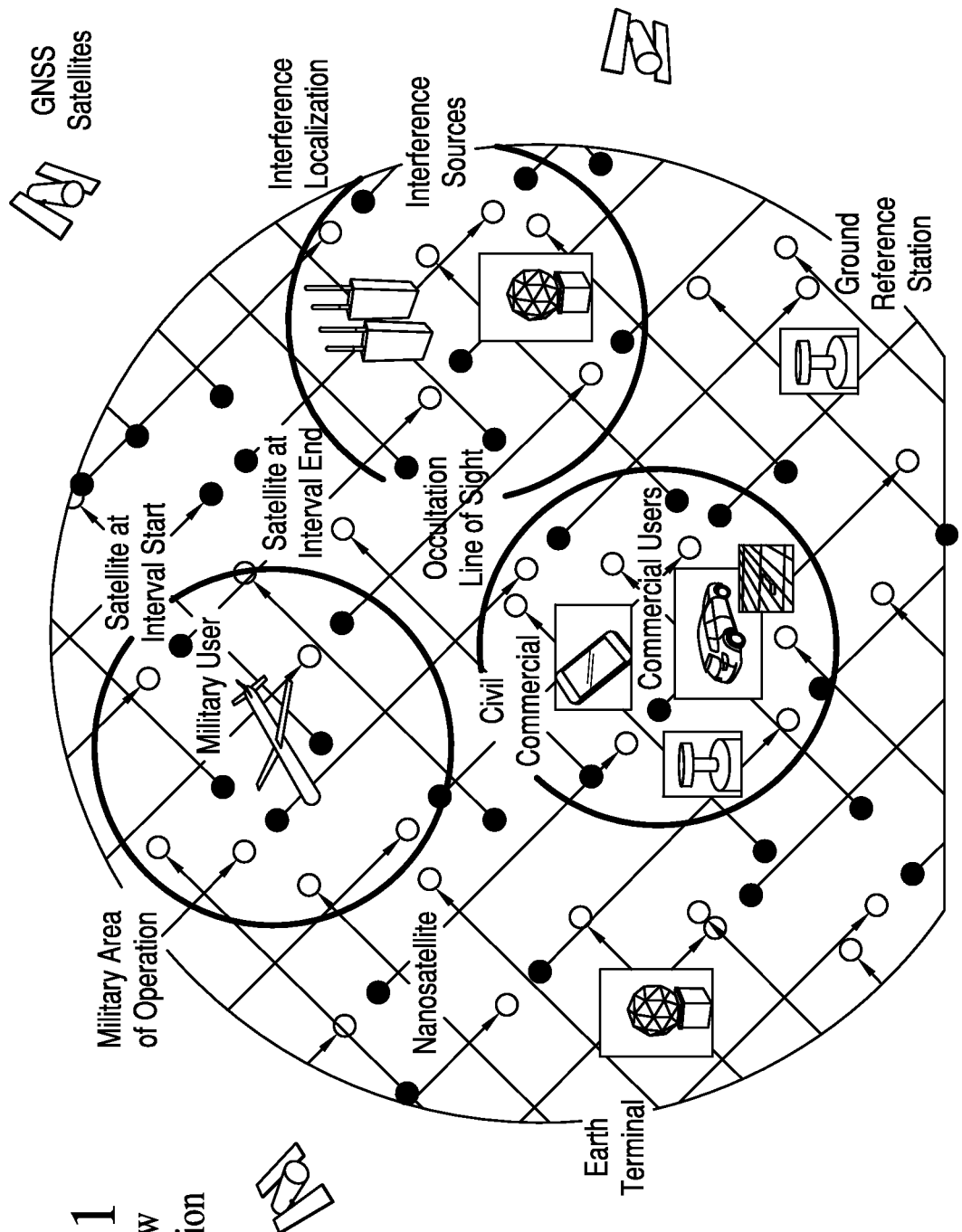
FIG. 41 shows the time evolution of a physical representation of the network.

FIG. 41 shows the time evolution of a representation of the physical network. Each SurePoint™ Nanosatellite is indicated by a solid dot at an initial epoch and an empty dot at a short subsequent time later. The Earth is divided into regions where at least three separate operations are taking place concurrently. At the upper left, a military operation is underway. At the lower center, civil and commercial users make use of the broadcast. And at right the system is used to geolocate interference.

Figure 42:
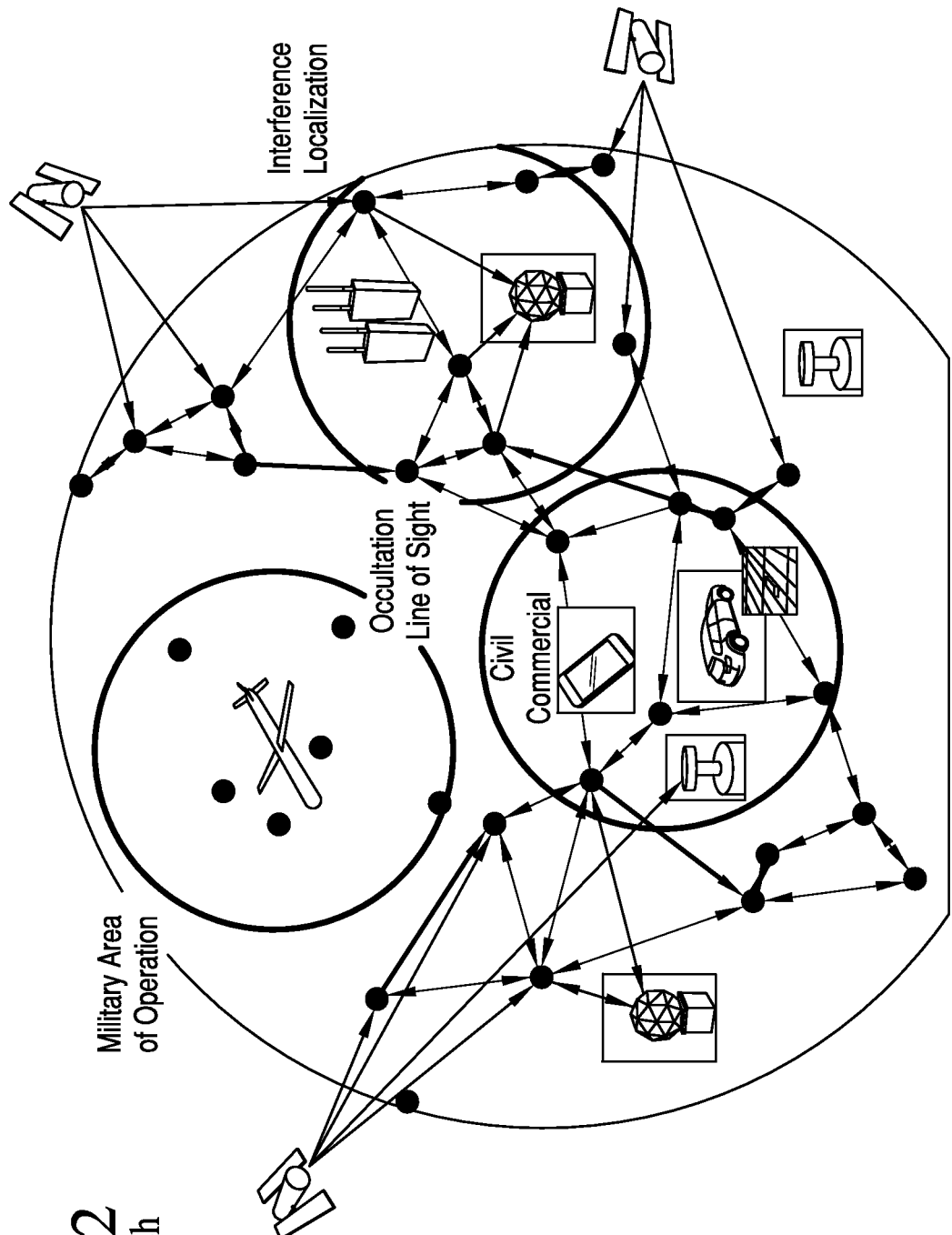
FIG. 42 shows the physical representation of the network at an initial epoch.

FIG. 42 shows the physical representation of the network at an initial time. The SurePoint™ Nanosatellite lines of transit and subsequent positions are not shown for clarity. In the military Area of Operation, crosslinks and feederlinks are assumed to be jammed, so the depicted regional SurePoint™ Nanosatellites broadcast independently based on their free-running clocks. For the civil and commercial case, crosslinks provide a position and time reference. The crosslinks are further traced to GPS, but only for GPS satellites that can be received outside the civil and commercial operating region where the PNT Nanosat transmitters do not operate. Cases of the coordinated K band crosslink for radio occultation events are also depicted. For the interference localization case, crosslinks are again used for position and time registration of the satellites, which are now operating in receive-only mode. Examples of GPS being used for position and time registration are also shown, highlighting the possibility that the interference emanating from terrestrial sources will not overwhelm the spacecraft wideband receive function. High-speed feederlinks down are employed for real-time interference localization.

Figure 43:
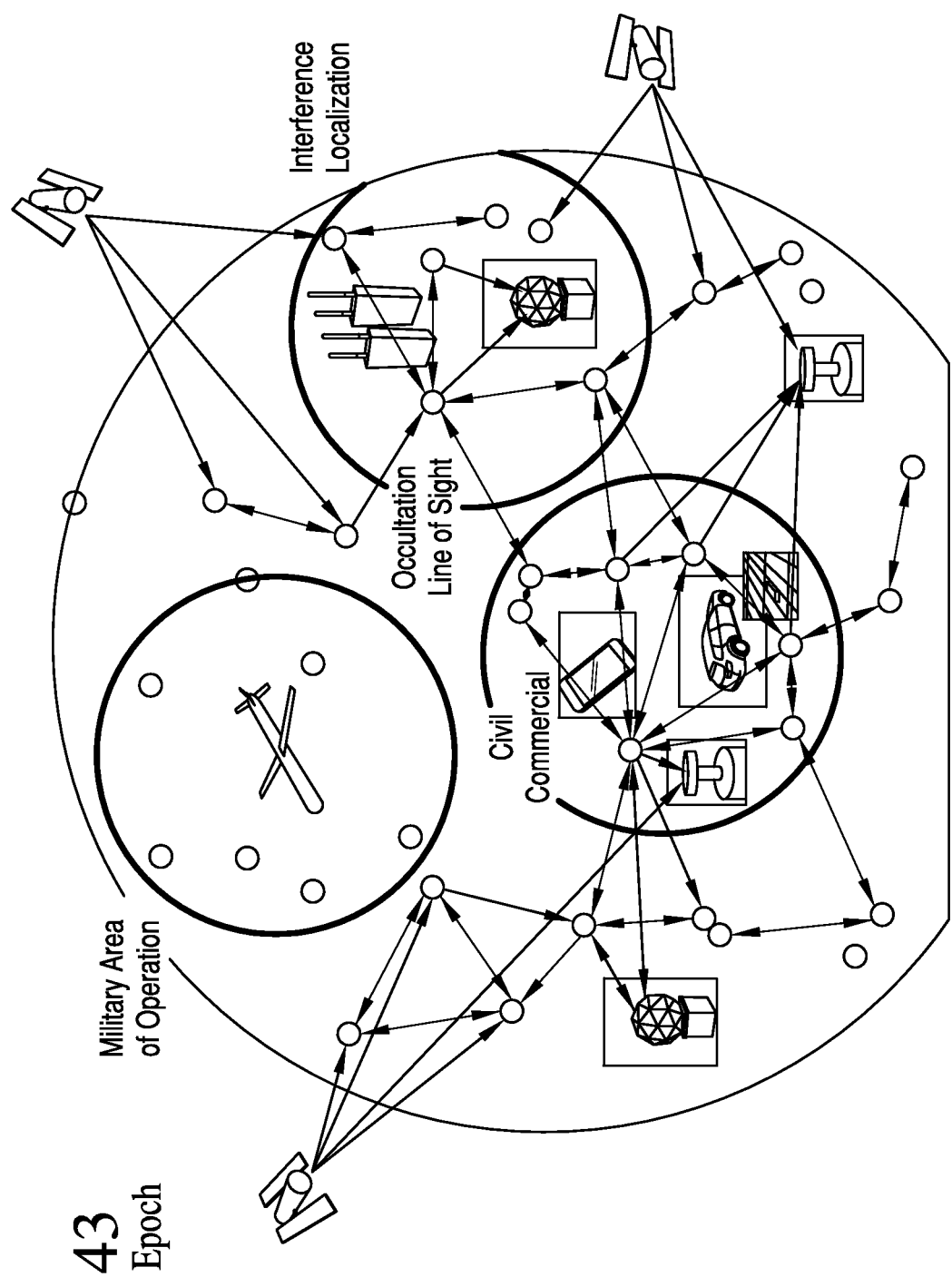
FIG. 43 shows the physical representation of the network at a subsequent epoch.

FIG. 43 shows the physical representation of the network at a subsequent time, wherein the SurePoint™ Nanosatellites have all moved since the previous figure at the initial time. The same functions are being performed by satellites within each region. However, the key point is that the actual satellites serving each function are different and changing quickly over time.

Figure 44:
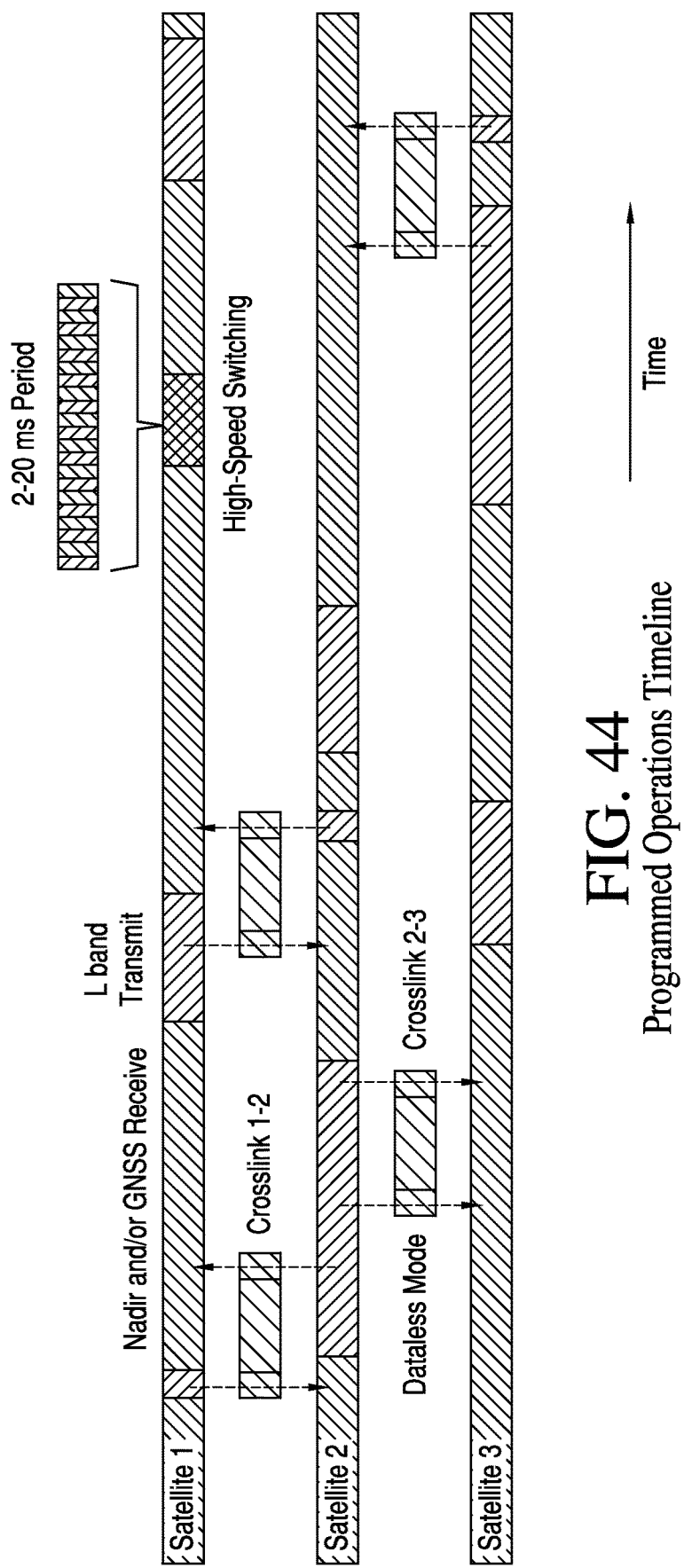
FIG. 44 shows the operations timeline for a single satellite.

FIG. 44 shows the operations timelines for several satellites. The red interval indicates scheduling times when the satellite timing and ranging broadcast is enabled, typically when the satellite footprint intersects with users. In practice, selected land masses and/or user countries will be designated for operations, thereby defining the timeline as a function of the satellite orbit. Since most offshore user operations are carried out in close proximity to land, these users can be easily covered too. The blue intervals indicate times during which the transmitter is powered off, enabling the onboard receivers coupled to the zenith and/or nadir antennas. The blue interval also corresponds to zenith GNSS receiver measurement collection for orbit determination, since the on-board transmitter no longer precludes concurrent receiving on the same band (although at least in principle, the electronics could be designed for concurrent receiving and transmitting). By the same criteria, emitter geolocation can occur in the blue intervals, including in the cases wherein satellite clock registration is carried out using the backhaul as the timing reference. The purple region shows rapid cycling between receive and transmit with a period between 2 and 20 ms, effectively offering effectively concurrent receive and transmit capability. As long as user equipment supports a timing and ranging signal with such a duty cycle, concurrent positioning and emitter geolocation is possible.

The green bars indicate the times during which the given pair of satellites are in contact with each other via the crosslinks. The crosslink line of sight will tend to rise and set above the horizon, such that radio occultation events occur at the start and end of each interval. To the extent that there is discretion as to which satellite transmits and which receives, the diagram shows how any satellite that is already broadcasting over a region may be concurrently used for radio occultation.

The Distributed Aperture

Figure 45:
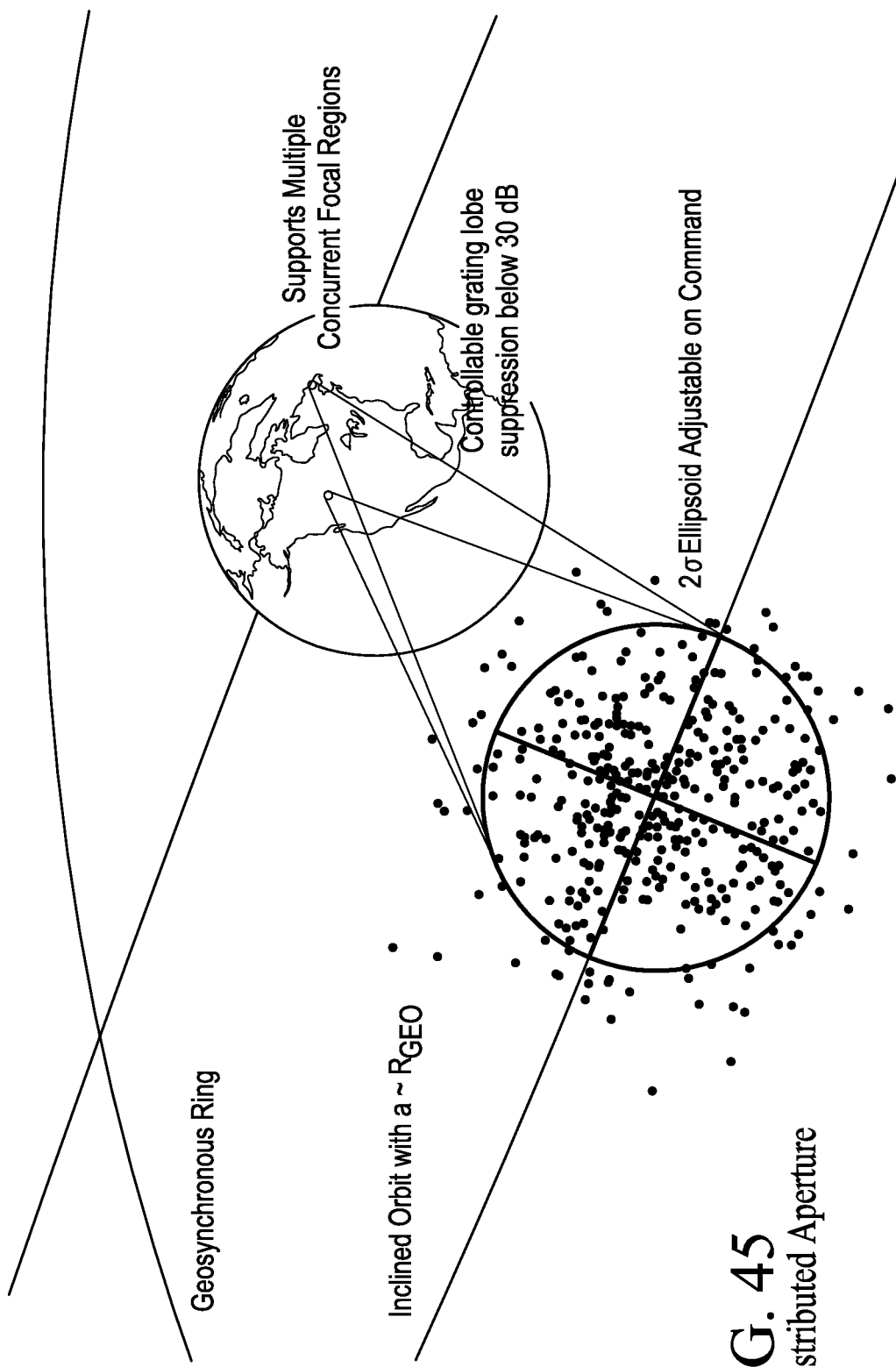
FIG. 45 shows a regional distributed aperture configuration.

To the extent that time and space of a satellite's antenna can be known to an accuracy of a small fraction of a wavelength, the system permits groups of satellites to operate in coherent unison for greater PNT-enabled purposes. FIG. 45 shows an example configuration that is suited for regional use. Approximately 3,000 free-flying aperture elements are deployed in an orbit near the geosynchronous altitude. Translation control maintains the density of elements into an ellipsoidal, Gaussian profile, whose short axis is aligned with the nadir vector and whose long axes form a circular distribution. The radius of the circle can be commanded to assume variable size, spanning a few kilometers to hundreds of kilometers. The phasing of each element is controlled, either as a transmitter or as a receiver, to create one or more spot beams.

For the general embodiments described herein, the distributed aperture is not focused at infinity, but rather at or near the Earth's surface. The Fresnel distance parameter, F, of an antenna is defined as $$F = \frac{D^2}{L\lambda}$$

where D is the characteristic size of the antenna aperture, such as the diameter, and $\lambda$ is the wavelength. The Fresnel region (radiative near field) is defined where F is on the order of unity or greater. Therefore, for typical operational parameter values, the spaceborne distributed aperture antenna tends to operate in the Fresnel region.

Figure 46:
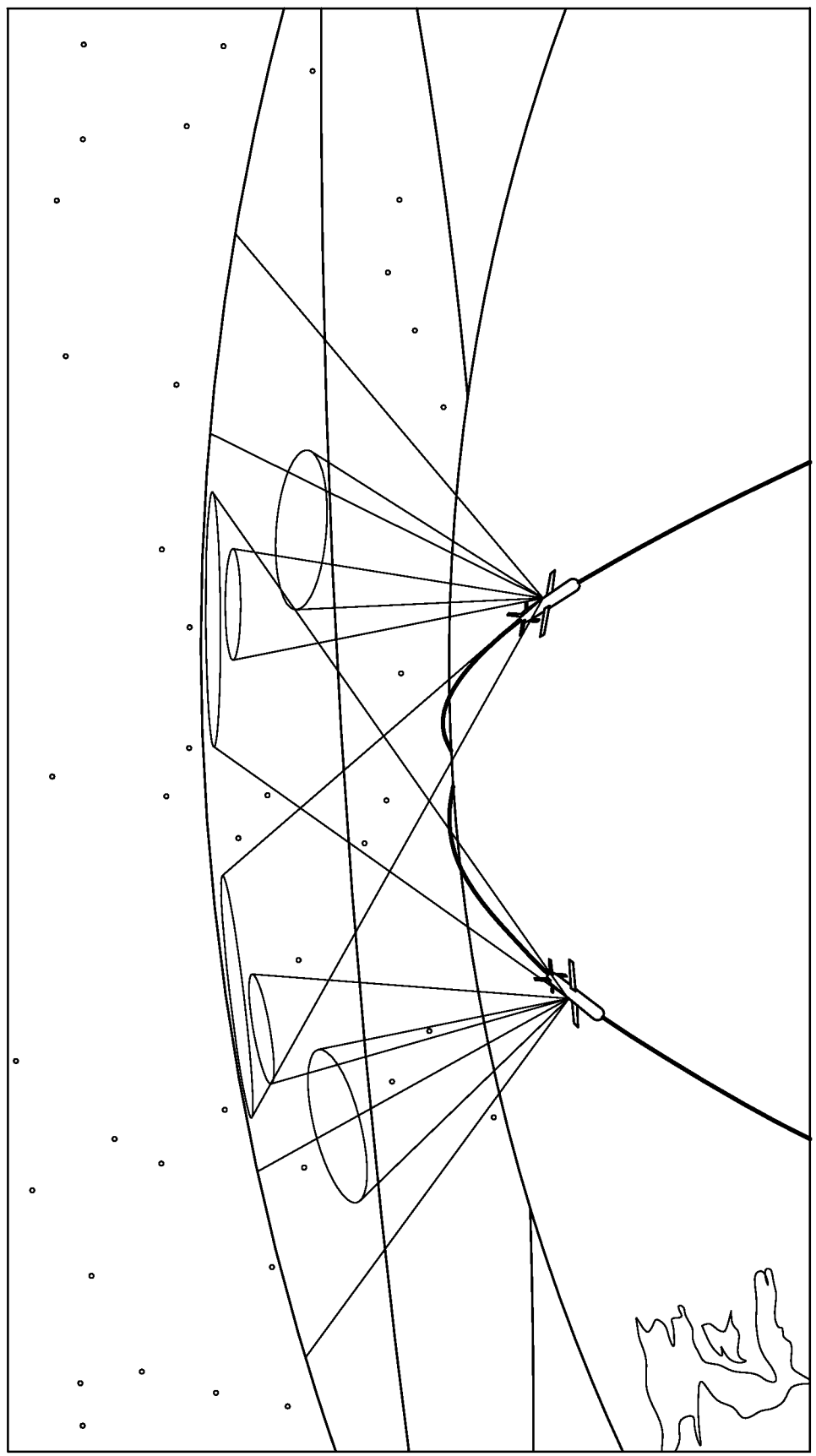
FIG. 46 shows a global distributed aperture configuration.

FIG. 46 shows a version of the distributed aperture depicted for global use at a lower altitude and with a larger number of elements. In the application shown, synchronized transmissions from a number of orbiting elements pool together to emulate GPS signal broadcasts. The orbiting distributed aperture concurrently synthesizes multiple GPS-like signals. Military advantage is established because the source of the broadcast is diffuse and resilient to attack. Furthermore, increased power can be focused on users for improved availability against GPS jamming.

The converging, concave wavefronts operating in the Fresnel region, however, are unique. Nevertheless, the signal is designed to be compatible with existing GPS receivers as follows:

Assume a fictitious transmitter operating at a specified focal point, $r_0$, which generates an outbound spherical wave emanating from the focal point with amplitude A and wave number $k=2\pi/\lambda$. It is possible to explicitly calculate the expected received amplitude and complex phase, $U_{outbound}$, of the resulting hypothetical signal at antenna point $P_i$ of every aperture element, i, within the distributed aperture at its known position, $r_i$.

$$U_{outbound}(P_i) = \frac{Ae^{jk|r_i-r_0|}}{|r_i - r_0|}$$

A reversed wave function, $U_{inbound}$, is defined to propagate in the opposite direction. The wave values at each aperture element then define boundary conditions that must be met for such a wave propagating towards the focal point.

$$U_{inbound}(P_i) = \frac{Ae^{-jk|r_i-r_0|}}{|r_i - r_0|}$$

To create a physically realizable model of the wave, $\varphi$, throughout Cartesian space, x, each transmitter element can be commanded to generate an outgoing spherical wave front consistent with the inbound wave boundary conditions as follows:

$$\varphi_i(x) = \frac{U_{inbound}(P_i)_i e^{jk|x-r_i|}}{|x - r_i|}$$

Aggregating the contributions from all aperture elements, the resultant wave is then given as $$\varphi(x) = \sum_i \varphi_i(x) = \sum_i \frac{Ae^{-jk|r_i-r_0|}e^{jk|x-r_i|}}{|r_i - r_0||x - r_i|}$$

By the Huygens-Fresnel principle, as the number of transmitters increases the aggregate broadcast wave front approaches that of the inbound spherical wave front propagating towards the focal point. The focal point is chosen based on the size and location of the Area of Operation to be illuminated. Multiple AoAs may also be employed concurrently. User equipment receiving the signal is able to track the incoming signal, except that the focal point takes on a new role as a virtual satellite.

Figure 47:
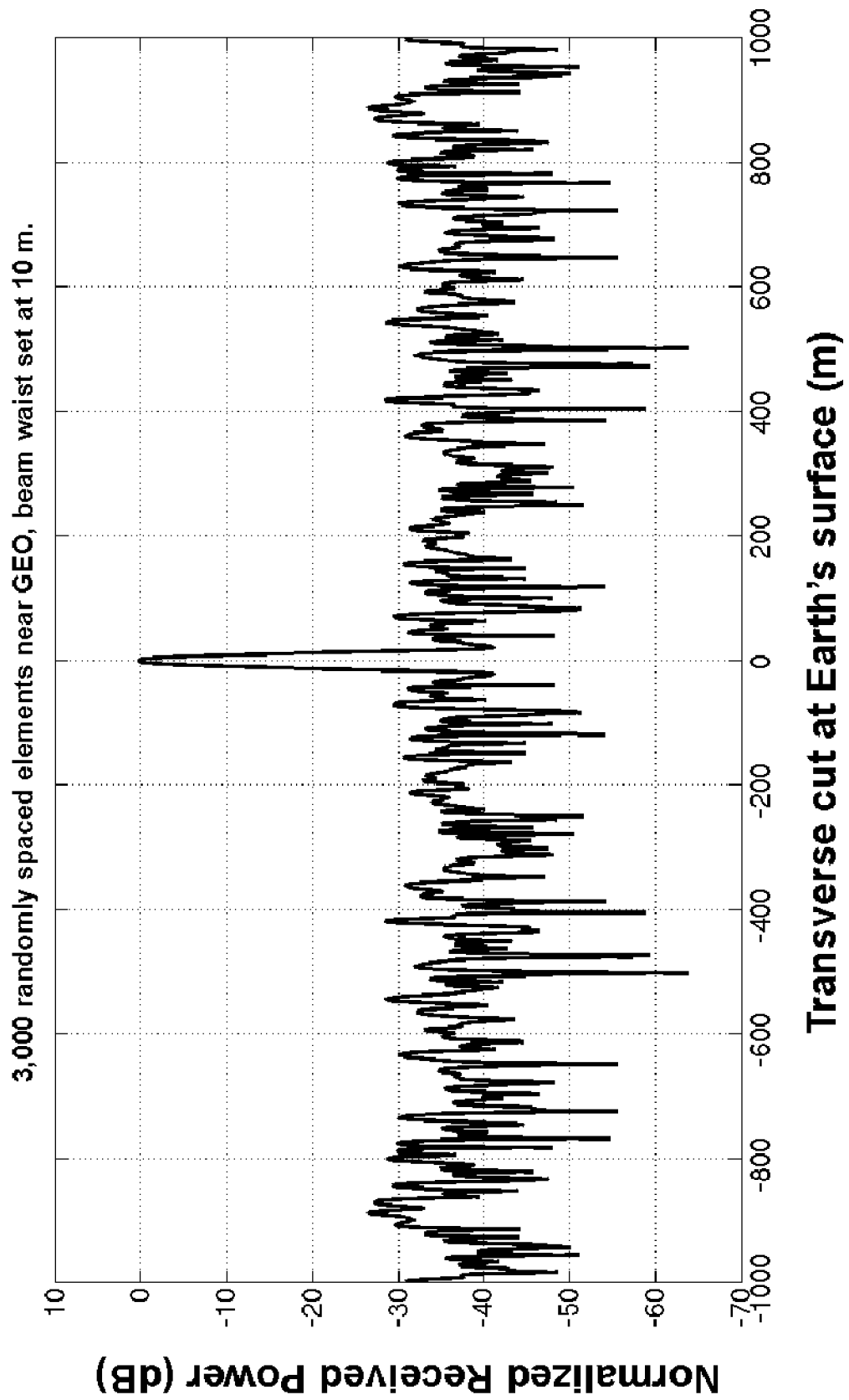
FIG. 47 shows an example of a high-resolution antenna pattern from a distributed aperture.

FIG. 47 shows an example of the pattern obtained from a regional distributed aperture with 3,000 elements distributed randomly operating near the geosynchronous altitude with the focal point in the Fresnel region wherein the grating lobes are suppressed to the level of 30 dB.

Figure 48:
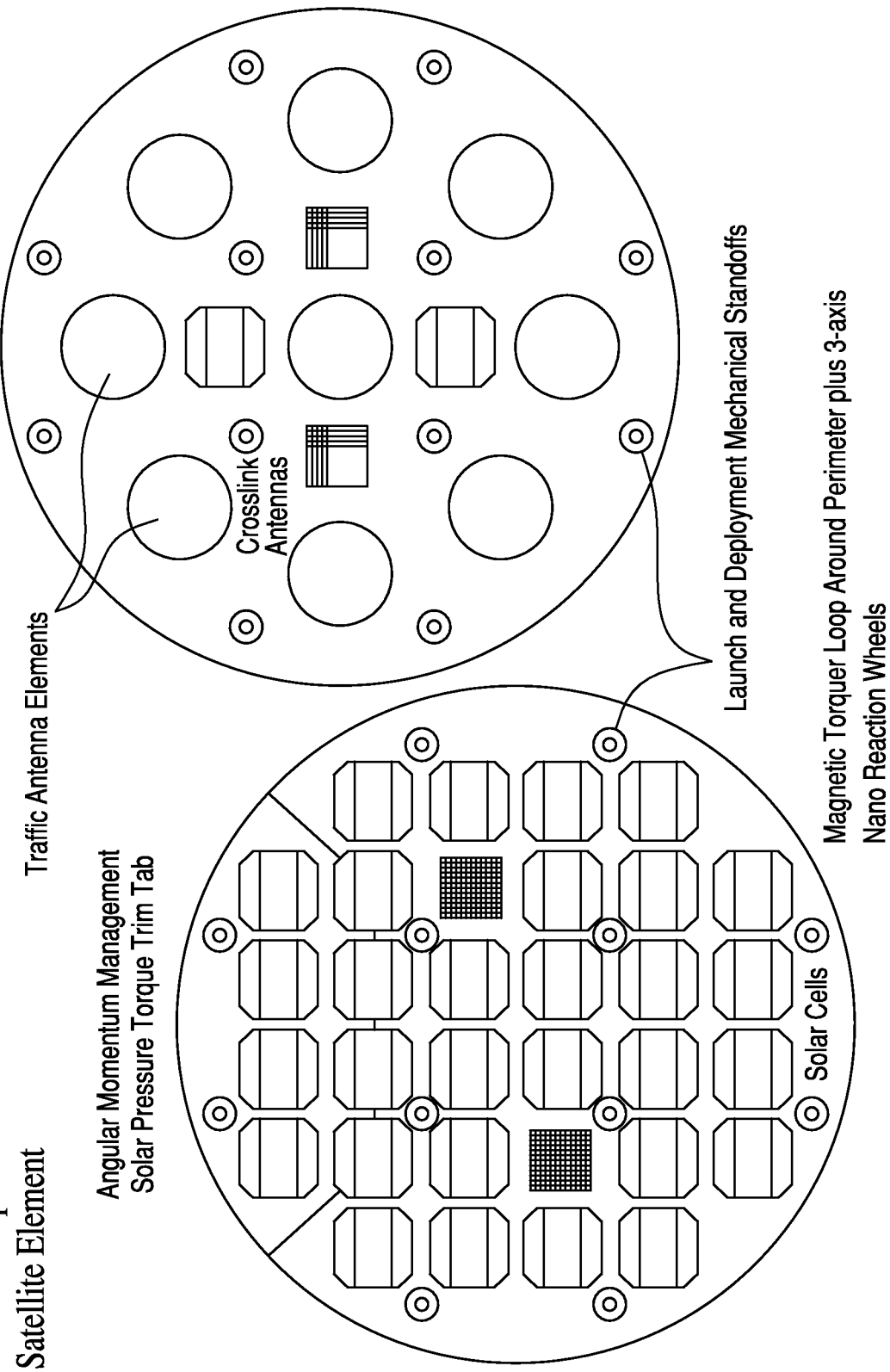
FIG. 48 shows a distributed aperture satellite element.

FIG. 48 shows the self-contained, free-flying, aperture element that joins with other aperture elements to form the larger distributed aperture system. The spacecraft design is a variant of that described above for the high-power PNT nanosatellites. The preferred embodiment form factor is a flat disc, whose aperture diameter is sized to be consistent with the surface area on the Earth over which multiple concurrent beams will be supported. In the figure, an array of microstrip patch antennas allows enables the phased array for a single spacecraft to illuminate the Earth with minimal spillover. A narrow spot beam will then be formed by the full distributed array acting coherently in unison. The traffic antennas in general are wideband to support a range of defense and intelligence missions, although if the main purpose of the mission relates to the GPS military bands, then the antenna is specifically designed to support GPS L1 and L2.

A set of short mechanical standoffs enable the discs to be stacked for launch and deployed with low relative energy. Embedded reaction wheels enable three axis attitude control. Solar cells on each face provide power, with most of the cells on the opposite side from the traffic antenna. To the extent possible, the pointing strategy is to point the traffic face mostly towards Earth and the solar panel face mostly towards the sun, subject to the solar sailing control prerogatives described in more detail below.

Phased array crosslink antennas also embedded on each face enable high bandwidth communications as well as relative position and attitude knowledge. Sun, Earth, and star imagers provide secondary means of attitude estimation. The angular momentum solar pressure torque trim tab creates an asymmetry that can be used to manage angular momentum. A current loop running around the perimeter of the disc also enables residual magnetic field to also be used for momentum management.

Figure 49:
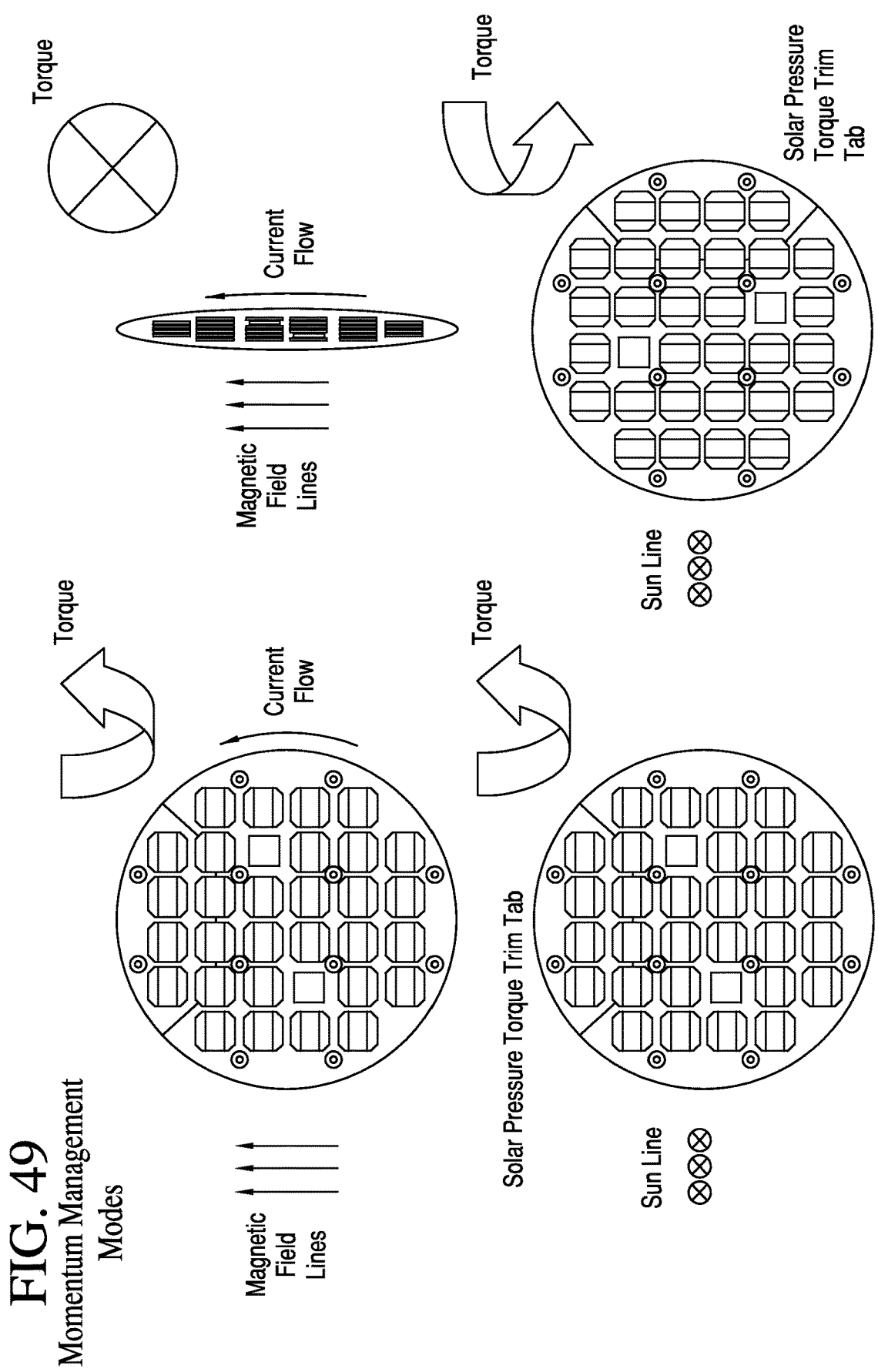
FIG. 49 shows the modes for spacecraft momentum management.

FIG. 49 shows how momentum is managed with a simple, high-reliability approach and without consumables. The spacecraft itself is designed to be largely symmetrical, thereby minimizing disturbance torques. Solar pressure torque is modulated by using the reaction wheels to orient the solar pressure trim tab at various clock angles about the sun line to achieve the desired momentum control. A current loop running around the perimeter of the spacecraft body creates a magnetic moment that can also be used for momentum control in conjunction with the Earth's magnetic field. To create controllable "pinwheel" torques about the sun line, active devices that also happen to lie flat on the disc surface to preserve the form factor may also be employed. Candidates include a liquid crystal mounted on a low-profile sawtooth surface and a Digital Micromirror Device (DMD). Collectively, the various approaches provide momentum control about all three axes.

Figure 50:
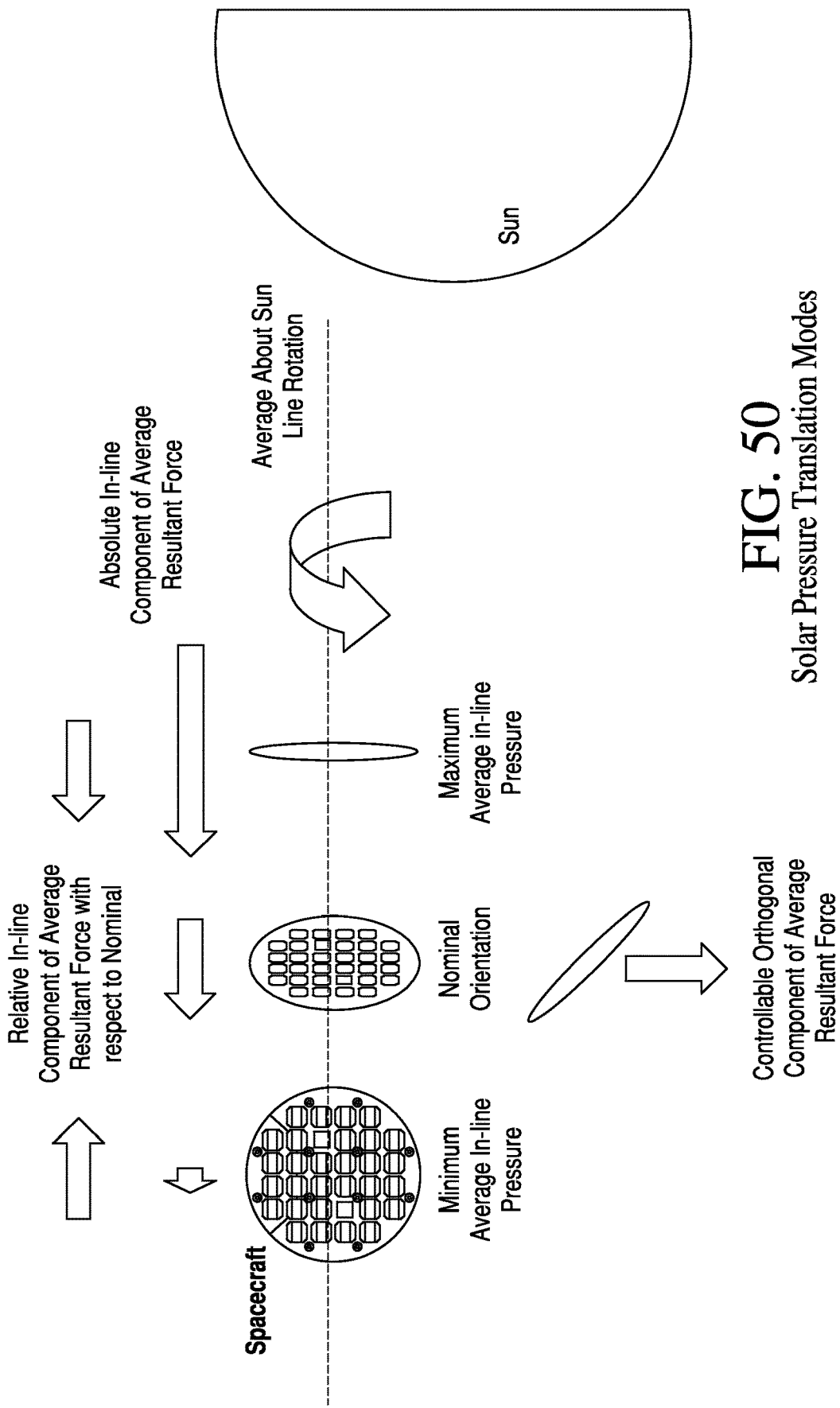
FIG. 50 shows the spacecraft translation modes derived from solar pressure.

FIG. 50 shows how solar sailing can provide all three degrees of relative translation control for a cluster of free-flying aperture elements. For simplicity, it is assumed that the position of the centroid of the cluster is not being controlled. A baseline orientation consists of establishing a default angle of the disc relative to the sun line and then rotating the disc about the sun line. If all the elements adopt the same baseline configuration, then there is no in-line or orthogonal resultant force across the cluster. If the angle of the disc is altered without altering rotation of the disc about the sun line, then the in-line force relative to the cluster centroid is modulated depending on by how much the cross section of the disc along the sun line increased or decreased. For orthogonal force control, rotation about the sun line is paused or slowed at the desired clock angle. An effective dwell time at that clock angle is established. The orthogonal force component is proportional to the duty cycle of the dwell. Its direction aligns with the clock angle of the dwell.

The objective configuration for the global constellation is a random, evenly spaced distribution. The objective configuration for the regional cluster is the ellipsoidal probability distribution described above. The Euler-Hill equations are the dynamic model for excursions of a satellite about a nominal trajectory, assumed to be the centroid, or with respect to another satellite. Applying the same observation equations as above for crosslink ranging, the observation equations are $$\Delta\rho_{ij}(t)=\hat{r}_{ij}\cdot(\delta r_j - \delta r_i) + c\delta t_j(t) - c\delta t_i(t) + b_{ij} + n'_{ij}(t)$$

where each observable is given from satellite i to j, where again the crosslinks are assumed to operate in a two-way mode, for improved observability.

The Euler-Hill equations also do not by default support an arbitrarily commanded cluster distribution, let alone a random one. Therefore, a non-static commanded reference orbit is selected for the constellation, and an optimal control law continually steers the aperture elements towards the reference. The net result is a distribution that at least approaches a random, ellipsoidal, Gaussian configuration. Stationkeeping is conducted subject to bounding angular momentum and properly maintaining the spacecraft attitude to meet payload, power, and thermal operational constraints.

FIG. 51 shows how the distributed aperture can be launched and deployed. The disc-shaped aperture elements are stacked onto an upper stage insertion vehicle. Each spacecraft disc is separated by the built-in standoffs embedded in its PCB-based structure. The standoffs are clamped longitudinally under tension and are designed to accommodate longitudinal loading and lateral vibration. The launch vehicle inserts the assembly into LEO or an elliptical transfer orbit. From there, a high-specific-impulse thruster raises the upper stage into the operational orbit. Upon clamp release, the individual aperture elements transition to free flying. They are pushed away from the upper stage and one another by separation springs embedded in the standoffs, as shown in FIG. 51.

The upper stage mission may be complete at that point. Alternatively, the upper stage may be designed to serve as a communication hub to provide centralized feederlink and beamforming functionality to the distributed aperture. To the extent that orbital debris is a concern, the upper stage can also carry a retrieval system for the aperture elements to be used at the conclusion of a mission. The retrieval process can be simplified by using semi-cooperative maneuvering of the aperture elements. Surviving spacecraft can be commanded to line up in an orderly manner in advance, such that the upper stage can then conveniently retrieve them using simplified maneuvers.

For scale, FIG. 51 shows a representative equivalent terrestrial aperture area for the spaceborne distributed version. In this example, the deployed surface area is consistent with a Deep Space Network 34 m diameter dish antenna but with vastly higher resolution that can also be focused to operate in the Fresnel region for terrestrial applications.

Figure 52:
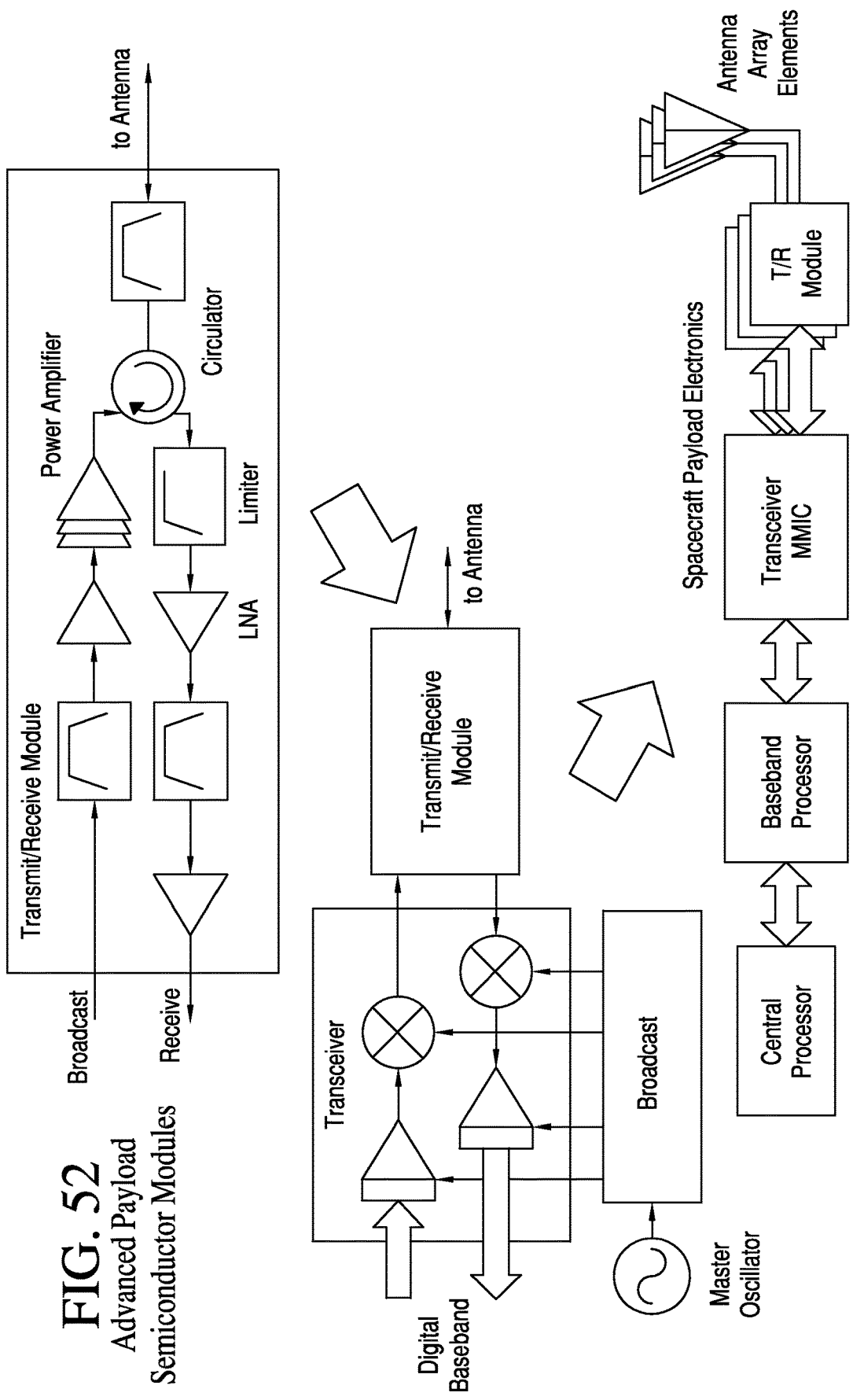
FIG. 52 shows the semiconductor module definitions for the advanced payload.

FIG. 52 shows how the payload semiconductor modules are organized for general purpose application and cost reduction. The integrated Transmit/Receive (T/R) module includes a High Power Amplifier based on wide bandgap technology, such as GaN and a built-in Low-Noise Amplifier. The T/R module is further integrated with an up/down converter and Analog to Digital and Digital to Analog converters to form an Active Antenna Element module. Such modules, tightly integrated using MMICs, form basic building blocks enabling each single antenna element on the spacecraft to generate and accept digital baseband data.

Each spacecraft becomes a node in a digital network connected via crosslinks. A router in each node moves data packets as addressed. In the preferred embodiment, conventional Internet protocols are employed for the transport layer, such as TCP/IP or UDP.

Figure 53:
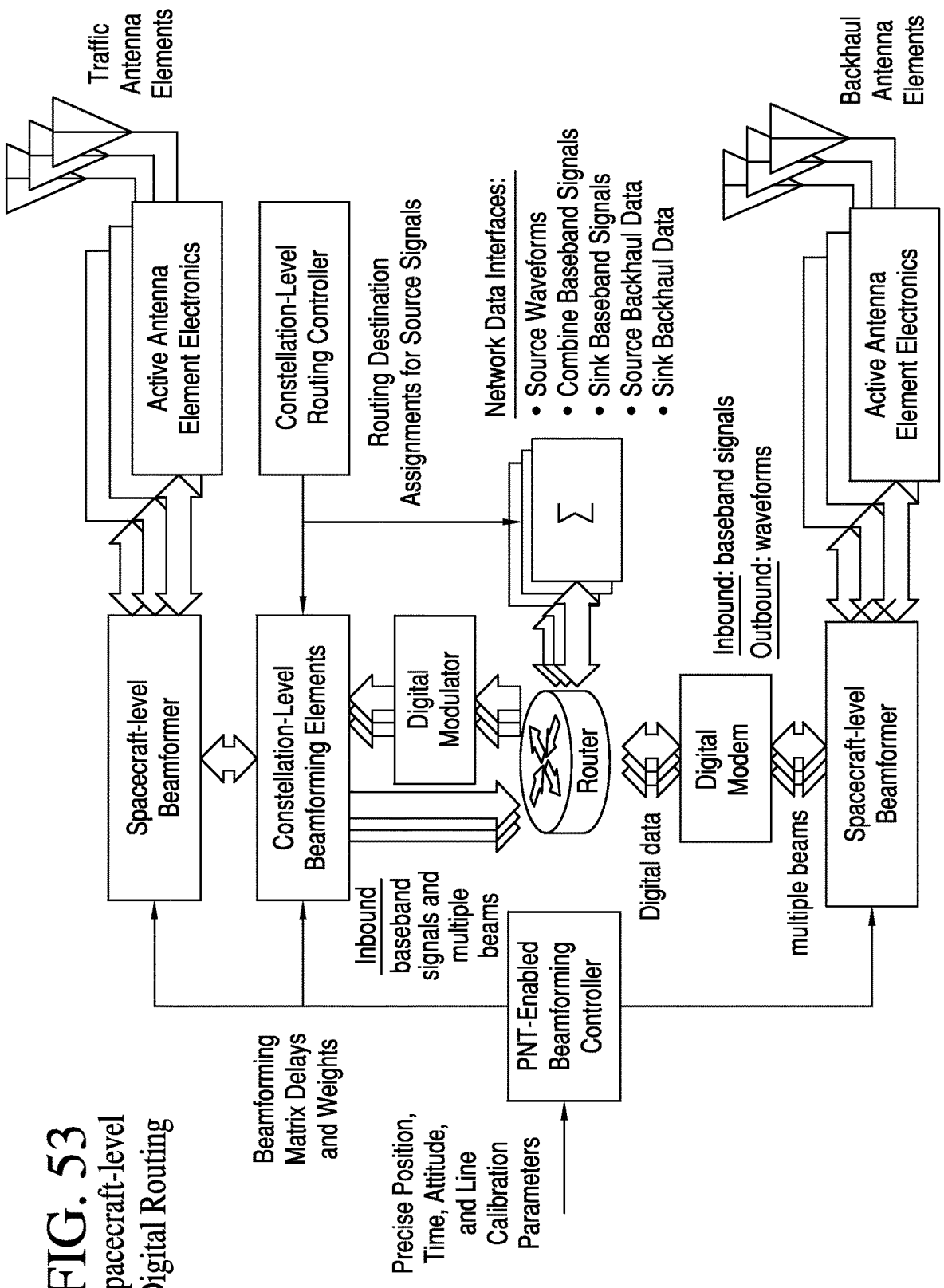
FIG. 53 shows the spacecraft-level digital routing and beamforming.

FIG. 53 shows the spacecraft-level digital routing and how multiple active antenna elements are integrated on each spacecraft with digital interfaces to form phased arrays to include the traffic and backhaul links. In this context, backhaul links are defined as providing logistical communication to include crosslinks and (as applicable) feederlinks. For each link there is a spacecraft-level digital beamformer. Incoming baseband signals from each antenna array are combined into a resultant output. Outgoing baseband signals are directed to the appropriate antenna element. The PNT-enabled beamforming controller operates on knowledge of position and lever arms that is accurate to a small fraction of a wavelength. The controller calculates the beamforming matrix element delays and weightings based on knowledge of the instantaneous spacecraft precise position, attitude, and line calibration parameters. In general, one or more beams can be supported concurrently. The crosslinks with associated modems for each beam create a constellation-wide network for digital communication. The router directs the flow of digital data, consistent with Internet router operations. Digital streaming data is flexible in what it can represent, including information and synthesized waveforms. Digital representations of custom waveforms can be streamed through the network, or modulated waveforms can be synthesized by each spacecraft at the point of broadcast from only the data that modulates them. The architecture accommodates multiple concurrent beams.

Connected to each spacecraft router is a network data interface. The purpose of this interface is to (1) source waveforms, (2) combine baseband signals, (3) sink baseband signals, (4) source backhaul data, and (5) sink backhaul data. A waveform source can originate in any spacecraft and can be broadcast from one or more traffic links in the same or different spacecraft. The combiner sums traffic signals from multiple spacecraft, thereby facilitating distributed beamforming. The combiner output, which requires lower throughput than its inputs, is routed back into the network to its commanded destination. The baseband sink function receives combined baseband signals from the network. Items (1) and (3) collectively serve as the digital baseband transmit and receive "terminals" of the distributed aperture. The interface also enables data to be routed to and from any other spacecraft via the crosslinks. Such network data may traverse one or more intermediate spacecraft routers during its transit.

The macroscopic behavior of the constellation-level distributed aperture is controlled by how the baseband traffic data is routed and processed throughout the spaceborne network. If the distributed aperture is operating in receive mode, the baseband samples from each traffic antenna element are combined in their beamformer. The resultant aperture element baseband signal is further subjected to controlled phase and group delays in a constellation-level beamforming element for the selected incoming beam, then collected and combined with those from other aperture elements. For transmit from the distributed aperture, the process operates in reverse. The waveform or data stream is routed to all the spacecraft, whereupon the digital stream is modulated into its outgoing waveform. The constellation-level beamforming element controls the delay and weight for the waveform, which is then broadcast via the traffic antenna elements to comprise the outgoing beam.

Figure 54:
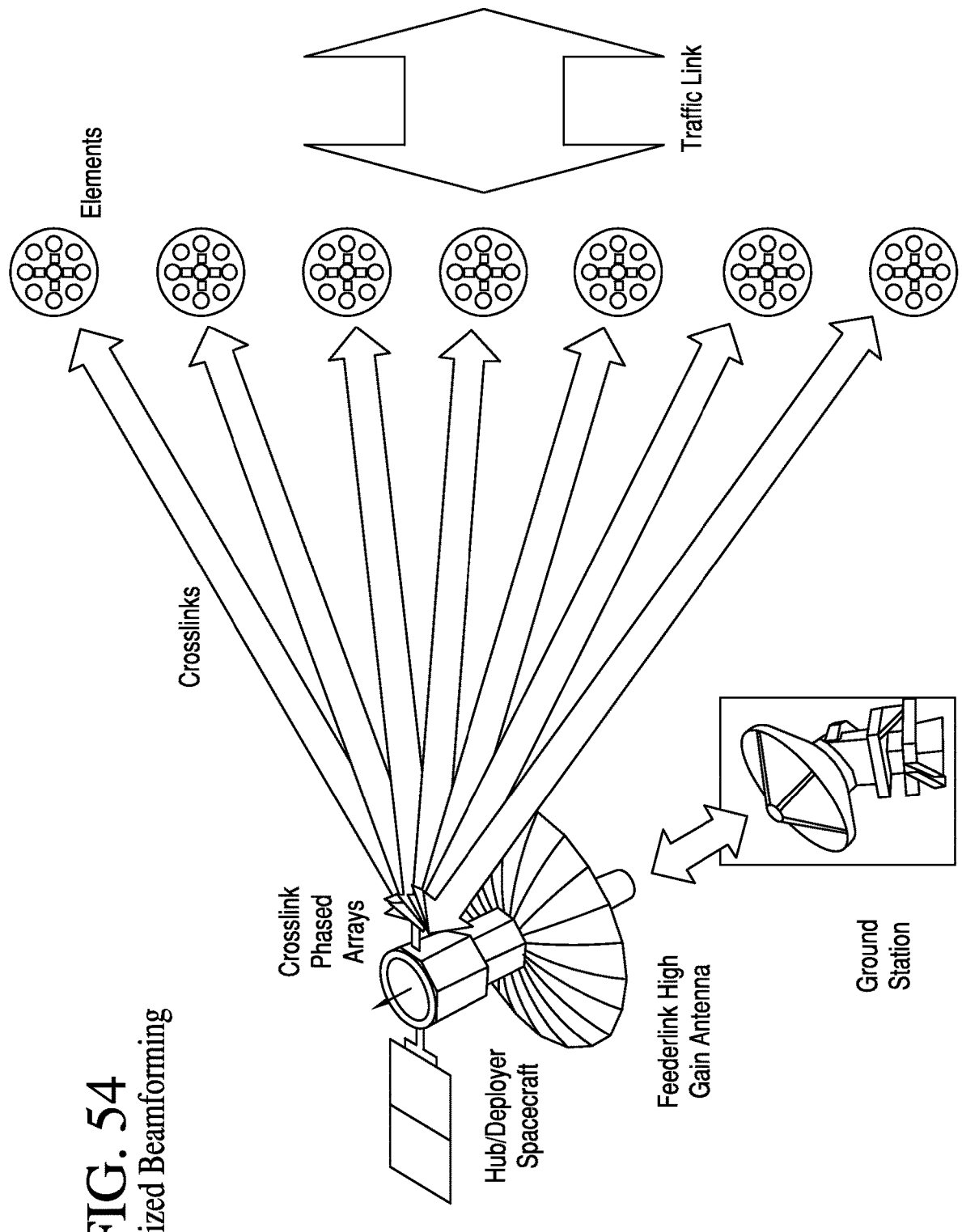
FIG. 54 shows the centralized beamforming configuration.

FIG. 54 shows how centralized beamforming is implemented. Incoming traffic signals are delayed in accordance with the desired incoming beam by the beamforming controllers in each aperture element. The baseband traffic signals are then digitally transmitted via crosslinks to the hub spacecraft, where they are combined across the entire distributed aperture. If desired, the combined baseband signal may then be further relayed to the ground station via the feederlink. The transmit mode operates in reverse. A waveform or data stream originating either from the ground via the feederlink or in the hub spacecraft is distributed via the crosslinks to the individual aperture elements. Modulators in each aperture element synthesize the broadcast waveform, which is then appropriately phased for transmission to comprise each outgoing beam.

Figure 55:
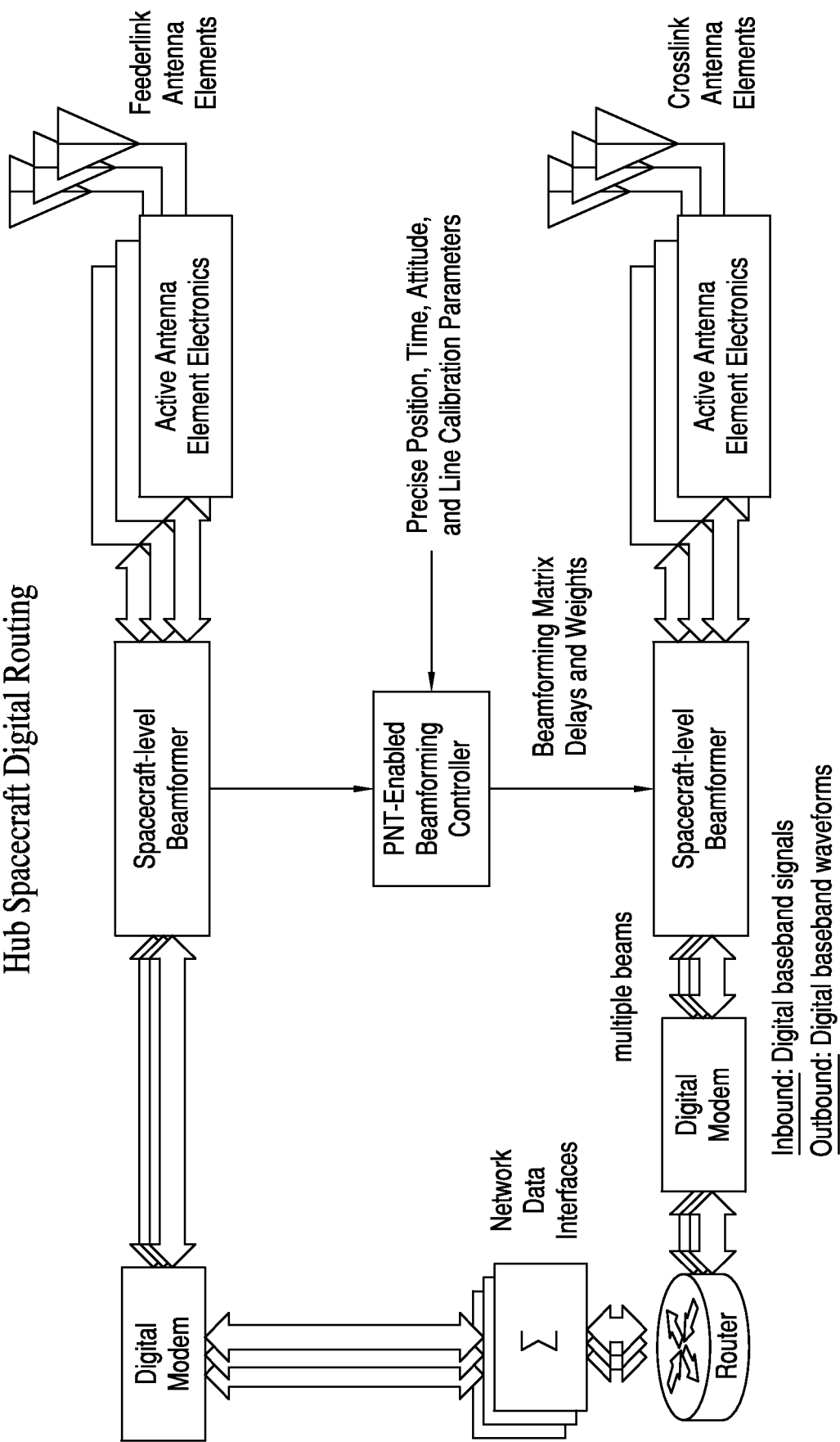
FIG. 55 shows the hub spacecraft digital routing and beamforming.

FIG. 55 shows how the incoming baseband signals arriving via the crosslinks are directed to the combiner and then to the feederlink. The reverse path is also shown. The network data interfaces serve as the digital "terminals" of each beam of the distributed aperture.

Figure 56:
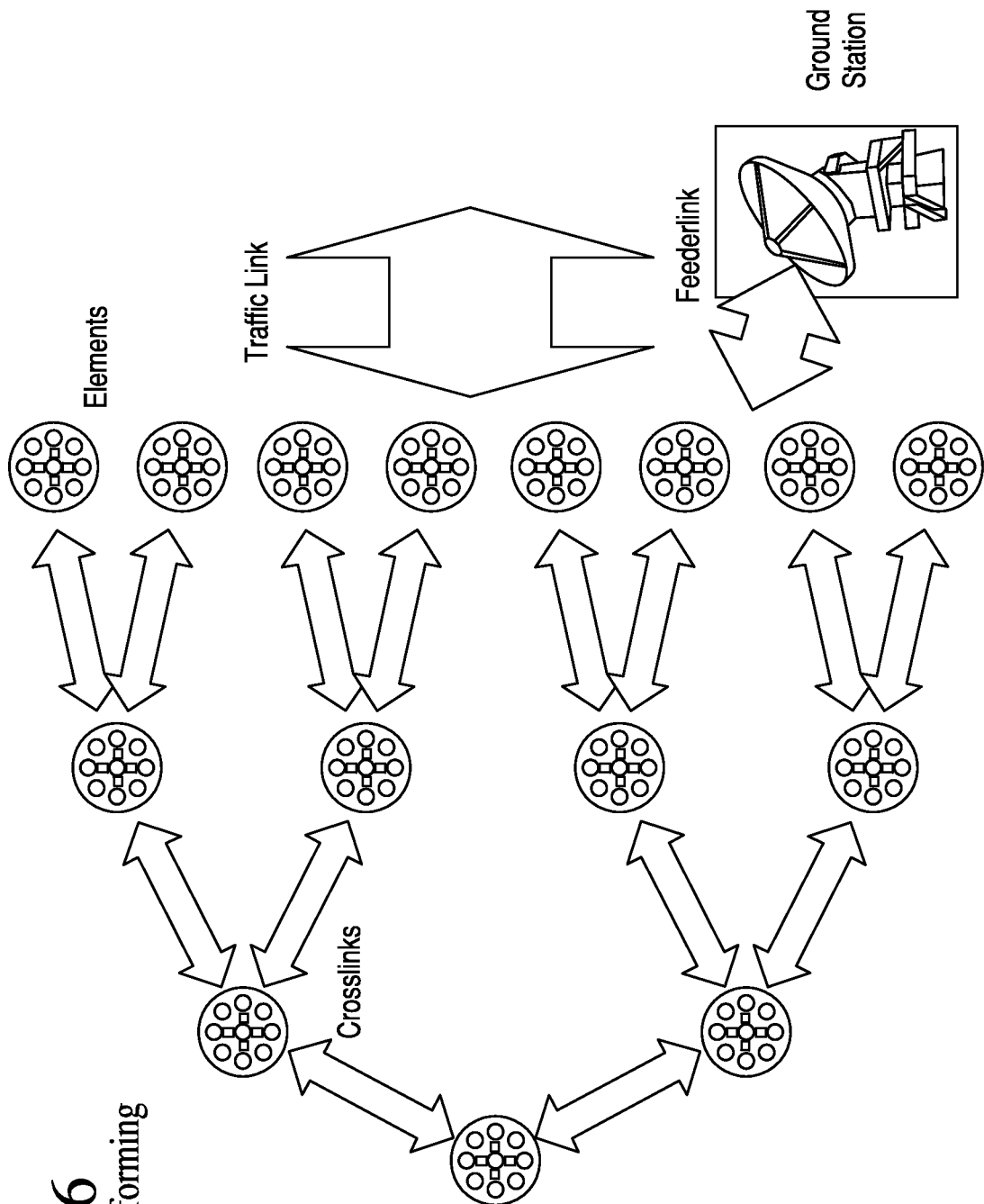
FIG. 56 shows the distributed beamforming configuration.

FIG. 56 shows the preferred embodiment that allows for distributed combining of the baseband signal and no hub. When the distributed aperture operates in receive mode, separate satellites carry out the combining on a distributed basis as baseband signal transits the network to an assigned destination node. Transmit mode operates the same way but in reverse from the node of origin. The network data interface port of the origin or destination node serves as the "terminals" of the corresponding distributed aperture beam. Feederlink communication is implemented by either creating a special distributed aperture beam using the backhaul or traffic antennas or by addressing individual spacecraft directly from the ground station.

Constellation Trade Space

Figure 57:
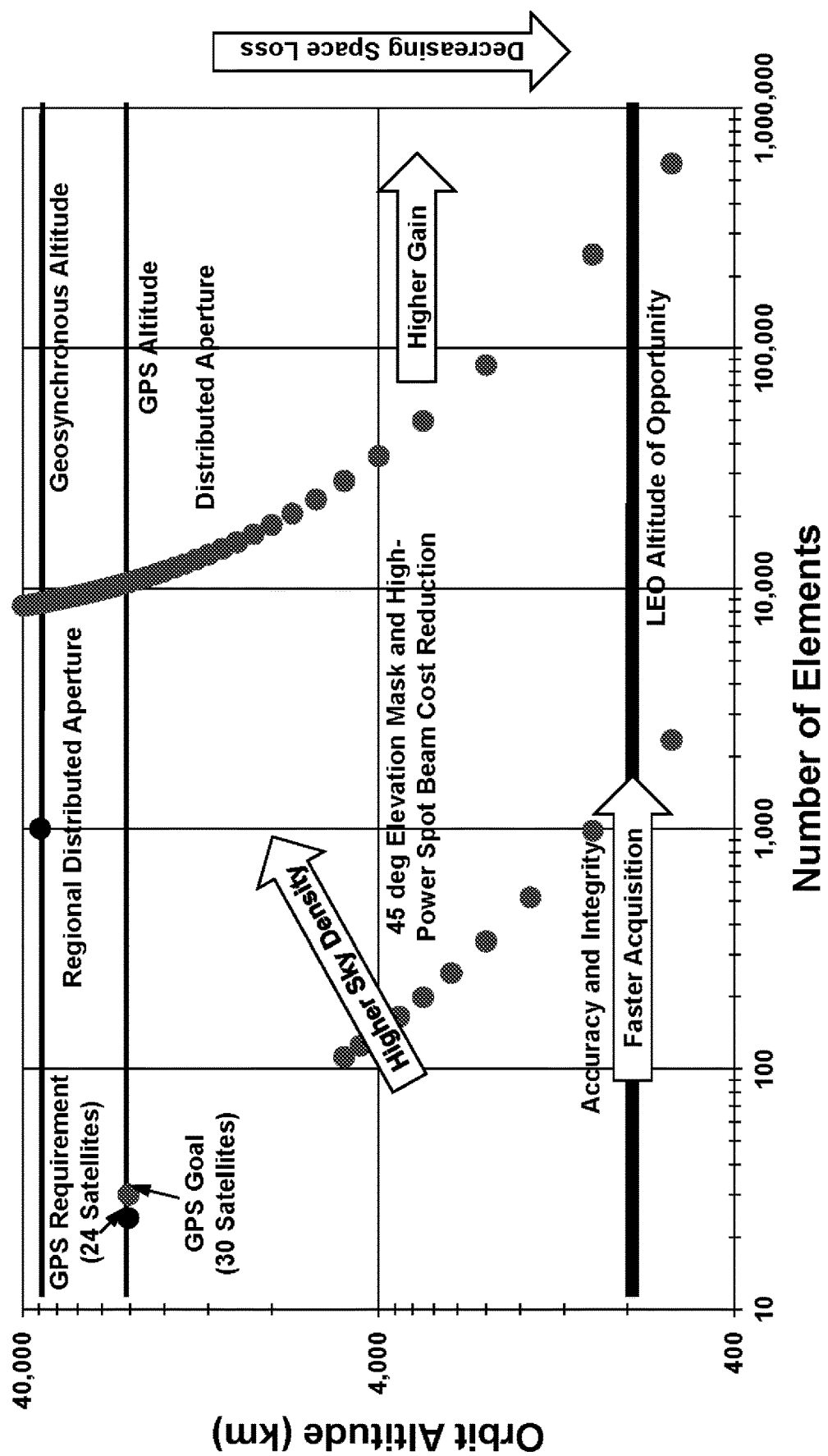
FIG. 57 shows the constellation trade space.

FIG. 57 shows a simplified model for constellation architectures based on desired attributes. The plot shows an estimate of the required number of satellites as a function of orbit altitude for the various modes of operation. For reference, the existing GPS constellation is indicated. The green curve shows many satellites are required to maintain the 45 deg elevation mask and also corresponds to the number of satellites associated with the high power broadcast. The "Altitude of Opportunity" corresponds to the lowest altitude attainable such that atmospheric drag diminishes as a significant disturbance to operational orbit estimation. This altitude is also readily accessible because so many launches already target this altitude. The LEO constellation rapid angle motion as seen by the user significantly speeds up the acquisition of sub-decimeter accuracy and safety-of-life integrity.

An ideal distributed aperture carries disaggregation to an arbitrarily small "molecular" sized level, possibly employing quantum computers, while driving the total number of elements in the aperture towards large numbers. Future technologies may further enable distributed computation, time and space registration, and energy storage and conversion to be carried out using a small element dimension. Random collisions between conventional spacecraft and such small elements deployed in a global cloud would be low energy and therefore harmless.

1.4.1. Distributed Aperture Applications

The following table lays out key applications for the distributed aperture.

| Application | New Functionality |
| --- | --- |
| Communication | Smartphone broadband connectivity anywhere without VSATs or forward-based infrastructure. |
| Communication | Spatial division multiple access. |
| Communication | Spectrum re-use. |
| Communication | Enables satellite spectrum sharing within congested terrestrial bands. |
| Communication | Concurrent spatial and spectral spreading. |
| Communication | Extreme LPI/LPD. |
| Navigation | PNT availability using only slivers of sky (deep urban or mountainous canyons). |
| Navigation | Surgical, focused anti-jam aiding with minimal collateral effects. |
| Navigation | Spatially selective, independent spoofing of multiple, adjacent, concurrent targets with erasure (cancellation) of existing signals. |
| Navigation | Instantaneous acquisition of accuracy and integrity. |
| SIGINT | Exceptionally high spatial resolution plus concurrent spatial interference rejection. |
| SIGINT | Enables better than meter-level accuracy, persistent, mobile target tracking resolution, urban or rural. |
| RADAR | Omni-directional concurrent illumination and detection, enabling improved time and spatial resolution and de-clutter. |
| Electronic Attack | Surgical illumination and minimal collateral effects. |
| Radio Astronomy | Enables unprecedented angular resolution and unlimited aperture scaling. |

Communication dual use applications include
- Journalism employing satellite news gathering
- Aid agencies
- Emergency response and disaster relief
- Network access for real-time data acquisition in remote areas
- Remote temporary office
- Tactical military operations
- Energy, including oil and gas
- Mining and heavy construction
- Maritime operations
- Forestry An example of an application for the developing world would be a "Twittersat"—an ability to send and receive SMS messages with existing cellular telephones (with modified software) operating in remote areas away from terrestrial infrastructure.

An example of an application for commercial users would be creating a WiFi "hot spot" on an airborne jet plane, wherein an existing mobile device (with modified software) communicates through the windows of the aircraft directly with the space infrastructure and requires no local repeater on the aircraft or ground interface infrastructure. The size of the hot spot could be set to any size, ranging from a few rows of seats to the entire airplane. The hot spot location would track the position of the aircraft by closed-loop tracking of the aircraft's ADS-B broadcast, both by the content of the message and from triangulating the spatial source of the ADS-B signal.

Similarly, a journalist could stream live HD video directly from a conventional smartphone (with modified software) into the space infrastructure from a remote area away from forward-based infrastructure or VSATs.

Advanced Spoofing

Figure 58:
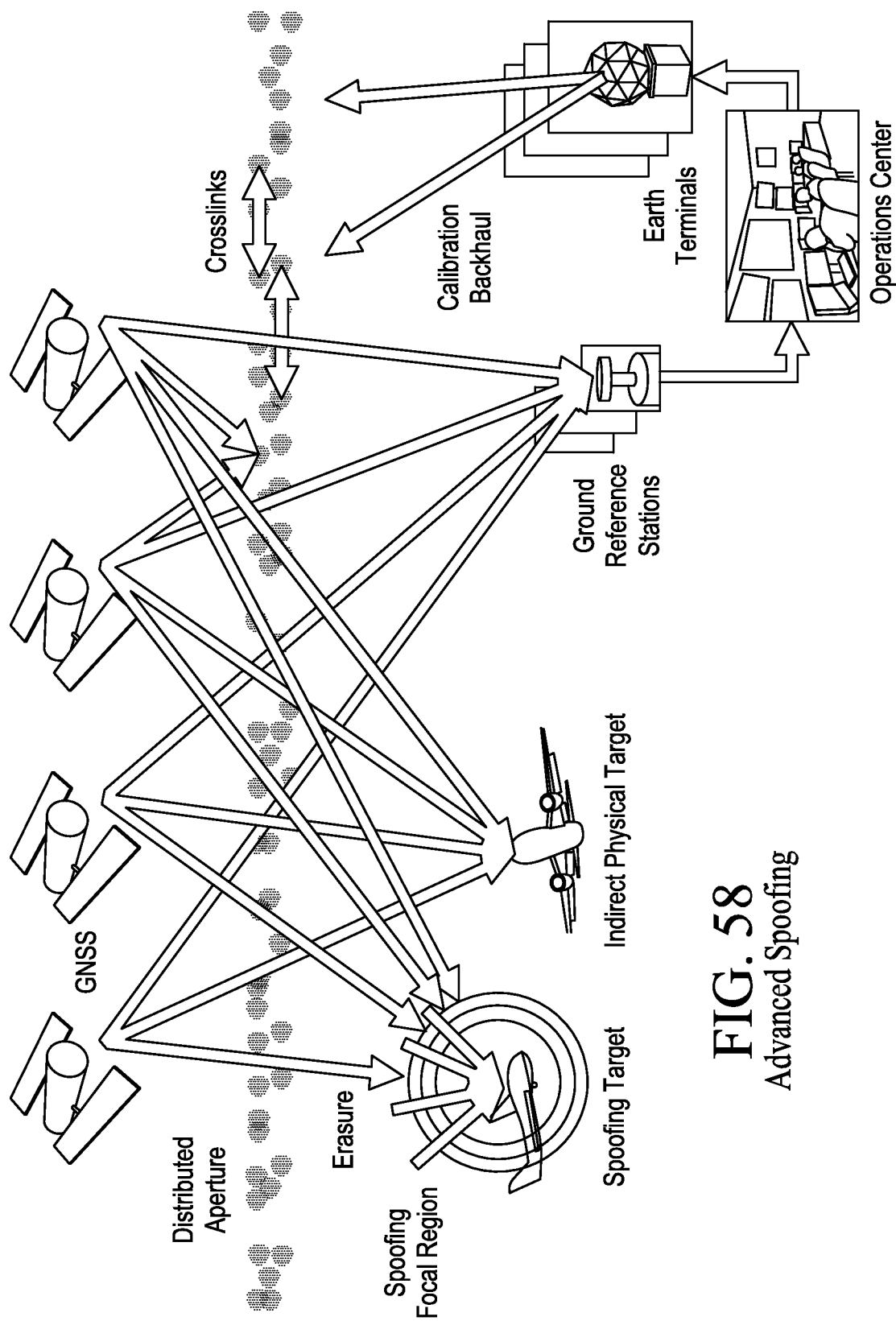
FIG. 58 shows an advanced spoofing scenario using the distributed aperture.

FIG. 58 shows the advanced spoofing scenario. Two aircraft are operating in proximity with each other. The aircraft are assumed to be uncooperative GNSS users situated anywhere on Earth. The aircraft labeled physical target is assumed to operate normally. The hypothetical objective of the spoofing scenario is to maneuver the spoofing target unwittingly into the vicinity of the physical target. A network of ground reference stations monitors the GNSS broadcast globally and calibrates all signal parameters to the centimeter level. The calibration parameters are uplinked and disseminated via the crosslinks throughout the distributed aperture. Since each aperture element can also receive the GNSS signals and estimate position and time, the calibration enables each aperture element to operate with phase coherence to the centimeter level.

Traditional spoofing has employed an apparatus tailored to a single target with a requirement for precise knowledge of the target's position and attitude. The spoofer broadcasts all signals at once to the target's receive antenna, so there are numerous opportunities for the target to detect signal attributes that are amiss, such as if the target motion does not exactly tie to the received signal. Furthermore, it is difficult to avoid collateral effects on other receivers.

The distributed aperture synthesizes an entirely new GNSS signal according to the spoofer's intent. These signals come from the specific directions called for by the spoofer and are spatially distinct for each false satellite.

In addition to the spoofing signal synthesis, a new wave precisely matching the existing GNSS signal can be positioned 180 deg out of phase so as to precisely cancel (erase) the incoming signal within the focal region. In other words, inside the focal region, the original signal is flawlessly superseded by the new spoofing signal.

The signal attributes can be controlled in a coordinated fashion to the centimeter level. If the target carries an inertial navigation unit, the profile of the position error can be brought on in a profile that exactly matches the inertial bias drift, such that the onset of spoofing is completely seamless and undetectable.

For advanced spoofing, a focal region is selected outside of which there is no collateral effect. Multiple, independent focal regions can be selected so as to have entirely different, yet concurrent effects. The spoofer does not need to know the exact location of the spoofing target to place the focal region or to precisely replace the existing signal. The only requirement is that the spoofer needs to command the focal region coordinates open loop, thereby implying an a priori knowledge of the spoofing target that is better than the chosen resolution of the spoofing focal region.

REFERENCES

1. Hatch, R. R., "A New Three-Frequency, Geometry-Free, Technique for Ambiguity Resolution," Proceedings of the 19th International Technical Meeting of the Satellite Division of The Institute of Navigation (ION GNSS 2006), Fort Worth, Tex., September 2006, pp. 309-316.
2. Rabinowitz Matthew, Parkinson Bradford W, Cohen Clark E, Lawrence David G, "A system using LEO satellites for centimeter-level navigation"
   Apr. 16, 2002, U.S. Pat. No. 6,373,432.
   Oct. 1, 1998, WO 1998/043372.
   Jan. 5, 2000, EP0968577.
3. U.S. Pat. No. 5,812,961.
4. U.S. Pat. No. 5,944,770.
5. Cohen Clark E, Brumley Robert W, Psiaki Mark L, Gutt Gregory M, Bencze William J, Ledvina Brent M, Ferrell Barton G, Whelan David A, "Methods and apparatus for a navigation system with reduced susceptibility to interference and jamming"
May 13, 2008, U.S. Pat. No. 7,372,400.
Aug. 13, 2008, EP1955090.
Apr. 24, 2008, CA 2628795.
Apr. 24, 2008: WO 2008/048283.
Mar. 4, 2009: CN 200680050566.
6. Cohen Clark E, Humphreys Todd E, Ledvina Brent M, Bencze William J, Psiaki Mark L, Galusha Bryan T, "Practical Method For Upgrading Existing GNSS User Equipment With Tightly Integrated Nav-Com Capability"
Jul. 12, 2011, U.S. Pat. No. 7,978,130 B1.
Apr. 4, 2012, EP2435790 A2.
Feb. 10, 2011, WO 2011/016821.
7. Performance Specification, Wide Area Augmentation System Geostationary Communication and Control Segment (GCCS), Department of Transportation, Federal Aviation Administration, FAA-E-2963, Sep. 21, 2004.
8. I. Y. Bar-Itzhack and N. Berman, "Control Theoretic Approach to Inertial Navigation Systems," AIAA Paper 87-2591, 1987.
9. Joerger, M., L. Gratton, B. Pervan, and C. E. Cohen. "Analysis of Iridium-Augmented GPS for Floating Carrier Phase Positioning." NAVIGATION: *Journal of the Institute of Navigation*, Vol. 57, No. 2, Summer, 2010, pp. 137-160.
10. *The Global Positioning System: Theory and Applications*, Volume 1, edited by Bradford W. Parkinson, James J. Spilker, AIAA, 1996, page 371.
11. *Ibid., page* 105, Table 11.
12. *Ibid., page* 97.
13. L. Bledjian, D. V. Hale, M. J. Hoover, and M. J. O'Neill, "Phase-Change Materials", Chapter 11, *Spacecraft Thermal Control Handbook*, 2$^{nd}$ edition, David G. Gilmore, ed., The Aerospace Press, 2002, pp. 378.
14. Shervin Shambayati, "Atmosphere Attenuation and Noise Temperature at Microwave Frequencies", *Low-Noise Systems in the Deep Space Network*, ed. Macgregor Reid, Deep Space Communications and Navigation Book Series, Jet Propulsion Laboratory, 2008.

I claim:

1. A method for supporting resilient carrier phase positioning of user devices connected by respective communication links to at least one service data processor, measurements received from Global Navigation Satellite System (GNSS) satellites, and measurements received from low Earth orbit (LEO) satellites, said measurements including carrier phase pseudoranges, comprising the steps of:
 (a) the at least one service data processor accepting said measurements received from (i) at least one of said GNSS satellites by at least one LEO satellite, (ii) at least one of said GNSS satellites and the at least one LEO satellite by at least one ground reference station, and/or (iii) at least one other LEO satellite by the at least one LEO satellite via a LEO-to-LEO crosslink transmission;
 (b) the at least one service data processor generating precise orbit and clock predictions for the at least one LEO satellite from available said pseudoranges; and
 (c) the at least one service data processor disseminating said predictions over said communications links to the user devices to enable the user device user devices to take into account the precise orbit and clock predictions when computing respective positions of the user devices upon receiving signals and measuring additional carrier phase pseudoranges from GNSS and LEO satellites.

2. A method for supporting resilient carrier phase positioning of user devices as claimed in claim 1, wherein
 (a) the at least one service data processor accepts said measurements received from (i) at least one of said GNSS satellites by the at least one LEO satellite and (ii) at least one of said GNSS satellites and the at least one LEO satellite by the at least one ground reference station and
 (b) the at least one service data processor (i) generates the orbit predictions from said pseudoranges received from at least one of said GNSS satellites by the at least one LEO satellite and (ii) generates the clock predictions from said pseudoranges received from at least one of said GNSS satellites and the at least one LEO satellite by the at least one ground reference station.

3. A method for supporting resilient carrier phase positioning of user devices as claimed in claim 1, wherein said measurements received from the at least one other LEO satellite by the at least one ground reference station are from configurations wherein the at least one ground reference station is outside the footprint of the at least one LEO satellite.

4. A method for supporting resilient carrier phase positioning of user devices as claimed in claim 1, wherein measurements received from LEO satellites by ground reference stations are unavailable.

5. A method for supporting resilient carrier phase positioning of user devices as claimed in claim 1, wherein measurements received from GNSS satellites by LEO satellites are unavailable.

6. A method for supporting resilient carrier phase positioning of user devices as claimed in claim 1, wherein (i) said at least one LEO satellite includes an oscillator of known stability coupled coherently to a receiver for use in measuring carrier phase pseudoranges from said GNSS satellites or from other said LEO satellites and a transmitter for use in broadcasting carrier phase to be received by said ground reference stations and (ii) the at least one user device endures loss of one or more clock predictions due to disablement of satellites, ground reference stations, service data processors, or data dissemination means via which the clock predictions are received.

7. A method for supporting resilient carrier phase positioning of user devices as claimed in claim 1, wherein said at least one service data processor is integrated into a WAAS master station or a precise point positioning network operations center.

8. A method for supporting resilient carrier phase positioning of user devices as claimed in claim 1, wherein said disseminating step is accomplished using SBAS satellites, Inmarsat Narrowband, NDGPS data broadcast, VHF aviation radio, 4G LTE, DOT ITS V2I 5.9 GHz standard broadcast, or said LEO satellites.

9. A method for supporting resilient carrier phase positioning of user devices utilizing at least one service data processor connected to the user devices by respective communication links, measurements received from GNSS satellites, and measurements received from LEO satellites, said measurements including carrier phase pseudoranges, comprising the steps of:
 (a) the user devices accepting precise orbit and clock predictions disseminated by the at least one service data processor for at least one LEO satellite, said precise orbit and clock predictions being generated from available pseudoranges accepted by the at least one service data processor received from (i) at least one GNSS satellite by at least one LEO satellite, (ii) at least one GNSS satellite and the at least one LEO satellite by at least one ground reference station, and/or (iii) LEO-to-LEO crosslink transmissions between at least one other LEO satellite and the at least one LEO satellite; and b) the user devices taking into account the precise orbit and clock predictions disseminated by the at least one service data processor when computing respective positions of the user devices upon receiving signals and measuring additional carrier phase pseudoranges from GNSS and LEO satellites.

10. A method for supporting resilient carrier phase positioning of user devices as claimed in claim 9, wherein (i) the precise orbit predictions are generated from pseudoranges accepted by the at least one service data processor received from at least one GNSS satellite by the at least one LEO satellite and (ii) the precise clock predictions are generated from pseudoranges received from at least one GNSS satellite and the at least one LEO satellite by the at least one ground reference station.

11. A method for supporting resilient carrier phase positioning of user devices as claimed in claim 9, wherein the pseudoranges accepted from the at least one other LEO satellite by the at least one ground reference station are from configurations wherein the at least one ground reference station is outside the footprint of the at least one LEO satellite.

12. A method for supporting resilient carrier phase positioning of user devices as claimed in claim 9, wherein pseudoranges received from LEO satellites by ground reference stations are unavailable.

13. A method for supporting resilient carrier phase positioning of user devices as claimed in claim 9, wherein pseudoranges received from GNSS satellites by LEO satellites are unavailable.

14. A method for supporting resilient carrier phase positioning of user devices as claimed in claim 9, wherein (i) said at least one LEO satellite includes an oscillator of known stability coupled coherently to a receiver for use in measuring carrier phase pseudoranges from said GNSS satellites or from other said LEO satellites and a transmitter for use in broadcasting carrier phase to be received by said ground reference stations and (ii) the at least one user device endures loss of one or more clock predictions due to disablement of satellites, ground reference stations, service data processors, or data dissemination means via which the clock predictions are received.

15. A method for supporting resilient carrier phase positioning of user devices as claimed in claim 9, further comprising the step of employing Receiver Autonomous Integrity Monitoring (RAIM) to weight a fusion of other sensors selected from at least one camera, lidar receiver, or radar receiver.

16. A method for supporting resilient carrier phase positioning of user devices as claimed in claim 9, further comprising the step of forming coherent cross-correlations across at least one pair of satellites to combat potential interference.

17. A method for supporting resilient carrier phase positioning of user devices as claimed in claim 9, wherein said GNSS and LEO satellites have known oscillator stabilities, and further comprising the step of receiving precise clock predictions of the GNSS and LEO satellites from the at least one service data processor and enduring subsequent loss of one or more clock predictions due to disablement of ground reference stations, service data processors, or data dissemination means via which the clock predictions are received.

18. A method for supporting resilient carrier phase positioning of user devices as claimed in claim 9, wherein the method is carried out despite enduring subsequent loss of one or more clock predictions due to disablement of ground reference stations, service data processors, or data dissemination means therebetween or therefrom.

19. A method for supporting resilient carrier phase positioning of user devices as claimed in claim 9, wherein said at least one LEO satellite is included in a constellation of said LEO satellites that minimize the number of required PRN codes through PRN code re-use.

20. A method for supporting resilient carrier phase positioning of user devices as claimed in claim 9, further comprising the steps of: (a) the user device, at such time as it is moving, receiving broadcasting signals from one or more terrestrial, free-running, pre-surveyed pseudolites of known oscillator stability and measuring carrier phase pseudoranges therefrom, and (b) incorporating the pre-surveyed locations and known oscillator stability of said pseudolites in said position computation.

21. A method for supporting resilient carrier phase positioning of user devices as claimed in claim 20, wherein said pseudolites broadcast in the 5.9 GHz band.

22. A method for supporting resilient carrier phase positioning of user devices as claimed in claim 20, wherein some or all of said pseudolites are mounted at street level.

23. A method for supporting resilient carrier phase positioning of user devices as claimed in claim 20, wherein some or all of said pseudolites are mounted at an elevated position relative to said at least one user device.

24. A method for supporting resilient carrier phase positioning of user devices as claimed in claim 9, further comprising the steps of:
   (a) receiving signals and measuring carrier phase pseudoranges from multi-band LEO, single-band LEO, and GNSS satellites;
   (b) collecting service data processor precise orbit and clock predictions of both the LEO and GNSS satellites and road-specific ionosphere and troposphere estimates;
   (c) applying said road-specific estimates to correct said single-band LEO satellite pseudoranges.

25. A method for supporting resilient carrier phase positioning of user devices as claimed in claim 24, wherein one or more of said single-band LEO satellite signals are broadcast in the band centered at 1,575,420,000 Hz.

26. A method for supporting resilient carrier phase positioning of user devices as claimed in claim 24, wherein one or more of said single-band LEO satellite signals are broadcast in the band spanning 1,616,000,000 to 1,626,500,000 Hz.

27. A service data processor for supporting resilient carrier phase positioning of user devices utilizing at least one service data processor connected to the user devices by respective communication links, measurements received from GNSS satellites, and measurements received from LEO satellites, said measurements including carrier phase pseudoranges, comprising:
   (a) means for accepting said measurements from (i) at least one of said GNSS satellites by at least one LEO satellite (ii) at least one of said GNSS satellites and said at least one LEO satellite by at least one ground reference station and/or (iii) at least one other LEO satellite to the at least one LEO satellite via a LEO-to-LEO crosslink transmission;

(b) means for generating precise orbit and clock predictions for the at least one LEO satellite from available said pseudoranges received by the at least one LEO satellite; and (c) means for disseminating said predictions to the user devices over the communications links to enable the user devices to take into account the precise orbit and clock predictions when computing respective positions of the user devices upon receiving signals and measuring additional carrier phase pseudoranges from GNSS and LEO satellites.

28. A service data processor for supporting resilient carrier phase positioning of user devices as claimed in claim 27, wherein (a) the accepted measurements are received from (i) at least one of said GNSS satellites by the at least one LEO satellite and (ii) at least one of said GNSS satellites and the at least one LEO satellite by the at least one ground reference station; and (b) the generated orbit predictions are from said pseudoranges received from at least one of said GNSS satellites by the at least one LEO satellite, and the generated clock predictions are from said pseudoranges received from at least one of said GNSS satellites and the at least one LEO satellite by the at least one ground reference station.

29. A service data processor for supporting resilient carrier phase positioning of user devices as claimed in claim 27, wherein the measurements received from the at least one other LEO satellite by the at least one ground reference station are from configurations wherein the at least one ground reference station is outside the footprint of the at least one LEO satellite.

30. A service data processor for supporting resilient carrier phase positioning of user devices as claimed in claim 27, wherein measurements received from LEO satellites by ground reference stations are unavailable.

31. A service data processor for supporting resilient carrier phase positioning of user devices as claimed in claim 27, wherein measurements received from GNSS satellites by LEO satellites are unavailable.

32. A service data processor for supporting resilient carrier phase positioning of user devices as claimed in claim 27, wherein (i) said at least one LEO satellite includes an oscillator of known stability coupled coherently to a receiver for use in measuring carrier phase pseudoranges from said GNSS satellites or from other LEO satellites and a transmitter for use in broadcasting carrier phase to be received by said ground reference stations and (ii) the at least one user device endures loss of one or more clock predictions due to disablement of satellites, ground reference stations, service data processors, or data dissemination means via which the clock predictions are channeled.

33. A service data processor for supporting resilient carrier phase positioning of user devices as claimed in claim 27, wherein said service data processor is spaceborne.

34. A service data processor for supporting resilient carrier phase positioning of user devices as claimed in claim 33, further including coupled transmitters and receivers provided in an integrated circuit chipset hosted by said LEO satellite.

35. A service data processor for supporting resilient carrier phase positioning of user devices as claimed in claim 27, wherein said at least one service data processor is integrated into a WAAS master station or a precise point positioning network operations center.

36. A service data processor for supporting resilient carrier phase positioning of user devices as claimed in claim 27, wherein said disseminating means utilizes SBAS satellites, Inmarsat Narrowband, NDGPS data broadcast, VHF aviation radio, 4G LTE, DOT ITS V2I 5.9 GHz standard broadcast, or said LEO satellites.

37. A user device supported by at least one service data processor, the at least one service data processor connected to a plurality of user devices by respective communication links, to utilize measurements received from GNSS satellites and measurements received from LEO satellites in order to compute a position of the user device, said measurements including carrier phase pseudoranges, comprising:

(a) accepting means for accepting precise orbit and clock predictions disseminated by the at least one service data processor for at least one LEO satellite, the precise orbit and clock predictions being generated from available pseudoranges accepted by the at least one service data processor received from (i) at least one GNSS satellite by the at least one LEO satellite, (ii) at least one GNSS satellite and the at least one LEO satellite by at least one ground reference station, and/or (iii) at least one other LEO satellite by the at least one LEO satellite as a LEO-to-LEO crosslink transmission; and (b) computing means for computing the position of the user device by taking into account the precise orbit and clock predictions when computing the position upon receiving signals and measuring additional carrier phase pseudoranges from GNSS and LEO satellites.

38. A user device supported by at least one service data processor as claimed in claim 37, wherein (i) the precise orbit predictions are generated from pseudoranges accepted by the at least one service data processor received from at least one GNSS satellite by the at least one LEO satellite and (ii) the precise clock predictions are generated from pseudoranges accepted by the at least one service data processor received from the at least one LEO satellite by the at least one ground reference station.

39. A user device supported by at least one service data processor as claimed in claim 37, wherein the pseudoranges received from the at least one other LEO satellite by the at least one ground reference station are from configurations wherein the at least one ground reference station is outside the footprint of the at least one LEO satellite.

40. A user device supported by at least one service data processor as claimed in claim 37, wherein pseudoranges received from LEO satellites by ground reference stations are unavailable.

41. A user device supported by at least one service data processor as claimed in claim 37, wherein pseudoranges received from GNSS satellites by LEO satellites are unavailable.

42. A user device supported by at least one service data processor as claimed in claim 37, said at least one LEO satellite includes an oscillator of known stability coupled coherently to a receiver for use in measuring carrier phase pseudoranges from said GNSS satellites or from other LEO satellites and a transmitter for use in broadcasting carrier phase to be received by said ground reference stations and (ii) the at least one user device endures loss of one or more clock predictions due to disablement of satellites, ground reference stations, service data processors, or data dissemination means via which the clock predictions are received.

43. A user device supported by at least one service data processor as claimed in claim 37, wherein said computing means is coupled to a Receiver Autonomous Integrity Monitoring (RAIM) device.

44. A user device supported by at least one service data processor as claimed in claim 37, wherein said computing means is coupled to means for employing said RAIM device to weight the fusion of other sensors.

45. A user device supported by at least one service data processor as claimed in claim 44, wherein said other sensors include at least one of a camera and a lidar or radar receiver.

46. A user device supported by at least one service data processor as claimed in claim 37, wherein LEO signals broadcast from each said LEO satellite to each said ground reference station and said user device use frequency bands that are the same as those used by GNSS satellites.

47. A user device supported by at least one service data processor as claimed in claim 46, wherein said LEO signals are consistent with legacy or modern GNSS PRN codes.

48. A user device supported by at least one service data processor as claimed in claim 47, wherein said GNSS PRN codes are selected from the following GNSS PRN codes: GPS C/A, GPS P(Y), GPS M, GPS M', GPS L5, GPS L2C, GPS L1C, Galileo E1, Galileo E5a, Galileo E5b, Galileo E5, and Galileo E6.

49. A user device supported by at least one service data processor as claimed in claim 46, wherein said LEO satellite signals are codes generated by a 128-bit AES counter producing a chipping rate of an integer multiple of 1,023,000 chips per second.

50. A user device supported by at least one service data processor as claimed in claim 37, further comprising means for: (a) the user device in motion receiving signals broadcast by one or more terrestrial, free-running, pre-surveyed pseudolites of known oscillator stability, the signals from the pseudolites including carrier phase pseudoranges, and (b) incorporating the pre-surveyed locations and oscillator stabilities of said pseudolites in said position calculation.

51. A user device supported by at least one service data processor as claimed in claim 50, wherein said pseudolites broadcast in the 5.9 GHz band.

52. A user device supported by at least one service data processor as claimed in claim 50, wherein some or all of said pseudolites are mounted at street level.

53. A user device supported by at least one service data processor as claimed in claim 50, wherein some or all of said pseudolites are mounted above where street vehicles operate.

* * * * *